US008047558B2

(12) United States Patent
Ramsey

(10) Patent No.: US 8,047,558 B2
(45) Date of Patent: Nov. 1, 2011

(54) HEAVY-DUTY VEHICLE AXLE/SUSPENSION SYSTEM

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 12/816,761

(22) Filed: Jun. 16, 2010

(65) Prior Publication Data

US 2010/0253032 A1     Oct. 7, 2010

Related U.S. Application Data

(63) Continuation-in-part of application No. 11/413,429, filed on Apr. 28, 2006, now abandoned.

(60) Provisional application No. 60/676,554, filed on Apr. 29, 2005.

(51) Int. Cl.
*B60G 9/04* (2006.01)
(52) U.S. Cl. ................................. 280/124.157
(58) Field of Classification Search .......... 280/124.116, 280/124.153, 124.157, 124.163, 124.17, 280/124.174, 124.175
See application file for complete search history.

(56) References Cited

U.S. PATENT DOCUMENTS

| | | | |
|---|---|---|---|
| 1,638,292 A | 10/1923 | Cross | |
| 1,584,977 A * | 5/1926 | Burger et al. ................. | 280/788 |
| 1,656,175 A | 1/1928 | Benedetti | |
| 1,975,977 A * | 10/1934 | Russell ................. | 280/124.174 |
| 2,038,597 A | 4/1936 | Peo | |
| 2,102,420 A | 12/1937 | Kogstrom | |
| 2,206,970 A * | 7/1940 | Megow ................. | 280/124.103 |
| 2,286,576 A * | 6/1942 | Ronning ................. | 280/104 |
| 2,469,152 A | 5/1949 | Brown | |
| 3,063,732 A * | 11/1962 | Harbers et al. ............... | 280/6.16 |
| 5,307,952 A | 5/1994 | Worrel et al. | |
| 5,478,104 A * | 12/1995 | Worrel et al. ........... | 280/124.17 |
| 6,805,370 B2 | 10/2004 | Raleigh et al. | |

* cited by examiner

*Primary Examiner* — Paul N Dickson
*Assistant Examiner* — Robert A Coker
(74) *Attorney, Agent, or Firm* — Krugliak, Wilkins, Griffiths & Dougherty Co., L.P.A.; David P. Dureska; Edward T. Kennedy

(57) ABSTRACT

An axle/suspension system for a heavy-duty vehicle, in which the vehicle has a frame that includes a pair of hangers. The axle/suspension system is attached to the hangers, and includes an axle and a pair of suspension assemblies. Each of the suspension assemblies includes an air spring and at least one spring member. The spring member includes a first attachment portion and a second attachment portion. The first attachment portion is generally rigidly connected to the hanger via a clamped connection, and the second attachment portion is operatively connected to the axle. The spring member, connected in this manner, reduces or eliminates dock walk when a cargo transfer vehicle enters the heavy-duty vehicle, and also reduces or eliminates rebound when the cargo transfer vehicle exits the vehicle. The spring member is also capable of being tuned to a predetermined stiffness that is sufficient to control heavy-duty vehicle roll forces.

29 Claims, 30 Drawing Sheets

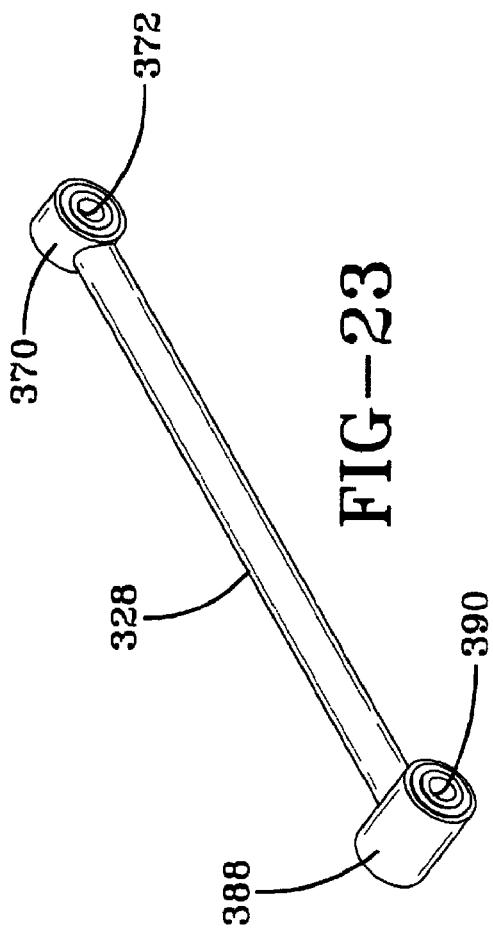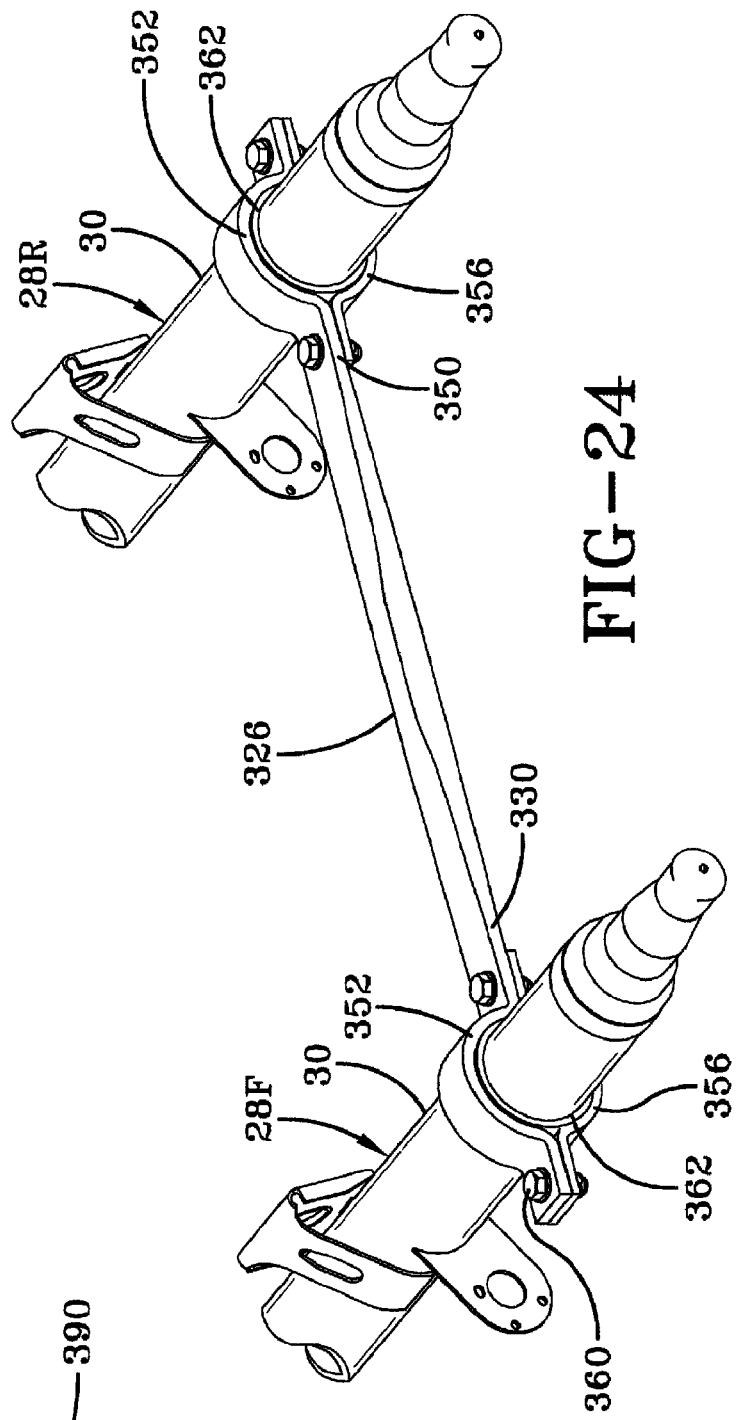

HEAVY-DUTY VEHICLE AXLE/SUSPENSION SYSTEM

CROSS-REFERENCE TO RELATED APPLICATION

This application is a continuation-in-part of U.S. patent application Ser. No. 11/413,429, filed on Apr. 28, 2006, which in turn claims the benefit of U.S. Provisional Patent Application Ser. No. 60/676,554, filed on Apr. 29, 2005.

BACKGROUND OF THE INVENTION

1. Field of the Invention

The present invention relates to the art of axle/suspension systems for vehicles. More particularly, the invention relates to the art of trailing or leading arm air-ride axle/suspension systems for heavy-duty vehicles, such as tractor-trailers or semi-trailers, which cushion the ride and stabilize the vehicle during operation. Still more particularly, the invention relates to the art of trailing or leading arm air-ride axle/suspension systems for heavy-duty vehicles of the type that may be susceptible to dock walk.

2. Background Art

Heavy-duty vehicles that transport freight, for example, tractor-trailers or semi-trailers and straight trucks, typically include leading or trailing arm air-ride suspension assemblies that connect the axles of the vehicle to the frame of the vehicle. These air-ride suspension assemblies use air springs to cushion the ride of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to a slider box, with the understanding that such reference is by way of example, and that the present invention applies to heavy-duty vehicle primary frames, movable subframes and non-movable subframes.

In the heavy-duty vehicle art, one or more axle/suspension systems usually are suspended from a single slider box. It is understood that a slider box outfitted with usually two axle/suspension systems typically is referred to as a slider or slider tandem, and for purposes of convenience and clarity, will hereinafter be referred to as a slider tandem. Of course, a slider box may also be outfitted with a single axle/suspension system, or three or more axle/suspension systems. By way of example, reference herein shall be made to a slider tandem having a pair of axle/suspension systems mounted thereon, with the understanding that such reference also applies to a slider outfitted with one, three or more axle/suspension systems. The slider tandem in turn is mounted on the underside of the trailer primary frame, and is movable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits.

A slider box typically includes a pair of longitudinally-extending, parallel, transversely-spaced elongated main members. A plurality of longitudinally-spaced parallel cross members extend transversely between and are attached to the main members. Pairs of transversely-spaced hangers are mounted on and depend from the main members and selected ones of the cross members. An axle/suspension system includes a pair of transversely-spaced trailing arm beams, each of which is pivotally connected at its front end to a respective one of the hangers. Each trailing arm beam also is welded or otherwise rigidly attached at its rear end to a transversely-extending axle of the axle/suspension system. The axle/suspension system further includes a pair of air springs, which each extend between and are mounted on the rear end of a respective one of the beams and a respective one of the main members, and a pair of shock absorbers, which each extend between and are mounted on a respective one of the beams and a respective one of the main members. It should be noted that, while the hangers are sometimes considered to be part of the vehicle frame once they are connected to the frame members, they are typically engineered as part of the axle/suspension system. Reference herein shall be made to the hangers as part of the frame for the purpose of convenience, with the understanding that they may be engineered as part of the axle/suspension system.

Many heavy-duty vehicles transport dry freight, that is, cargo that is loaded into a van or trailer of a typical heavy-duty vehicle. To receive cargo, or to have it removed, the vehicle often parks at a loading dock, with a rear end of the trailer in close proximity to the dock. Due to the weight of the cargo, a fork lift or other transfer vehicle is used to load the cargo into or unload the cargo from the trailer, and travels from the loading dock into the trailer. At this stage of the loading or unloading process, a disadvantage of many prior art axle/suspension systems occurs, which is an event known in the art as "dock walk." The dock walk event will be described in greater detail below, but may be summarized as a generally arcuate motion of the trailing arm beam and axle of the axle/suspension system in response to the sudden weight increase of the fork lift driving into the trailer, which causes the vehicle tires to rotate in a forward direction and undesirably move the trailer away from the loading dock.

In an attempt to reduce or prevent dock walk in prior art leading or trailing arm air-ride axle/suspension systems, additional components have been used to reduce the arcuate motion of the trailing arm beam when a forklift or other device is introduced into the trailer during a loading or unloading situation. For example, some systems employ a mechanical stop or similar structural component, as will be described in greater detail below, which reduces arcuate motion of the beam and the axle, and in turn reduces the rotation of the tires, which minimizes dock walk. Other systems employ manual exhaust valves, which will also be described in greater detail below, which enable bumpers within the air springs to act as a positive mechanical support and minimize arcuate motion of the beam and the axle, in turn minimizing forward rotation of the tires and dock walk.

However, components such as a structural stop and/or exhaust valves, as well as associated components for the operation and control of the stop and/or valves, involve an undesirable increase in weight of the axle/suspension system, as well as an undesirable increase in cost for the system.

Moreover, such additional components add to the complexity of the axle/suspension system, undesirably increasing maintenance costs for the system.

Other types of prior art air-ride axle/suspension systems that are known in the art as parallelogram linkages reduce or prevent dock walk, and will be described in greater detail below. However, such prior art parallelogram linkage axle/suspension systems possess a distinct disadvantage, which is an inherent lack of roll stability. That is, a heavy-duty vehicle must be prevented from leaning too far during events such as turning of the vehicle, lane-change maneuvers, uneven loading, shifting loads and sloped terrain. Such parallelogram linkage systems lack the stiffness that is needed to control lean of the trailer. In order to provide stability, an auxiliary roll bar assembly must be incorporated into the parallelogram linkage system, which involves the addition of multiple components and thereby undesirably increases the weight, cost and maintenance of the system.

Other types of prior art axle/suspension systems, which are known in the art as mechanical spring suspension systems, typically are not subject to dock walk. Spring suspension systems, however, are not air-ride systems, and instead include a pairs of transversely-spaced leaf springs. These leaf springs are engineered to carry the vertical load of the vehicle, and therefore typically are stiff enough to control roll forces. The stiffness of the leaf springs of the spring suspension creates a significant disadvantage for the system, since the leaf springs must be engineered to be stiff enough to provide vertical force resistance and thus roll stability for a fully-loaded trailer, which sacrifices flexibility in situations where the trailer is only lightly loaded, thereby creating an extremely harsh ride when the trailer is lightly loaded. Thus, the ride that is enabled by a spring suspension is considerably less than optimum.

As a result, a need has existed in the art to develop a leading or trailing arm air-ride axle/suspension system that overcomes the disadvantages of prior art systems and provides a system that can reduce or eliminate dock walk, while maintaining vehicle roll stability and a cushioned ride, with fewer components.

BRIEF SUMMARY OF THE INVENTION

An objective of the present invention is to provide an axle/suspension system for a heavy-duty vehicle that reduces or eliminates dock walk.

Another objective of the present invention is to provide an axle/suspension system for a heavy-duty vehicle that maintains roll stability.

Yet another objective of the present invention is to provide an axle/suspension system for a heavy-duty vehicle that includes fewer components and reduced weight and cost when compared to systems of the prior art.

These objectives and others are obtained by the axle/suspension system for heavy duty vehicles of the present invention. The vehicle has a frame including a pair of hangers, and the axle/suspension system is attached to the hangers, and includes an axle and a pair of suspension assemblies. Each of the suspension assemblies includes an air spring and at least one spring member. The spring member includes a first attachment portion and a second attachment portion. The first attachment portion is generally rigidly connected to a respective one of the hangers, and the second attachment portion is operatively connected to the axle. The spring member, connected in this manner, exhibits sufficient stiffness to control roll forces encountered by said vehicle during operation and/or reduces rotation of a vehicle tire due to movement of the axle when a cargo transfer vehicle enters or exits the heavy-duty vehicle.

BRIEF DESCRIPTION OF THE SEVERAL VIEWS OF THE DRAWINGS

The preferred embodiments of the invention, illustrative of the best mode in which applicant has contemplated applying the principles of the invention, are set forth in the following description and are shown in the drawings, and are particularly and distinctly pointed out and set forth in the appended claims.

FIG. 23 is a driver's side top perspective view of a radius rod of the heavy-duty vehicle axle/suspension system shown in FIG. 20;

FIG. 24 is a fragmentary driver's side front top perspective view of a portion of respective front and rear axles, certain brake components, and a spring of the heavy-duty vehicle axle/suspension system shown in FIG. 20;

Similar numerals refer to similar parts throughout the drawings.

DETAILED DESCRIPTION OF THE INVENTION

Figure 1:
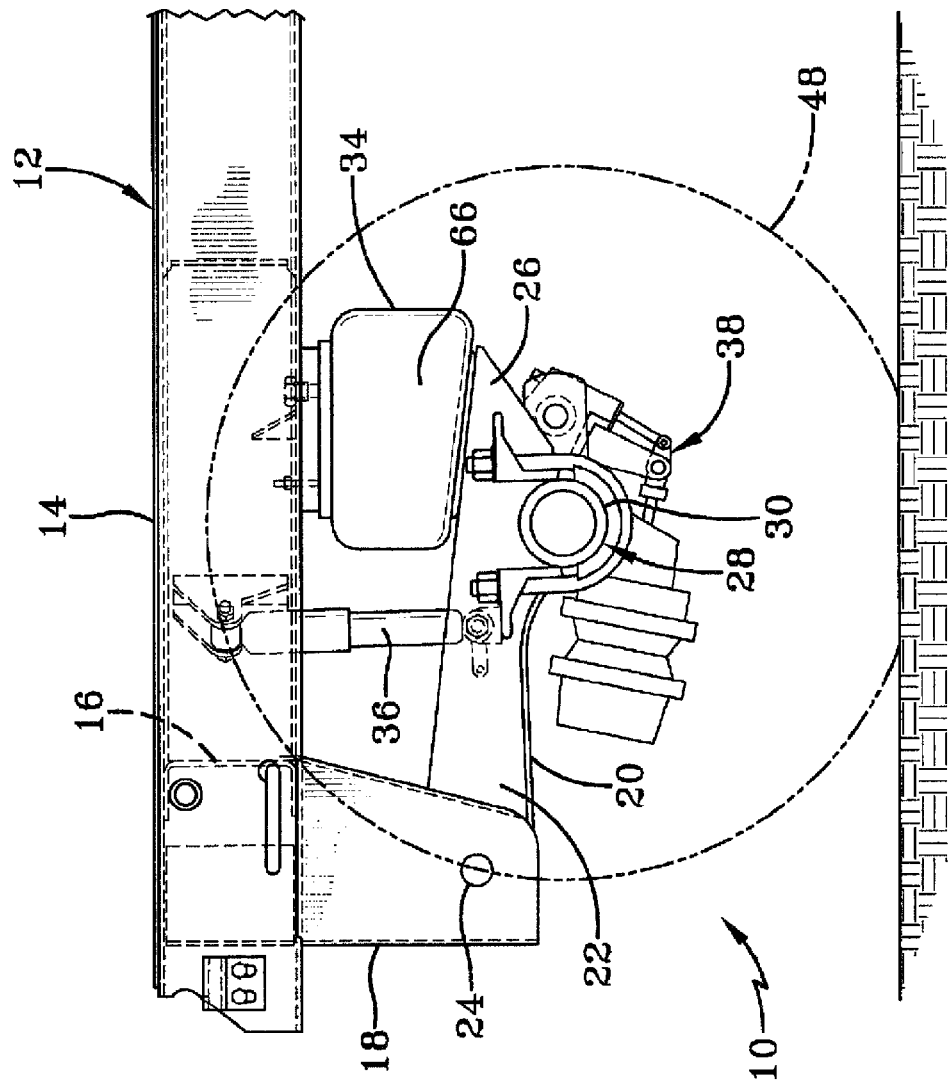
FIG. 1 is a fragmentary side elevational view of a prior art heavy-duty vehicle slider tandem, with hidden components, a vehicle tire and certain brake system components represented by dashed lines.

In order to better understand the axle/suspension system of the present invention, a prior art trailing arm type air-ride axle/suspension system, indicated generally at 10, is shown in FIG. 1 mounted on a slider box 12, and now will be described. It should be noted that slider box 12 generally is representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, frame 12 is shown in FIG. 1 as a slider box.

More specifically, slider box 12 includes a pair of longitudinally-extending, parallel, transversely-spaced elongated main members 14. A plurality of longitudinally-spaced parallel cross members 16 extend transversely between and are attached to main members 14. Pairs of transversely spaced hangers 18 are mounted on and depend from main members 14 and selected ones of cross members 16. It should be noted that, while hangers 18 are sometimes considered to be part of slider box 12 once they are connected to main members 14 and selected ones of cross members 16, they are typically engineered as part of axle/suspension system 10. Reference herein shall be made to hangers 18 as part of slider box 12 for the purpose of convenience, with the understanding that they may be engineered as part of axle/suspension system 10.

Axle/suspension system 10 is pivotally connected to hangers 18 via a pair of transversely-spaced trailing aim beams 20. Specifically, each trailing arm beam 20 includes a front end 22 having a bushing assembly 24, which includes a bushing, pivot bolts and washers (not shown) as is well-known in the art, to facilitate pivotal connection of the beam to a respective one of hangers 18. Each beam 20 also includes a rear end 26, which is welded or otherwise rigidly attached to a transversely-extending axle 28. Axle 28 includes a central tube 30 generally extending between beams 20 and a pair of spindles 32 (see FIG. 5—first embodiment of the invention, for an illustration of spindles) each extending outboardly from a respective one of the beams.

Axle/suspension system 10 also includes air springs 34, each of which extends between and is mounted on rear end 26 of a respective one of beams 20 and a respective one of main members 14. A pair of shock absorbers 36, each of which extends between and is mounted on a respective one of beams 20 and a respective one of main frame members 14, also is a component of prior art axle/suspension system 10. For the sake of relative completeness, a brake system 38 is shown mounted on prior art axle/suspension system 10.

Figure 2:
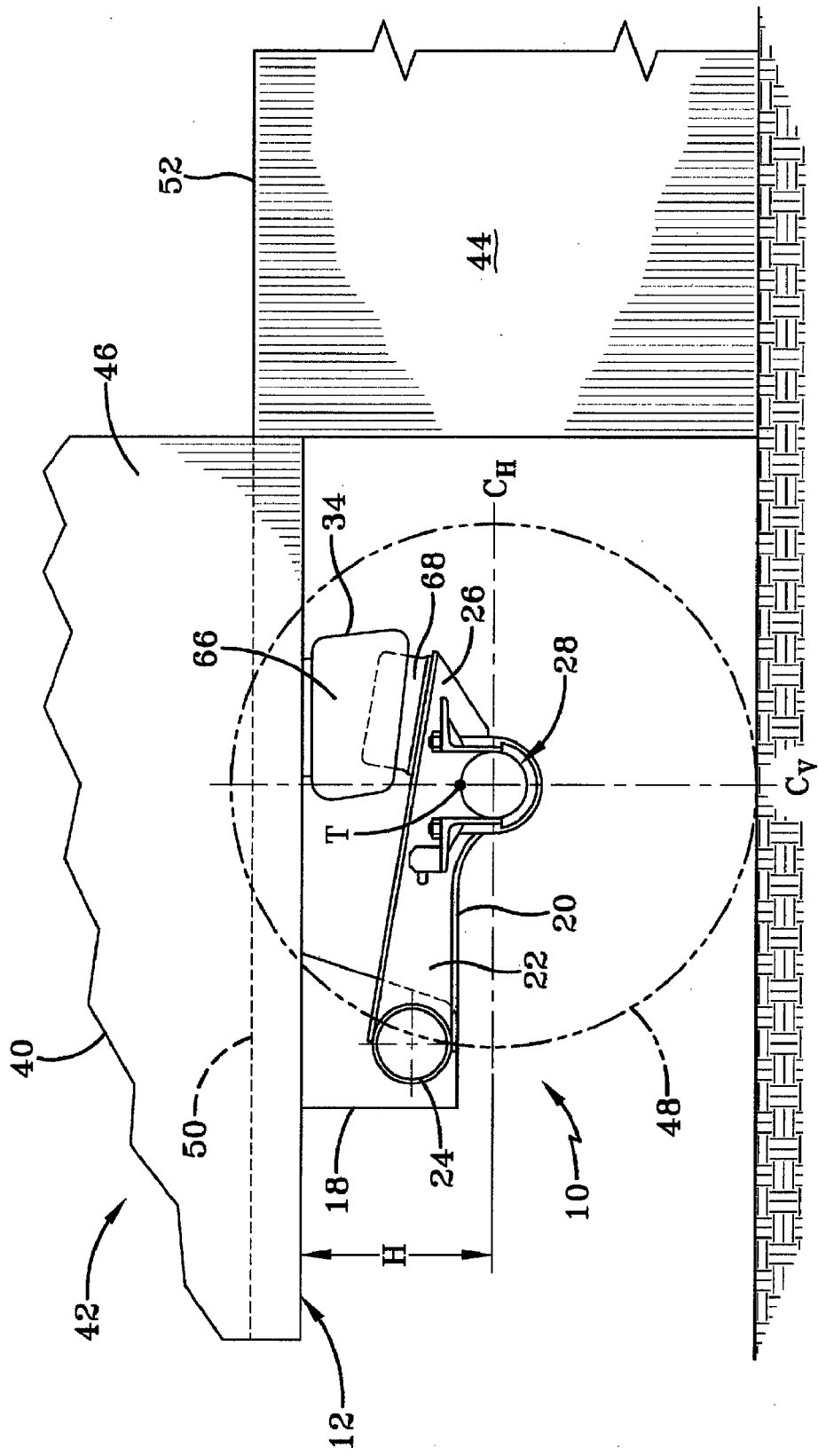
FIG. 2 is a fragmentary schematic representation of a side view of a rear portion of a heavy-duty vehicle having a prior art slider tandem and parked at a loading dock, with hidden components and a vehicle tire represented by dashed lines.

With reference now to FIG. 2, many heavy-duty vehicles transport dry freight, that is, cargo that is loaded into a van or trailer 40 of a typical heavy-duty vehicle 42. To receive cargo, or to have it removed, vehicle 42 often parks at a loading dock 44 with a rear end 46 of trailer 40 positioned in close proximity to the dock. Due to the weight of the cargo, a fork lift (not shown) or other transfer vehicle, is used to load the cargo into or unload the cargo from trailer 40, and travels from loading dock 44 into the trailer. It is at this stage of the loading or unloading process that a disadvantage of many prior art axle/suspension systems such as system 10 occurs, which is known in the art as "dock walk."

More specifically, when parking at dock 44, brake system 38 (FIG. 1) of vehicle 42 usually is engaged, thereby preventing tires 48 that are rotatably mounted on axle 28 via bearings (not shown), as known in the art, from spinning on the bearings. Trailer 40 is at an operating height H, measured as the distance from horizontal centerline $C_H$ of axle 28 to the bottom surface of frame 12. Operating height H provides a basis for floor 50 of trailer 40 to generally align with upper surface 52 of loading dock 44, since loading docks generally are constructed at uniform heights, enabling the fork lift to readily drive from the dock into the trailer to load or unload cargo. At operating height 11, a point known in the art as the top dead-center T of axle 28 is aligned with vertical centerline $C_V$ of the axle.

Figure 3:
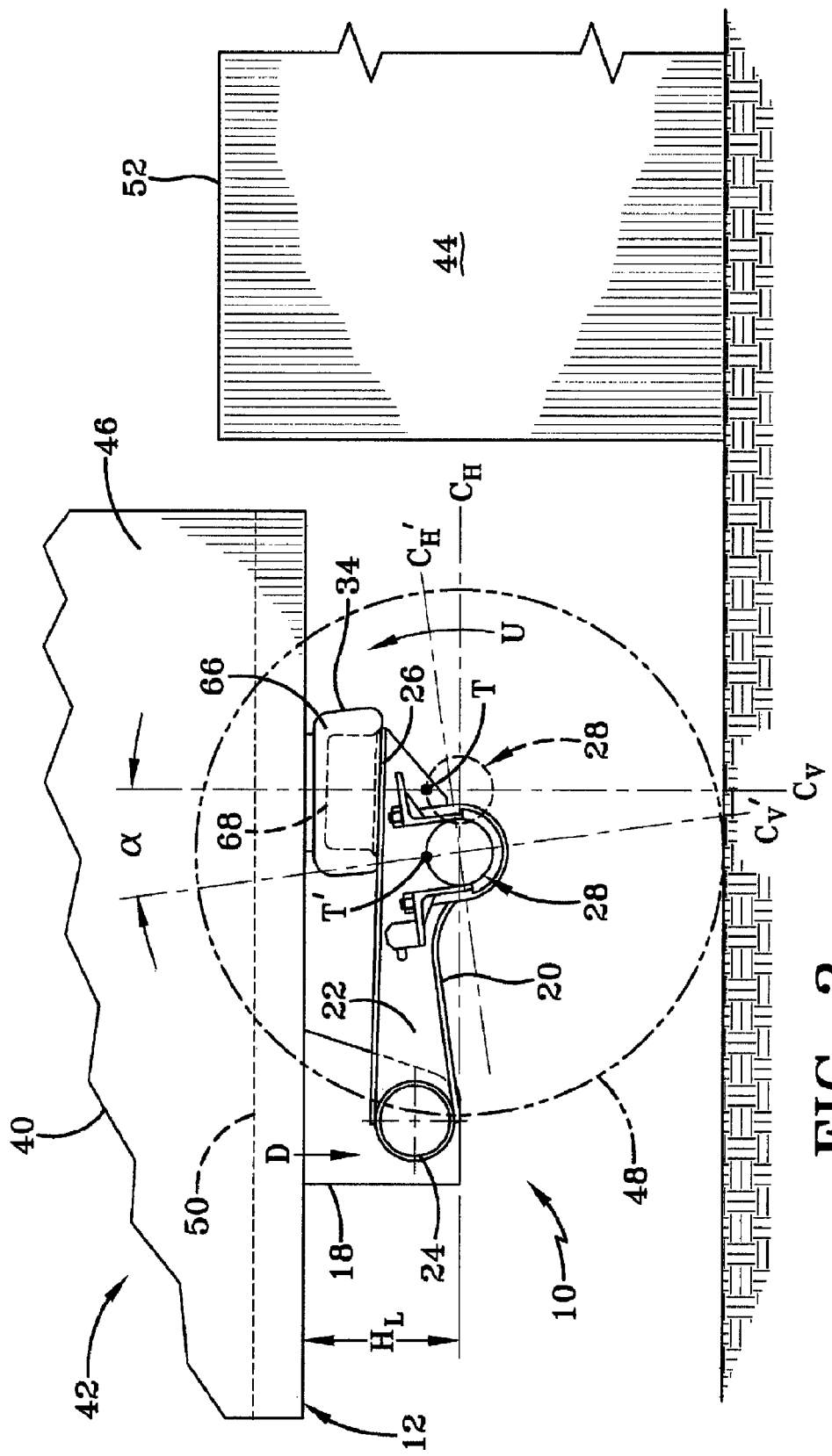
FIG. 3 is a view similar to that of FIG. 2, but showing the position of the vehicle after a fork lift enters the vehicle and the vehicle encounters dock walk.

Turning now to FIG. 3, when the fork lift moves from loading dock 44 into trailer 40, the fork lift causes a sudden weight increase in the trailer. It is to be noted that, when vehicle 42 moves into a loading or unloading position at dock 44 at operating height H, the air pressure in air springs 34 typically is at a generally steady state as shown in FIG. 2. The sudden weight increase of the fork lift driving into trailer 40 temporarily overcomes the steady-state air pressure in air springs 34, which reduces operating height H to a lower level, $H_L$, moving frame 12 and hanger 18 downwardly, as shown by arrow D.

If a control system (not shown) for air springs 34 is active, a sensor detects the downward motion of frame 12 and a height control valve (not shown) directs compressed air into the air springs, thereby raising the frame back up to operating height H, so that the downward movement is only momentary and floor 50 of trailer 40 realigns with upper surface 52 of loading dock 44. If the control system for air springs 34 is inactive, frame 12 typically remains at lower level $H_L$, in which case a bridge plate (not shown) is used to enable the fork lift to drive from trailer floor 50 to loading dock surface 52. In both cases, however, front end 22 of beam 20 moves downwardly, causing rear end 26 of the beam to move in a generally arcuate motion, as shown by arrow U, because beam front end 22 is pivotally attached to hanger 18. Since beam 20 is rigidly attached to axle 28, the axle moves with the beam. Top dead-center point T of axle 28 thus moves to a new, off-center point indicated by T', shifting a degrees. At the completion of axle movement, axle vertical centerline $C_V$ and axle horizontal centerline $C_H$ have also shifted to new respective positions $C_V'$, $C_H'$. Because brake system 38 of vehicle 42 is locked, the described arcuate motion U of beam 20 and axle 28 causes tires 48 to rotate in a forward direction and thus move trailer 40 away from loading dock 44. This movement is commonly known in the art as dock walk.

In the case where the control system and the height control valve (not shown) direct air into air springs 34 to allow only momentary downward movement of frame 12 and hanger 18, the subsequent raising of the frame does not fully compensate for downward movement D and generally arcuate motion U, still resulting in some amount of dock walk. Therefore, dock walk remains a problem whether or not the control system for air springs 34 is activated.

As mentioned above, in an attempt to reduce or prevent dock walk in prior art leading or trailing arm air-ride axle/suspension systems, such as axle/suspension system 10, additional components have been used to reduce the movement of slider box 12 when a forklift or other device is introduced into trailer 40 during a loading or unloading situation. For example, some systems employ a stop or similar structural component (not shown) that is secured to slider box 12 or to beam 20, or both. If the distance between beam 20 and slider box 12 decreases beyond a predetermined amount, the structural stop provides a positive mechanical stop that limits the vertical movement of the slider box. Reduction of the vertical movement of frame 12 reduces resulting arcuate motion U of beam 20 and axle 28, in turn reducing the rotation of tires 48, which minimizes dock walk.

In other attempts to reduce or prevent dock walk, different components have been employed in lieu of a separate structural stop. For example, with continuing reference to FIGS. 2 and 3, manual exhaust valves (not shown) have been used with air springs 34 to exhaust air bags 66 of the air springs when vehicle 42 is parked at loading dock 44. Exhausting air bags 66 causes frame 12 to lower onto bumpers 68 that are located within air springs 34, and then brake system 38 (FIG. 1) of vehicle 42 is engaged. When a fork lift drives into trailer 40, bumpers 68 act as a positive mechanical support at rear end 26 of beam 20, minimizing arcuate motion U of the beam and axle 28, respectively, in turn minimizing forward rotation of tires 48 and dock walk.

Components such as an additional or existing structural stop and/or exhaust valves, as well as associated components for the operation and control of the stop and/or valves, involve an undesirable increase in weight of axle/suspension system 10, as well as an undesirable increase in cost for the system. Moreover, such additional components add to the complexity of axle/suspension system 10, undesirably increasing maintenance costs for the system. Another disadvantage of the use of exhaust valves to try to minimize dock walk is encountered by users who design the cargo height and/or fork lift height to precisely match the inner height of the roof (not shown) of trailer 40. This is often done to utilize as much of the cargo capacity of trailer 40 as possible. In such a situation, when air bags 66 are exhausted, thereby lowering frame 12, the roof height of trailer 40 in relation to dock surface 52 also is lowered, potentially causing the top of the cargo or the top of the fork lift to hit the trailer roof and interfere with the loading or unloading process.

Figure 4A:
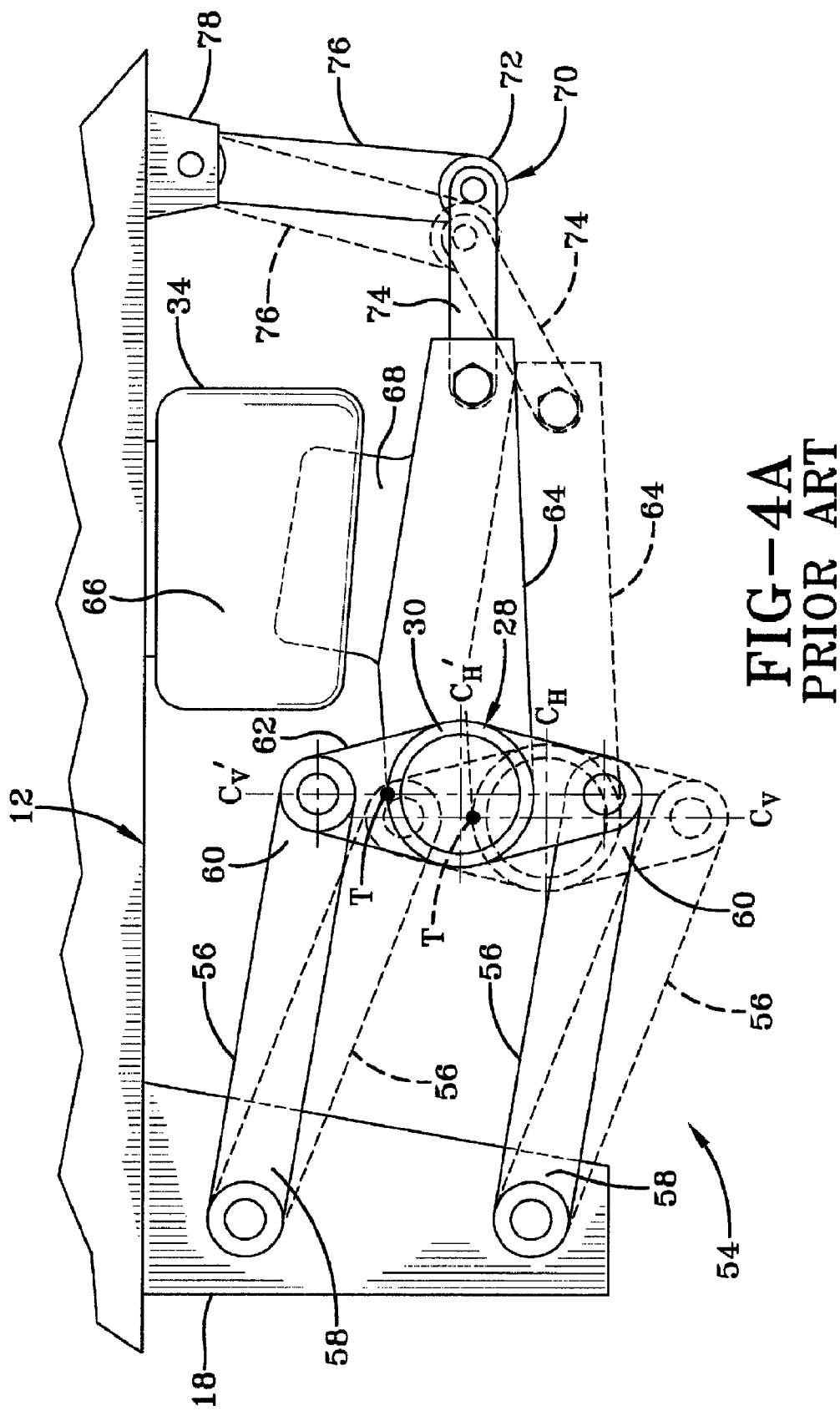
FIG. 4A is a fragmentary schematic representation of a side view of a first prior art parallelogram linkage air-ride axle/suspension system, with an alternate position of the system represented by dashed lines.

Other types of prior art axle/suspension systems reduce or prevent dock walk, but still possess certain disadvantages. With reference now to FIG. 4A, one such axle/suspension system is known in the art as a parallelogram axle/suspension linkage and is indicated generally at 54. Parallelogram linkage 54 includes two vertically spaced-apart, parallel links 56, each pivotally attached at a front end 58 to hanger 18, and pivotally attached at a rear end 60 to a bracket 62, which in turn is rigidly connected to axle tube 30. A rearwardly-extending beam 64 also is rigidly connected to axle tube 30, providing a mounting area for a lower end of air spring 34.

When hanger 18 moves downwardly from the weight of a fork lift entering trailer 40, the pivotal attachment of both ends 58, 60 of each link 56 enables axle 28 to shift without the type of arcuate motion of beam 20 and the axle as seen in prior art axle/suspension system 10 (FIG. 3).

That is, the unloaded position of parallelogram linkage 54 generally is represented by dashed lines, with axle top dead-center point T being aligned with axle vertical centerline $C_V$. The pivotal connection of each link 56 at its respective front end 58 to hanger 18, and to bracket 62 at its respective rear end 60, enables parallelogram linkage 54 to shift in response to the cargo loading situation, with the new position generally indicated by solid lines. Vertical axle centerline $C_V$ and horizontal axle centerline $C_H$ each shift to new respective positions $C_V'$ and $C_H'$ without the type of arcuate motion of beam 20 and axle 28 as seen in prior art axle/suspension system 10, thus enabling axle top dead-center point T to remain at the top dead-center of the axle. Therefore, tires 48 (FIG. 3) do not rotate and dock walk is reduced or eliminated.

A primary disadvantage, however, of this type of axle/suspension system is the inherent lack of roll stability in parallelogram linkage 54 during over-the-road operation of vehicle 42. That is, heavy-duty vehicle 42 and trailer 40 must be prevented from leaning too far during events such as turning of the vehicle, lane-change maneuvers, uneven loading, shifting loads and sloped terrain. The ability of parallelogram linkage 54 to pivot at both front and rear ends 58, 60 essentially eliminates the stiffness that is needed to control lean of trailer 40.

To provide stability, an auxiliary roll bar assembly 70 must be incorporated into parallelogram linkage 54. One form of a roll bar assembly 70 includes a transverse bar 72 that extends between parallelogram linkage 54 on a driver's side of vehicle 42 and a corresponding parallelogram linkage on a curb side of the vehicle. Transverse bar 72 adds stiffness and reduces out-of-phase movement of driver's-side parallelogram linkage 54 relative to the curb-side parallelogram linkage. In roll bar assembly 70, a fore-aft extending horizontal arm 74 pivotally connects transverse bar 72 to beam 64, while a vertical arm 76 pivotally connects the transverse bar to frame brackets 78 on either side of main frame 12.

Figure 4B:
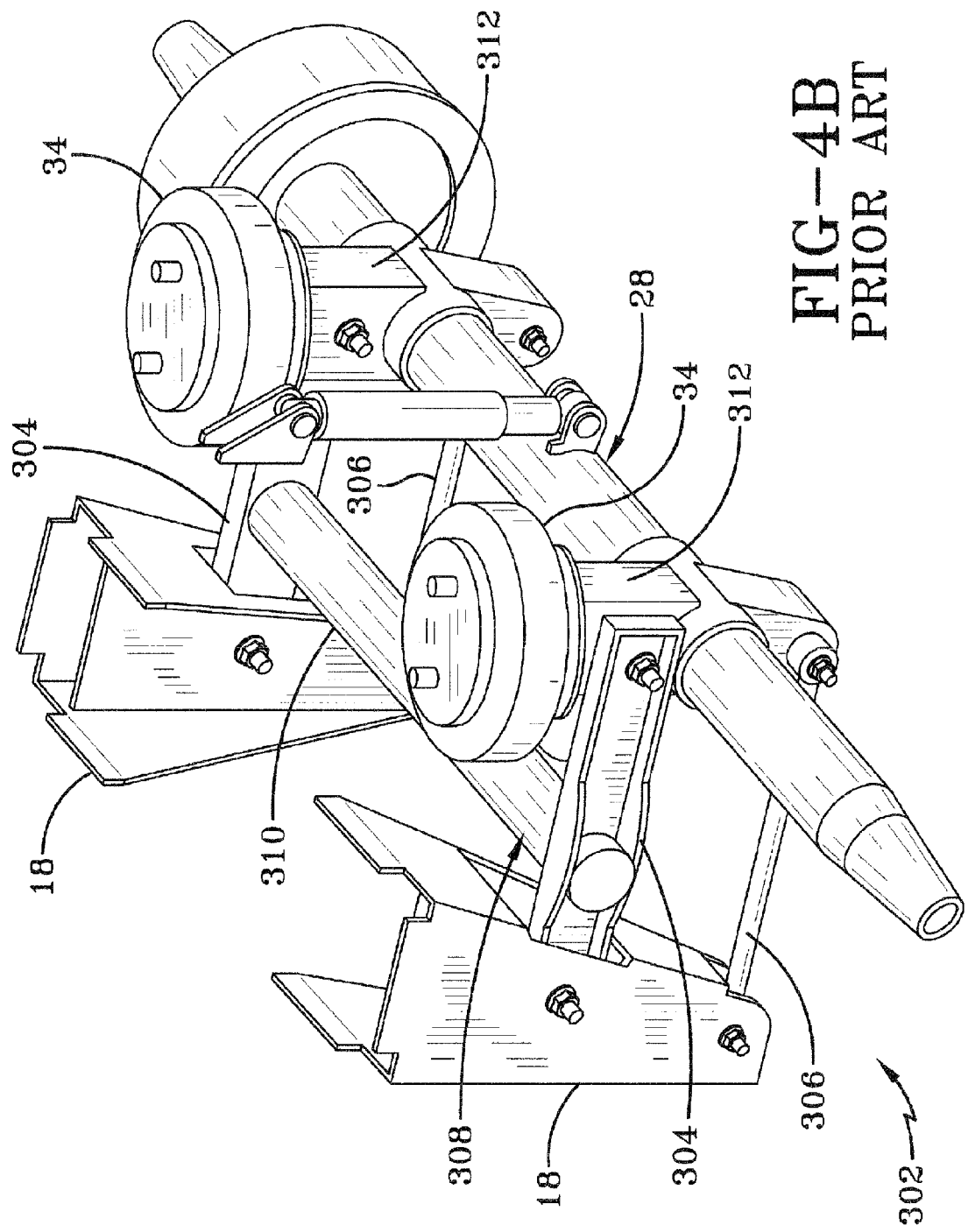
FIG. 4B is a driver's side rear top perspective view of a second prior art parallelogram linkage air-ride axle/suspension system.

Another parallelogram axle/suspension linkage is shown in FIG. 4B and is indicated generally at 302. Parallelogram linkage 302 includes upper links 304, which are vertically spaced apart from lower links 306. Upper and lower links 304, 306 are pivotally attached to hangers 18 and extend rearwardly to axle 28. A roll bar assembly 308 includes a transverse bar 310, which extends between and is interconnected with upper driver's side and curb side links 304. Alternatively, transverse bar 310 can extend between and be interconnected with air spring mounting brackets 312 or lower links 306.

In both prior art parallelogram axle/suspension linkages 54, 302, transverse bar 72, 310 enables axle 28 to move vertically, as long as the driver's side and curb side links 56, 304, 306 or air spring mounting brackets 312 move together, again reducing the out-of-phase movement that creates unstable behavior. The addition of the multiple components of auxiliary roll bar assemblies 70, 308 however, undesirably increases the weight, cost and maintenance of parallelogram linkages 54, 302.

Figure 4C:
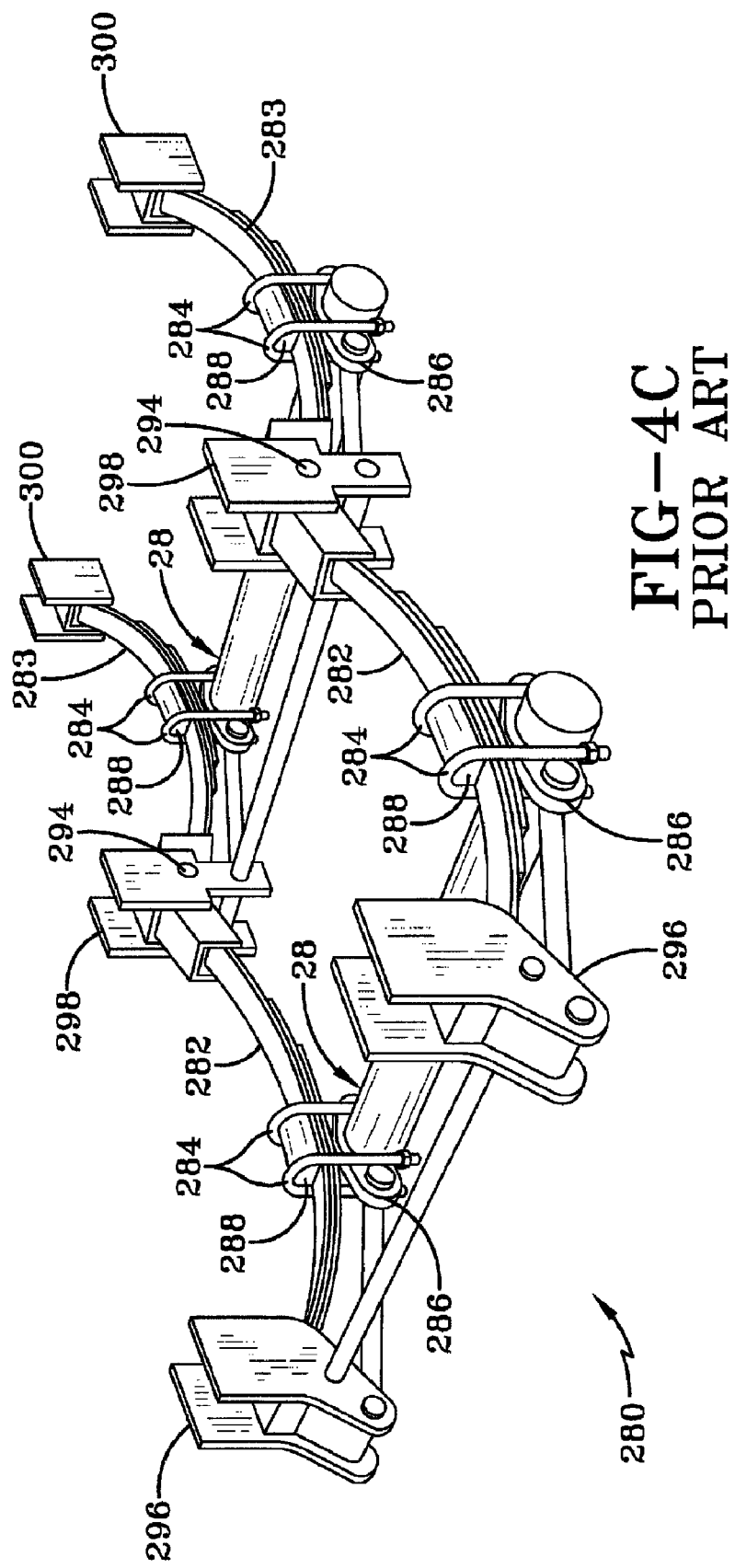
FIG. 4C is a driver's side front top perspective view of a prior art spring suspension system.

Turning now to FIG. 4C, another prior art alternative axle/suspension system, known as a mechanical spring suspension, is indicated generally at 280. Spring suspension 280 is not an air-ride system, and instead includes a pair of transversely-spaced front leaf springs 282, each one of which extends longitudinally between a front hanger 296 and a center hanger 298, and a pair of transversely-spaced rear leaf springs 283, each one of which extends longitudinally between the center hanger and a rear hanger 300. It is important to note that front and rear leaf springs 282, 283 typically rest on slipper blocks (not shown) in their respective hangers 296, 298, 300, rather than being clamped or bolted to the hangers. Each axle 28 connects to a midpoint of each corresponding spring 282, 283 with U-bolts 284, an axle seat 286 and a top block 288.

Springs 282, 283 are engineered to carry the vertical load of the vehicle, and therefore typically are stiff enough to control roll forces. The stiffness of springs 282, 283 creates a significant disadvantage for spring suspension 280, since the springs must be engineered to be stiff enough to provide vertical force resistance and thus roll stability for a fully-loaded trailer 40, which sacrifices flexibility in situations where the trailer is only lightly loaded, thereby creating an extremely harsh ride when the trailer is lightly loaded. Thus, the ride that is enabled by spring suspension 280 is considerably less than optimum.

As a result, a need has existed in the art to develop a leading or trailing arm air-ride axle/suspension system that overcomes the disadvantages of prior art systems and provides a system that can reduce or eliminate dock walk, while maintaining vehicle roll stability and a cushioned ride, with fewer components, resulting in lighter weight and lower cost.

Figure 5:
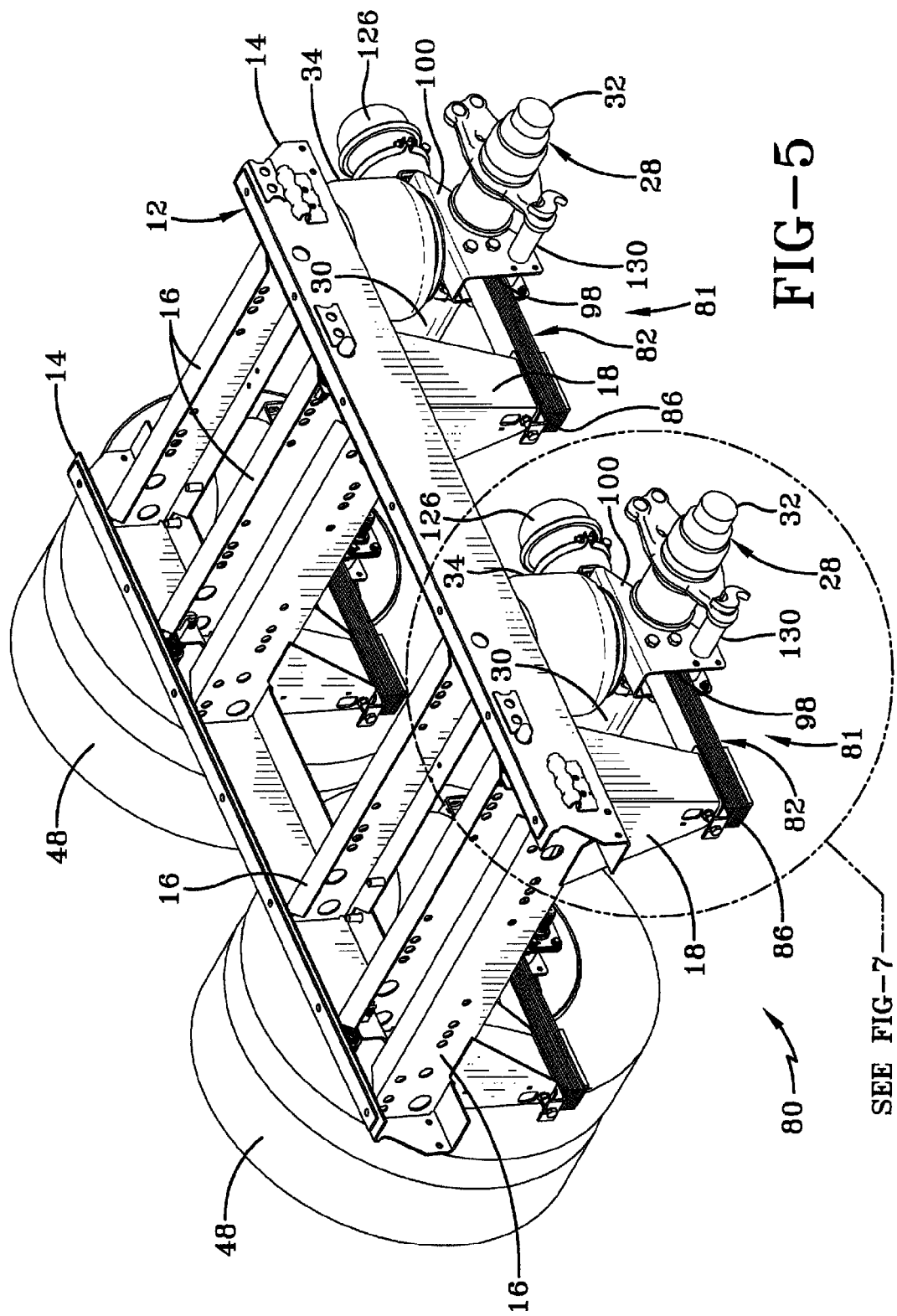
FIG. 5 is a driver's side front top perspective view of a first embodiment of the heavy-duty vehicle axle/suspension system of the present invention incorporated into a slider tandem, with passenger-side tires shown attached to the slider tandem.
Figure 6:
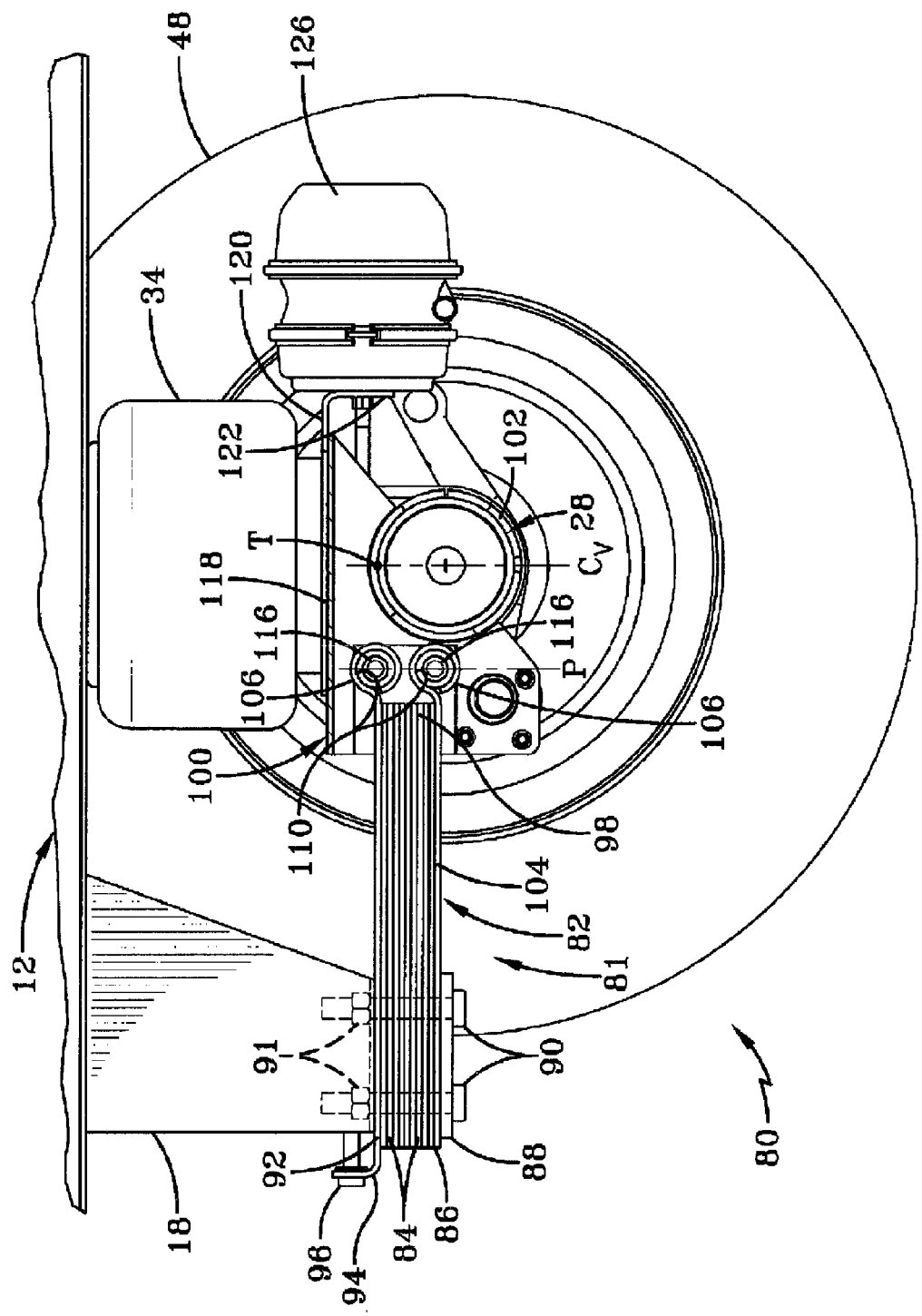
FIG. 6 is a greatly enlarged fragmentary side elevational view of a portion of the heavy-duty vehicle axle/suspension system shown in FIG. 5 in a neutral position, with certain hidden components represented by dashed lines and showing a passenger-side tire attached.
Figure 7:
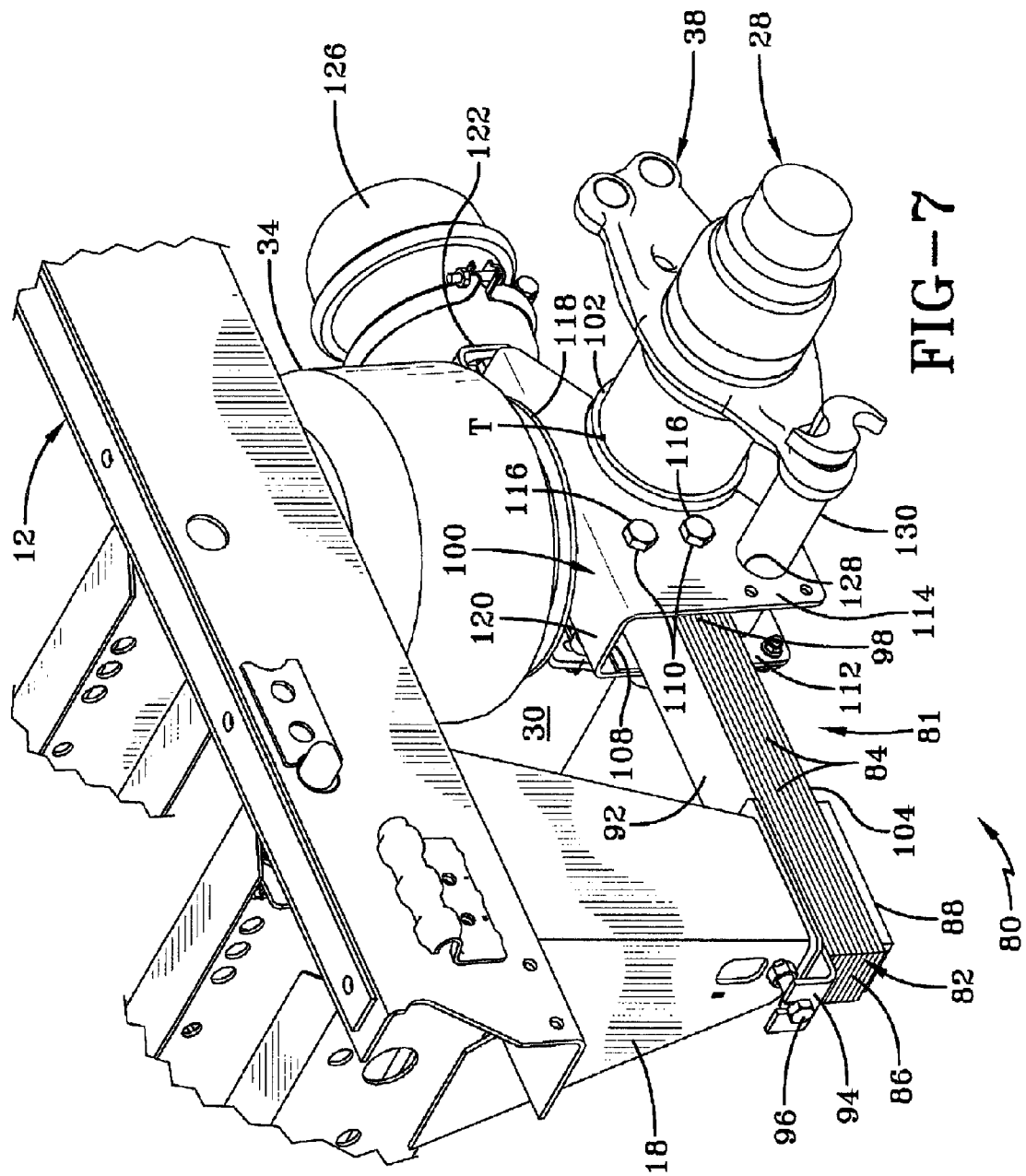
FIG. 7 is a greatly enlarged fragmentary driver's side front top perspective view of a portion of the heavy-duty vehicle axle/suspension system shown in FIG. 5 in a neutral position.

Turning now to the drawings of the present invention, wherein the illustrations are for showing preferred embodiments of the invention, and not for limiting the same, FIGS. 5-9 show a first embodiment of a heavy-duty vehicle air-ride axle/suspension system, indicated generally at 80, useful in vehicle 42. It is understood that axle/suspension system 80 includes a generally identical pair of trailing arm suspension assemblies 81, each one of which is disposed on a respective one of the driver's side and passenger side of vehicle 42. First embodiment axle/suspension system 80 is shown as a trailing arm system for the purpose of convenience, and it is to be understood that the first embodiment axle/suspension system also includes leading arm systems. Referring to FIGS. 5 and 6, first embodiment axle/suspension system 80 is shown mounted on slider box 12. Slider box 12 generally is representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, frame 12 is shown in FIGS. 5 and 7 as a slider box.

Inasmuch as each suspension assembly 81 is identical to the other, only one will be described herein. Each suspension assembly 81 of first embodiment axle/suspension system 80 includes a longitudinally-extending multi-leaf spring 82. Multi-leaf spring 82 includes a plurality of individual spring leaves 84, such as from about three to twenty leaves, which are stacked horizontally. Spring leaves 84 preferably are of the type typically used in heavy-duty vehicle leaf springs, which includes spring steel with characteristics that are engineered to meet application-specific design requirements, such as spring rate and strength, as known to those skilled in the art. Multi-leaf spring 82 includes a front end or a first attachment portion 86 that is generally rigidly secured or attached to hanger 18 under compression in a clamped fashion, as opposed to prior art systems 10, 54, 280, 302 which are secured in a pivoted fashion. It should be noted that, while hanger 18 is sometimes considered to be part of slider box 12 once it is connected to slider box main members 14 and selected ones of cross members 16, the hanger is typically engineered as part of axle/suspension system 80. Reference herein shall be made to hangers 18 as part of slider box 12 for the purpose of convenience, with the understanding that they may be engineered as part of axle/suspension system 80.

To facilitate such clamping, a securing plate 88 is aligned with hanger 18 under front end 86 of multi-leaf spring 82. Securing plate 88 then is bolted to hanger 18, with bolts 90 passing through aligned openings (not shown) formed in the securing plate, front end 86 of spring leaves 84, and the hanger, thus sandwiching or clamping multi-leaf spring 82 between the securing plate and the hanger. Bolts 90 are threaded at their upper ends and each threadably engages a selected one of a pair of tapped and threaded holes (not shown) formed in hanger 18 and/or a pair of nuts 91 seated on the hanger. This construction allows multi-leaf spring 82 to function as a clamped cantilever spring, as will be described in greater detail below.

To provide adjustment for the alignment of axle 28, one of spring leaves 84, such as a top spring leaf 92, optionally includes an integrally-formed generally L-shaped extension 94 at its front end 86. Extension 94 extends frontwardly upwardly proximate the front of hanger 18, and is movably secured to the hanger using a bolt 96, which passes through aligned openings (not shown) formed in the extension and the hanger. Before final securing of axle 28, bolt 96 is turned or adjusted to move multi-leaf spring 82 and align the axle. It is important to note that other means of securing multi-leaf spring 82 to hanger 18 in compression and aligning axle 28, as known in the art, may be used. Such means include mechanical clamps, rivets, pins, and the like.

With particular reference now to FIGS. 6 and 7, opposite front end 86 of multi-leaf spring 82 is a rear end or a second attachment portion 98. Rear end 98 of multi-leaf spring 82 connects to axle 28 via a bracket 100 and a sleeve 102. More particularly, top spring leaf 92 and a bottom spring leaf 104 each include an integrally-formed extension at their respective rear ends 98, each of which is formed into a cylindrical spring eye 106. Spring eyes 106 are vertically aligned along plane P, which is generally vertical when axle/suspension system 80 is at vehicle ride height. Rear end 98 of multi-leaf spring 82, and thus spring eyes 106, are received in a front channel 108 of bracket 100, and the spring eyes align with orifices 110 formed in opposing side walls 112 and 114 of the bracket. Securing means 116, such as bolts, pins, or the like, pass through respective aligned orifices 110 and spring eyes 106, thereby securing multi-leaf spring rear end 98 to bracket 100. As described in greater detail below, the fit between securing means 116, bracket orifices 110 and respective spring eyes 106 allows for rotation of top and bottom spring leaves 92, 104.

To secure the position of multi-leaf spring 82 relative to axle 28, bracket 100 rigidly connects to the axle. More particularly, side walls 112, 114 of bracket 100 are welded or otherwise rigidly attached to sleeve 102, which in turn receives axle tube 30 and is secured thereto by means known in the art, such as by welding, bonding or an interference fit. Alternatively, bracket 100 may be formed as an integral component with sleeve 102 or may be attached directly to axle tube 30 without using the sleeve. Also shown in FIGS. 6 and 7 is top dead-center point T of axle 28, which is aligned with vertical centerline $C_v$ of the axle.

To facilitate the mounting of air springs 34, bracket 100 includes a platform 118 formed on or as part of an upper wall 120 of the bracket. Platform 118 is located directly above axle 28. This position reduces the amount of static offset loading encountered by first embodiment axle/suspension system 80. That is, the moment arm created by the position of air spring platform 118 in first embodiment axle/suspension system 80 of the present invention, directly above axle 28, is minimal. Such minimization of this moment arm desirably reduces the forces encountered by first embodiment axle/suspension system 80. Of course, if an offset position for air spring 34 is desired due to application and design considerations, bracket 100 and platform 118 may optionally be modified to position the air spring accordingly.

Bracket 100 also includes a rear wall 122, on which other components, such as a brake air chamber 126 of brake system 38 may be mounted. Rear wall 122 allows air chamber 126 to be mounted rearwardly of and generally above axle 28, thus reducing the exposure of the air chamber to road hazards. Such reduced exposure to road hazards advantageously increases the life of air chamber 126. Bracket 100 optionally includes features, such as orifices 128, to enable components such as cam shaft 130 to be mounted to axle/suspension system 80.

Figure 8:
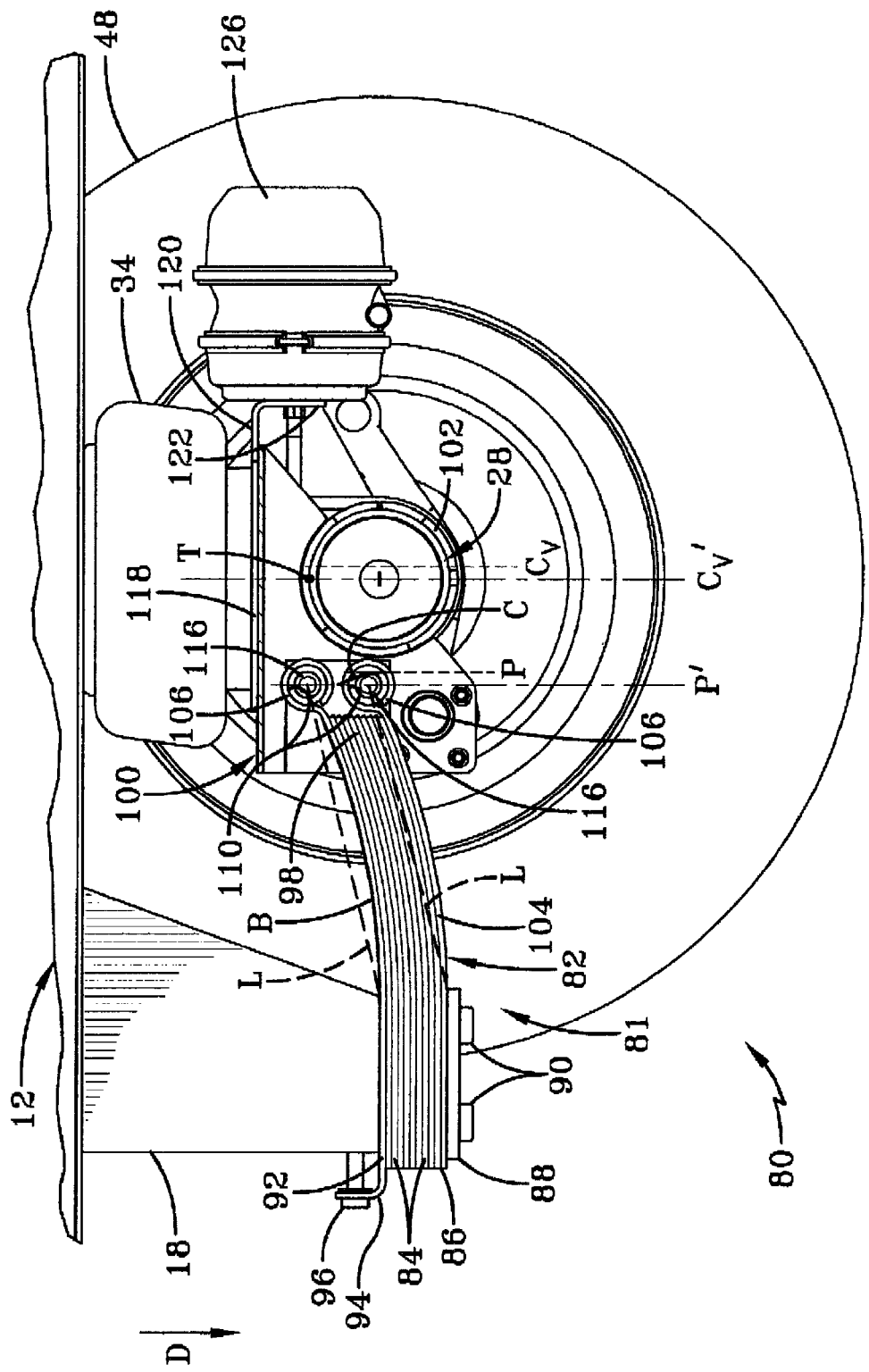
FIG. 8 is a greatly enlarged fragmentary side elevational view of the portion of the heavy-duty vehicle axle/suspension system shown in FIG. 6, but showing a representative position of the axle/suspension system after a fork lift has entered the vehicle.

Turning now to FIG. 8, the construction of multi-leaf spring 82 and its attachment to hanger 18 and axle 28 reduces or prevents the type of arcuate motion of beam 20 and the axle as seen in prior art axle/suspension system 10 (FIG. 3) when the hanger moves downwardly, thus reducing or eliminating dock walk. More particularly, as described above, when a fork lift drives into trailer 40 from a loading dock 44, hanger 18 moves downwardly as indicated by arrow D. Front end 86 of multi-leaf spring 82 is clampingly secured to hanger 18 by bolts 90 and thus moves with the hanger, while rear end 98 of the multi-leaf spring moves closer to frame 12. Spring leaves 84 each exhibit substantially identical deflection characteristics that define a predictable curvature along a locus arc, indicated generally at B, when front end 86 moves downwardly with hanger 18 and rear end 98 moves closer to frame 12. The predictable curvature along locus arc B causes rear end 98 and original plane P (represented by dashed lines) of spring eyes 106 to shift along an arc, indicated generally at C, to new plane P' in a manner that is parallel with front end 86, thereby forming a parallelogram as indicated by dashed lines L. Accordingly, original vertical centerline $C_v$ (represented by dashed lines) shifts to a new position $C_v'$ without the type of arcuate motion of beam 20 and axle 28 as seen in prior art axle/suspension system 10 (FIG. 3). Since the type of arcuate motion of prior art beam 20 and axle 28 is eliminated, axle top dead-center point T remains at the top dead-center of the axle. As a result, tires 48 do not rotate, thereby reducing or eliminating dock walk.

Figure 9:
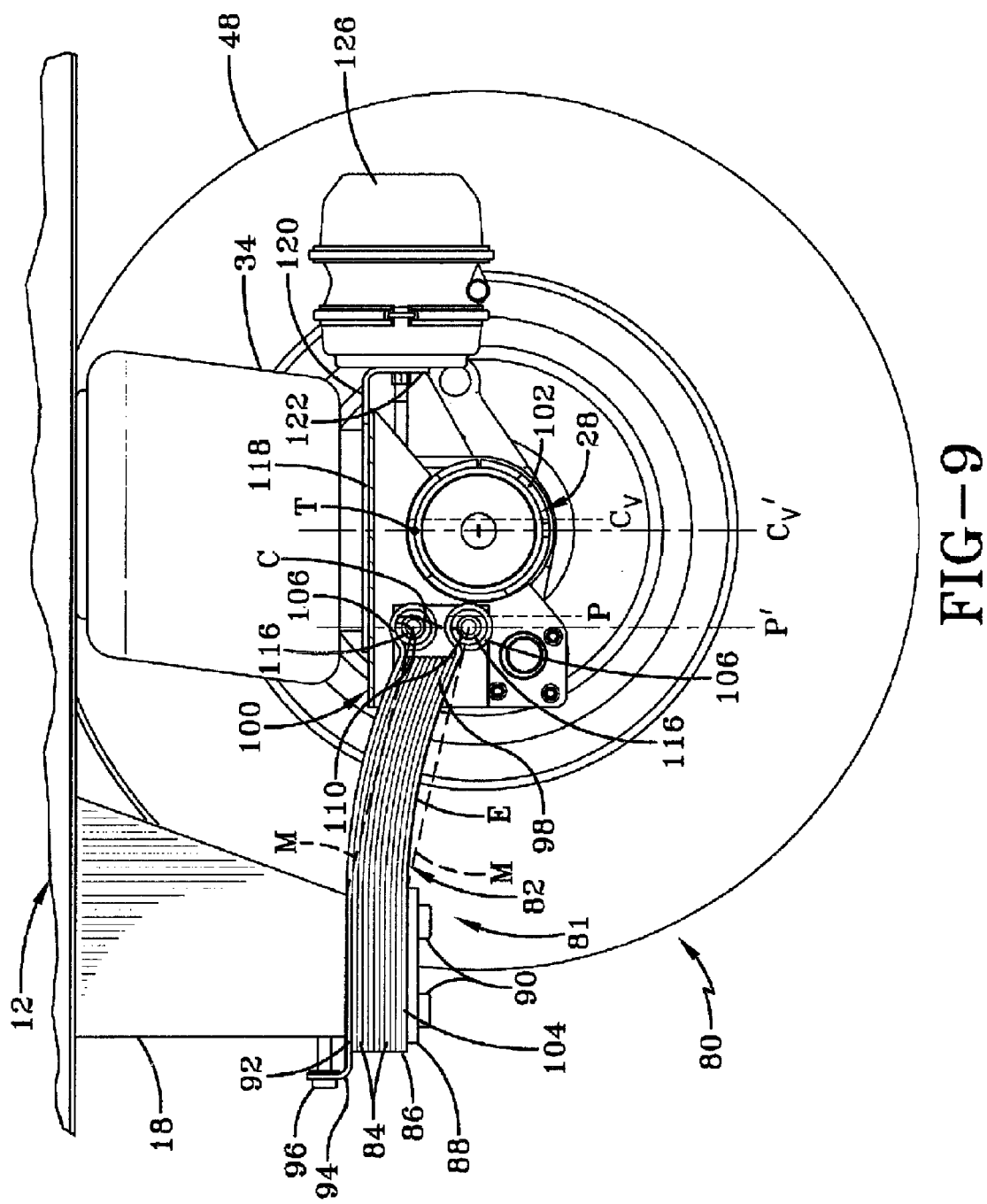
FIG. 9 is a greatly enlarged fragmentary side elevational view of the portion of the heavy-duty vehicle axle/suspension system shown in FIG. 6, but showing a representative position of the axle/suspension system after a fork lift has exited the vehicle.

As shown in FIG. 9, after the fork lift exits trailer 40, hanger 18 springs upwardly due to the combination of the sudden loss of the weight of the fork lift and the upward force of air spring 34. In prior art axle/suspension system 10, such upward spring caused beam front end 22 to move upwardly and beam rear end 26 to move in a generally arcuate motion opposite the direction of arrow U (FIG. 3). The rigid attachment of beam 20 to axle 28 potentially resulted in corresponding rearward arcuate motion of the beam and the axle. The rearward arcuate motion of beam 20 and axle 28 created a rearward rotation of tires 48, thus often causing rear end 46 of trailer 40 to strike loading dock 44.

First embodiment axle/suspension system 80 reduces or eliminates such movement. When hanger 18 moves upwardly, front end 86 of multi-leaf spring 82 moves with the hanger, while rear end 98 of the multi-leaf spring moves away from frame 12. Spring leaves 84 each exhibit substantially identical deflection characteristics that define a predictable curvature along a locus arc, indicated generally at E, when front end 86 moves upwardly with hanger 18 and rear end 98 moves away from frame 12. The predictable curvature along locus arc E causes rear end 98 and original plane P (represented by dashed lines) of spring eyes 106 to shift along arc C to new plane P' in a manner that is parallel with front end 86, thereby forming a parallelogram as indicated by dashed lines M. Accordingly, original vertical axle centerline $C_v$ (represented by dashed lines) shifts to a new position $C_v'$ without the type of arcuate motion of beam 20 and axle 28 as seen in prior art axle/suspension system 10. Since the type of arcuate motion of prior art beam 20 and axle 28 is eliminated, axle top dead-center point T remains at the top dead-center of the axle. As a result, tires 48 do not rotate rearwardly as hanger 18 moves upwardly, thereby reducing or eliminating rearward movement of trailer 40.

It is also important to note that multi-leaf spring 82 reduces undesirable significant downward movement of axle 28. For example, trailer 40 is, at times, lifted onto a rail car (not shown). With prior art air-ride axle/suspension systems 10, 54, 302, when trailer 40 is lifted, axle 28 moves downwardly until shock absorbers 36 (FIG. 1) are fully extended, which allows for a significant drop of the axle. This drop stretches air bag 66 of air spring 34, which creates a vacuum in the air bag, causing it to fold inwardly. When trailer 40 is placed onto the rail car, folded air bag 66 then is sometimes pinched within air spring 34, potentially damaging the air bag. Multi-leaf spring 82 reduces or prevents this vacuum fold-in effect, since it has a stiffness that builds resistance as the spring moves downwardly, and thereby resists significant downward movement of axle 28. This resistance to downward movement of axle 28 contributes to the potential elimination of shock absorbers 36, since the need for a positive lower stop is eliminated.

Moreover, first embodiment axle/suspension system 80 also provides roll stability. The use of multi-leaf spring 82, which is rigidly affixed at front end 86 to hanger 18 and thus trailer frame 12, generally operates like a fixed cantilever spring, with the exception that upper spring leaf 92 and lower spring leaf 104 each include spring eyes 106 at their respective rear ends 98 to produce the above-described anti-dock walk benefit. Multi-leaf spring 82 has a certain spring rate, that is, the spring is designed so that it takes a certain amount of force to deflect the spring upwardly and a certain amount of force to deflect the spring downwardly, while being neutral at vehicle ride height. In order for trailer 40 to lean or sway due to roll forces, one of driver's side or curb side axle spindles 32 (FIG. 5) must move vertically so that it is a different distance away from frame 12 than the transversely opposing curb or driver's side spindle, respectively. The forces that are required to negate this movement can be calculated, enabling spring leaves 84 to be engineered to include a spring rate that is stiff enough to control such roll or sway. Accordingly, since the stiffness of each spring leaf 84 is engineered to be neutral at ride height, air springs 34 are able to provide a soft ride, while multi-leaf springs 82 work to control sway when vehicle 42 leans.

An additional benefit of multi-leaf spring 82 being neutral at vehicle ride height, which is a term of art in the heavy-duty axle/suspension industry, is improvement of the life of axle/suspension system 80, particularly with respect to prior art spring suspension 280. More particularly, in prior art spring suspension 280, leaf springs 282, 283 (FIG. 4C) must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the leaves of the leaf springs to become damaged and/or to break.

In contrast, multi-leaf spring 82 of first embodiment axle/suspension system 80 preferably is designed to experience stresses in a lower range than prior art spring suspension 280 by being neutral, or generally unstressed, when trailer 40 is unloaded or loaded with freight and the axle/suspension system is maintaining the vehicle ride height. By being neutral at ride height for loaded trailer 40, multi-leaf springs 82 enable air springs 34 to provide optimum ride cushioning. Therefore, when loaded trailer 40 experiences impacts from traveling over-the-road, multi-leaf spring 82 experiences relatively low stresses, which reduces the fatigue on axle/suspension system 80 and extends its life.

The above-described aspects of first embodiment axle/suspension system 80 are different from prior art axle/suspension system 10, which includes a rigid structure that is designed to generally prevent movement of spindle 32 associated with roll or sway, but then uses discrete components such as bushing assembly 24 to provide a predictable amount of compliance, which enables control of roll forces. First embodiment axle/suspension system 80 also is different from parallelogram suspensions 54, 302 which pivot freely, enabling sway, but then use a discrete roll bar component 70, 308 to resist the movement associated with roll or sway. First embodiment axle/suspension system 80 is different from prior art spring suspension 280 as well, since that system utilizes stiff springs 282, 283 to resist sway, which also carry the load and are therefore too stiff to provide a cushioned ride when vehicle 42 is only lightly loaded.

There also is less side-to-side movement with first embodiment axle/suspension system 80 than with prior art systems such as parallelogram axle/suspension systems 54, 302. Using parallelogram axle/suspension system 54 as an example, each link 56 of the prior art parallelogram linkage connection requires two pivot connections, that is, four pivot connections for each of the driver's side and curb side suspensions. With one driver's side suspension 54 and one curb side suspension, there are eight total pivot connections, all of which need clearance to rotate. This clearance results in lateral movement of parallelogram axle/suspension system 54. First embodiment axle/suspension system 80, in contrast, includes only two pivoted connections per side, that is, two spring eyes 106, thereby reducing the connections, and the lateral movement associated with the clearance for such connections, by half. Then, first embodiment axle/suspension system 80 reduces lateral movement even further, since it is clamped to hanger 18, rather than being pivotally attached to the hanger, as are prior art parallelogram axle/suspension systems 54, 302. The elimination of pivotal attachments to hanger 18 in turn eliminates the angular lateral movement that necessarily accompanies a pivot connection, thereby reducing total lateral movement experienced with prior art parallelogram axle/suspension systems 54, 302 by more than half.

It should be noted that, while first embodiment axle/suspension system 80 is shown as a trailing arm suspension assembly 81, the axle/suspension system may instead include a leading arm suspension assembly, or an integrally connected leading and trailing arm suspension assembly, without affecting the overall concept or operation of the invention.

Thus, by acting as a cantilever spring that is clamped at one end, first embodiment axle/suspension system 80 reduces or eliminates dock walk without the use of additional components. Also, first embodiment axle/suspension system 80 provides roll stability without the use of additional components. Furthermore, first embodiment axle/suspension system 80 reduces lateral movement significantly and enables multi-leaf springs 82 to be neutral at ride height so that air springs 34 may provide optimum ride cushioning. As will be described in greater detail below, axle/suspension system 80 achieves further aspects of increased performance over systems of the prior art, while having reduced weight and cost, including resisting downward movement to eliminate the need for shock absorbers, enabling quicker inflation for air springs 34, providing a visual ride-height check, and enabling alignment of axle 28 using adjusting bolt 96.

Turning now to FIGS. 10-15, a second embodiment axle/suspension system of the present invention is indicated generally at 140, and also is useful in vehicle 42. Second embodiment axle/suspension system 140 is capable of handling larger brake loads than first embodiment axle/suspension system 80 and thereby finds particular application in vehicles that are likely to be exposed to greater loads than typical heavy-duty vehicles 42. More particularly, first embodiment axle/suspension system 80 (FIG. 5) includes spring eyes 106 that are relatively vertically close together and are disposed frontwardly of axle 28, and generally are intended for relatively lighter brake loads. To handle larger brake loads, second embodiment axle suspension system 140 includes spring eyes 174 and 176 that are located vertically farther apart and are vertically aligned with axle 28, as will be described below. It is to be noted that slider box 12 generally is representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, frame 12 is shown in FIGS. 10-15 as a slider box.

Figure 10:
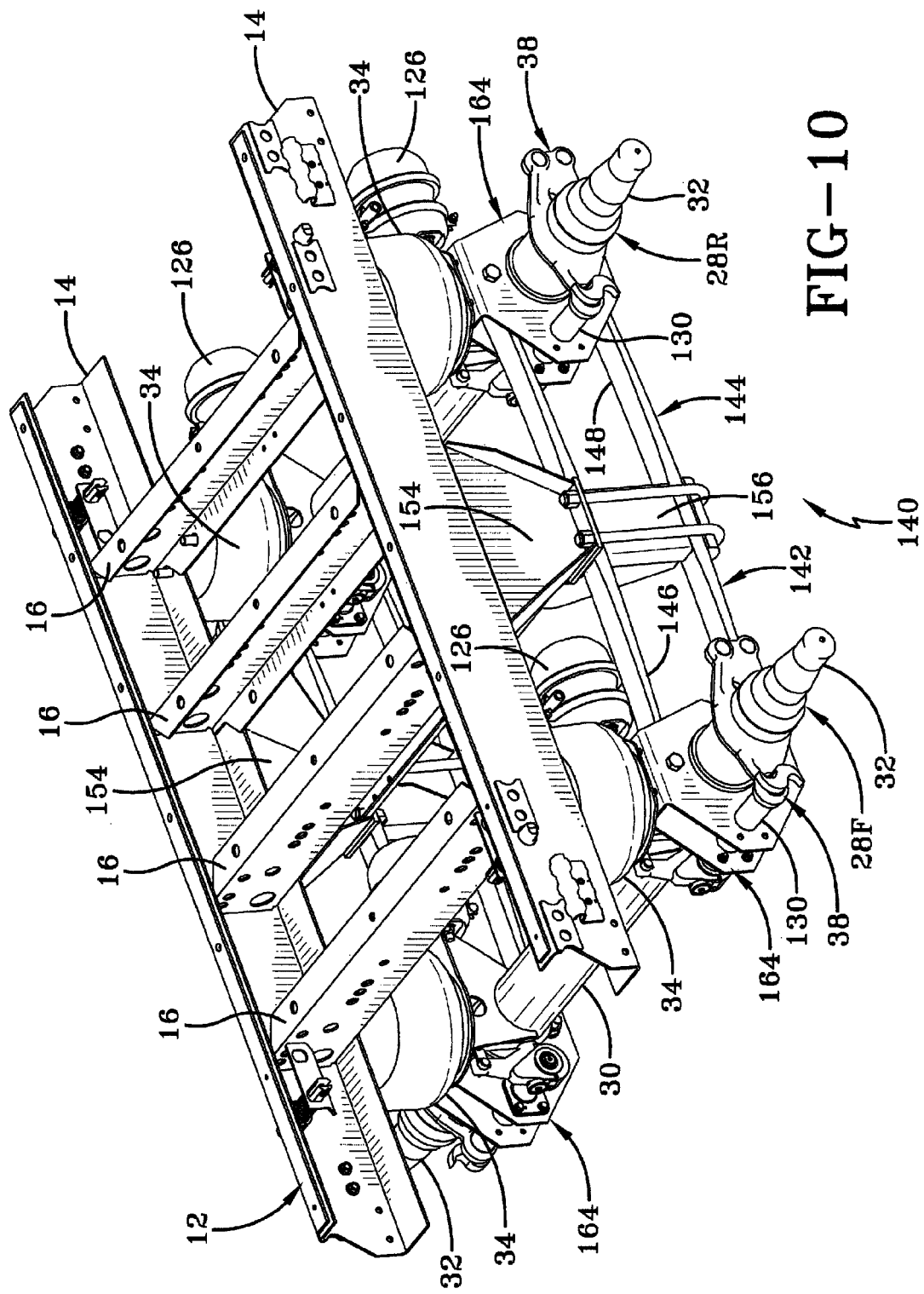
FIG. 10 is a driver's side front top perspective view of a second embodiment of the heavy-duty vehicle axle/suspension system of the present invention incorporated into a slider tandem.
Figure 11:
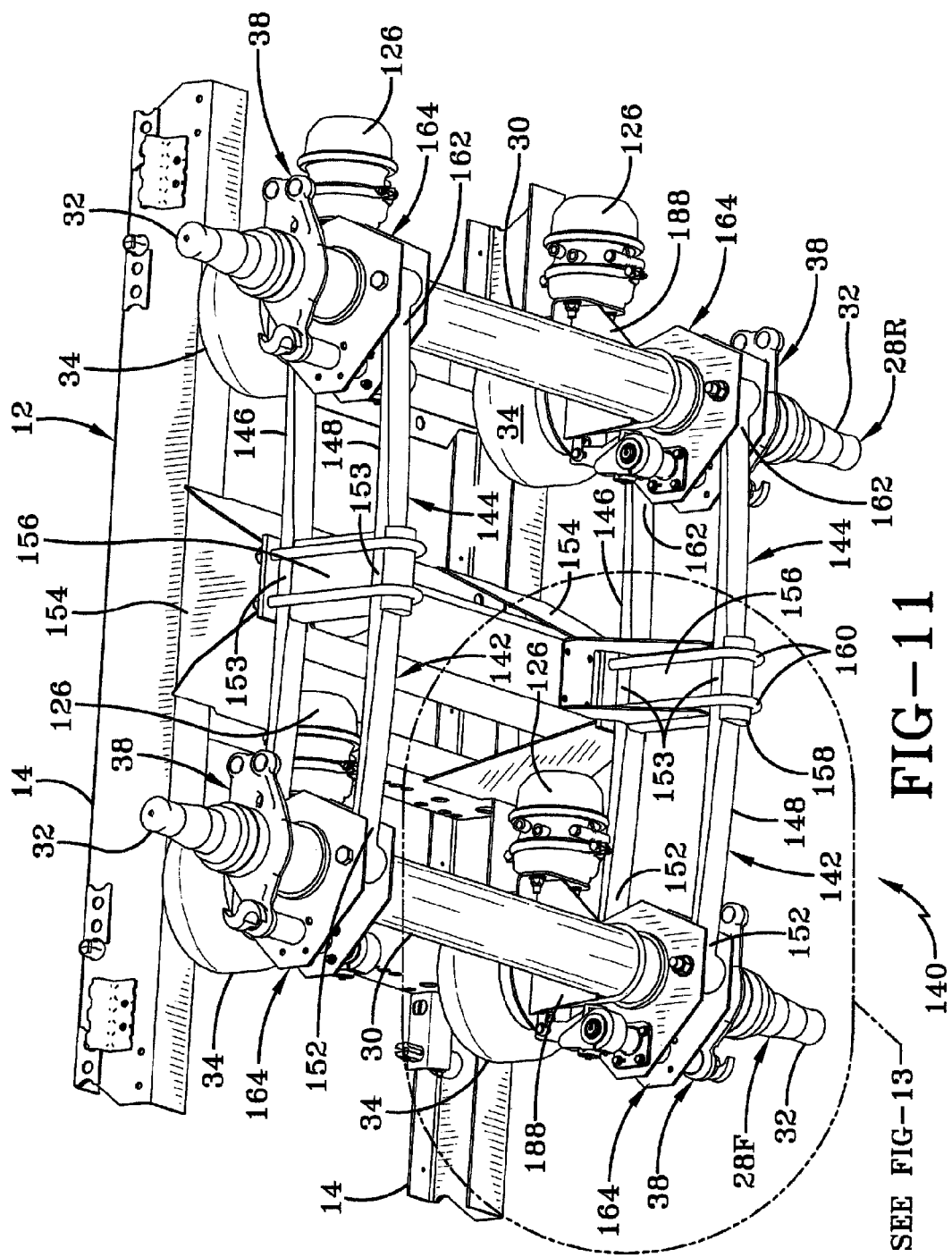
FIG. 11 is a driver's side bottom perspective view of the heavy-duty vehicle axle/suspension system shown in FIG. 10.

With particular reference now to FIGS. 10-11, second embodiment axle/suspension system 140 preferably includes a pair of leading arm suspension assemblies 142, each one of which is disposed on a respective one of the driver's side and passenger side of vehicle 42, and a pair of trailing arm suspension assemblies 144, each one of which also is disposed on a respective one of the driver's side and passenger side of the vehicle. Inasmuch as each of the driver's side suspension assemblies 142, 144 is identical to each of the passenger side suspension assemblies, only the driver's side suspension assemblies will be described herein. Of course, as with all embodiments of the present invention, axle/suspension system 140 may include only leading arm suspension assemblies 142, only trailing arm suspension assemblies 144, or integrated pairs of leading and trailing arm suspension assemblies as described herein, as specific applications dictate. While each leading arm suspension assembly 142 and trailing arm suspension assembly 144 are shown integrally connected, it should be noted that the leading arm suspension assembly is essentially a trailing arm assembly turned 180 degrees, that is, from the trailing arm position to a leading arm position. Therefore, it is understood that leading arm suspension assembly 142 and trailing arm suspension assembly 144 could be separated, creating a non-integrated system without affecting the overall concept and operation of the invention.

The principal difference between second embodiment axle/suspension system 140 and first embodiment system 80 (FIG. 5) is that multi-leaf spring 82 of the first embodiment has been split into upper and lower halves that have been moved vertically apart to reduce stresses in spring eyes 106. Upper and lower halves each include a single tapered leaf spring 146 and 148, respectively, rather than multiple spring leaves 84. Each spring 146, 148 is shared by leading and trailing arm assemblies 142, 144. Respective upper and lower spring leaves 146, 148 can be engineered through practices that are known in the art, such as parabolic tapering and the like, to exhibit the same anti-dock walk movement, roll stability, wheel-dampening characteristics, and lateral stability of multi-leaf spring 82 of first embodiment axle/suspension system 80.

Figure 12:
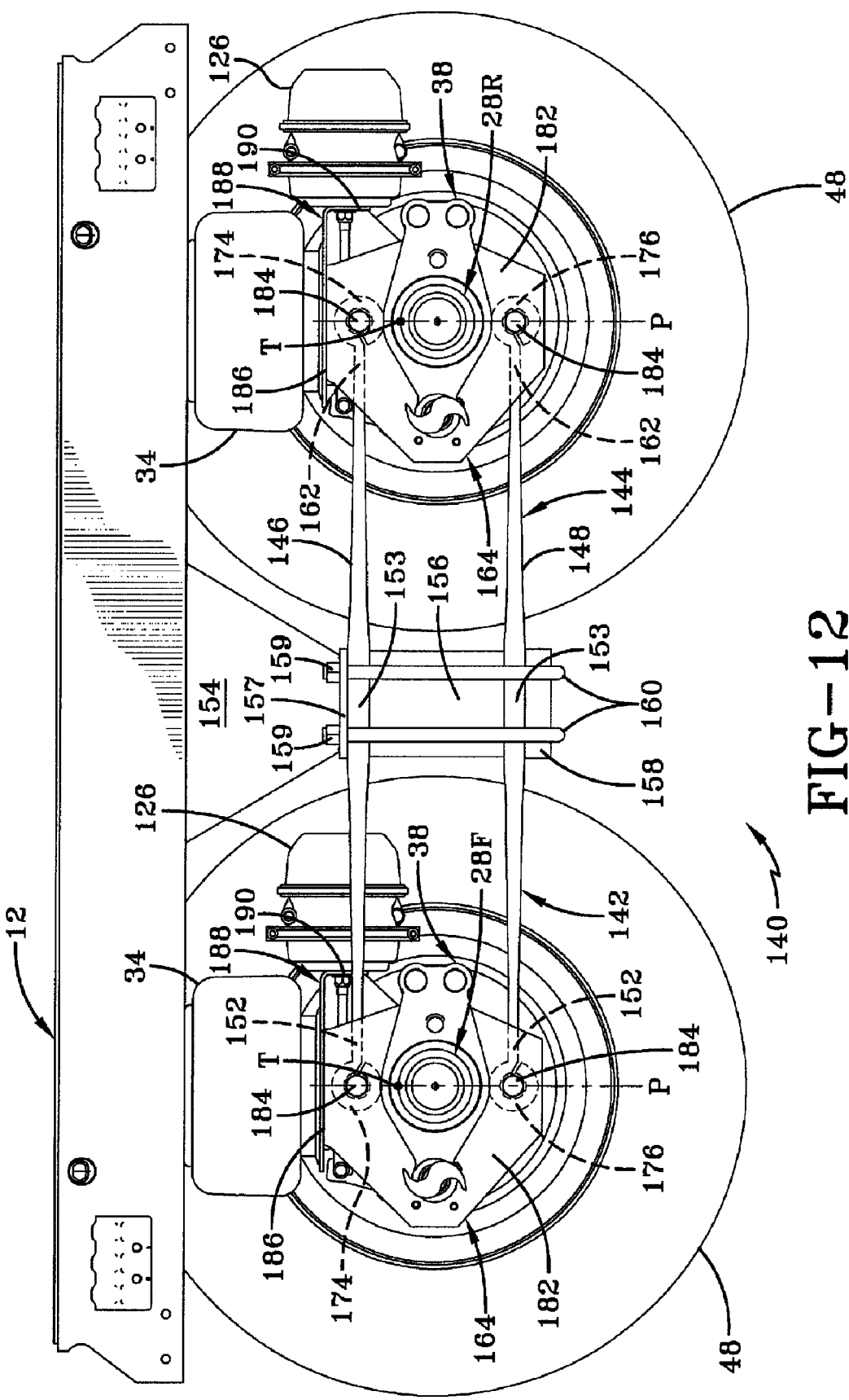
FIG. 12 is a greatly enlarged side elevational view of the heavy-duty vehicle axle/suspension system shown in FIG. 11 in a neutral position, showing passenger-side tires attached.

With reference now to FIGS. 11 and 12, spring leaves 146, 148 preferably are of the type typically used in heavy-duty leaf springs, which includes spring steel with characteristics that are engineered to meet application-specific design requirements, such as spring rate and strength, as known to those skilled in the art. Each spring leaf 146, 148 includes a front end 152 that is secured or attached to a front axle 28F, a middle point or mid-point 153 that is secured to a central frame hanger 154, and a rear end 162 that is secured to a rear axle 28R. Mid-point 153 is analogous to first attachment portion 86 of beam 82 of first embodiment axle/suspension system 80, while front and rear ends 152, 162 each are analogous to the second attachment portion 98 of the beam of the first embodiment axle/suspension system. It should be noted that, while central hanger 154 is sometimes considered to be part of slider box 12 once it is connected to slider box main members 14 and selected ones of cross members 16, the hanger is typically engineered as part of axle/suspension system 140. Reference herein shall be made to central hanger 154 as part of slider box 12 for the purpose of convenience, with the understanding that it may be engineered as part of axle/suspension system 140.

Turning to the attachment of mid-point 153 of each spring leaf 146, 148 to central frame hanger 154, each spring is generally rigidly secured to the hanger under compression in a clamped fashion, as opposed to prior art systems 10, 54, 280, 302 which are secured in a pivoted fashion. To facilitate such clamping, mid-point 153 of upper leaf 146 is aligned under central hanger 154, and a mounting plate 156 is aligned with the central hanger under the mid-point of the upper leaf. Mid-point 153 of lower leaf 148 is aligned with central hanger 154 under mounting plate 156 and a U-bolt rest 158 is aligned with the central hanger under the mid-point of the lower spring leaf. A pair of longitudinally-spaced U-bolts 160 is disposed about and captures U-bolt rest 158, mounting plate 156, and each mid-point 153 of upper and lower spring leaves 146, 148, respectively. With additional reference to FIG. 13, threaded upper ends 161 of each U-bolt 160 pass through corresponding openings 155 formed in a lower plate 157 of frame hanger 154. A pair of nuts 159 are threadably engaged with upper threaded ends 161 of each U-bolt 160, that is, four nuts for the two U-bolts, and are tightened down to secure U-bolt rest 158, mounting plate 156 and mid-point 153 of upper and lower spring leaves 146 and 148 together in compression.

This construction allows the portion of each respective upper and lower spring leaf 146, 148 extending from front end 152 to mid-point 153, i.e., leading arm suspension assembly 142, to each function as a clamped cantilever spring. Similarly, the portion of each respective upper and lower spring leaf 146, 148 extending from mid-point 153 to rear end 162, i.e., trailing arm suspension assembly 144, each function as clamped cantilever springs. Of course, other means of securing spring leaves 146, 148 to central hanger 154 in compression, as known in the art, may be used.

Figure 13:
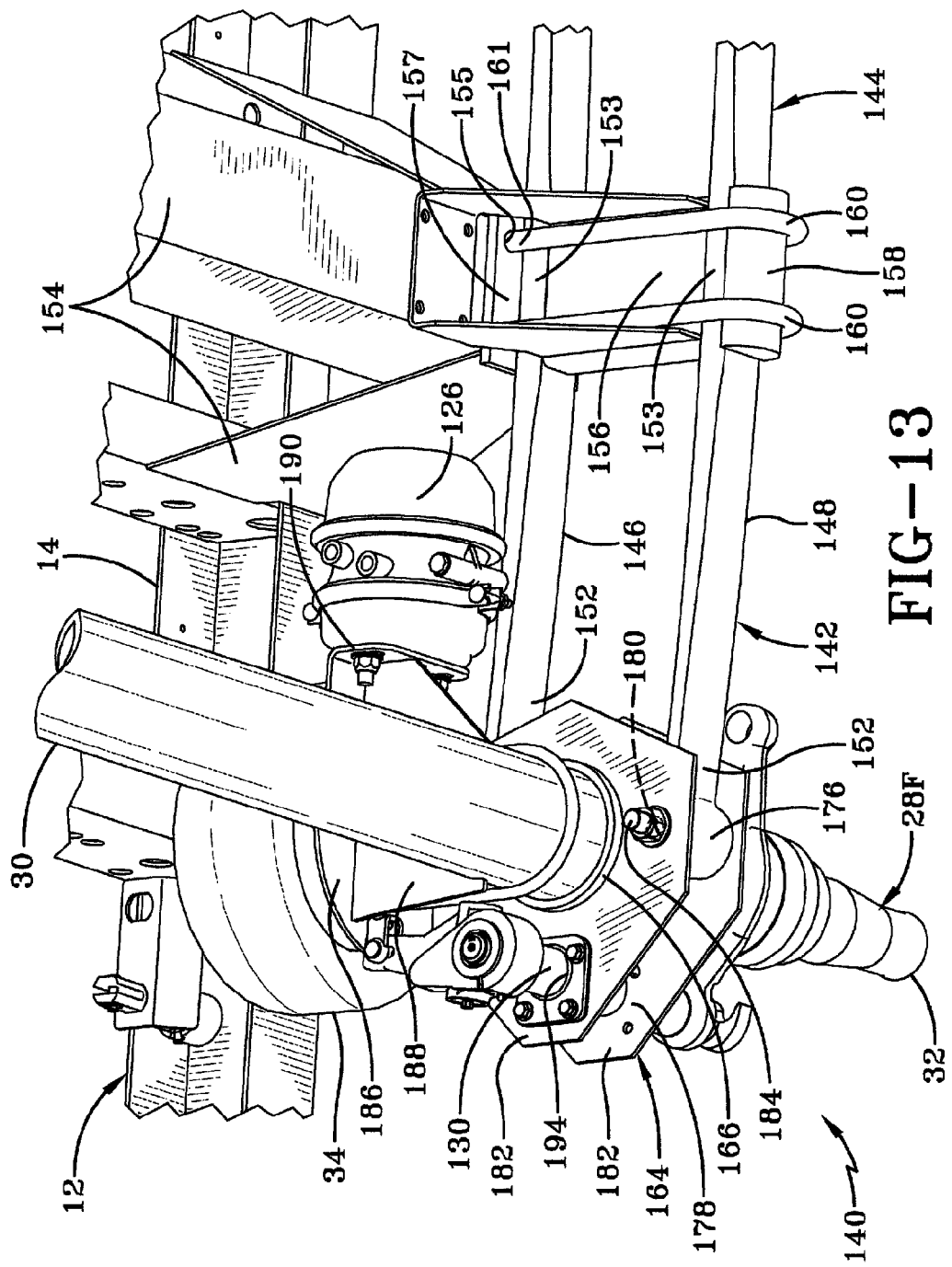
FIG. 13 is a greatly enlarged fragmentary driver's side front bottom perspective view of a front portion of the heavy-duty vehicle axle/suspension system shown in FIG. 11 in a neutral position.

Front end 152 and rear end 162 of each respective spring leaf 146, 148 connect to respective axles 28F, 28R via a bracket 164 and a sleeve 166. More particularly, each spring leaf 146, 148 includes varying thickness according to spring design methods known in the art and an extension at its respective front and rear ends 152, 162, each of which is respectively formed into corresponding upper and lower spring eyes 174, 176. With particular reference now to FIGS. 12 and 13, using leading arm assembly 142 by way of example, spring eyes 174, 176 of upper and lower spring leaves 146, 148, respectively, are received in a channel 178 of bracket 164, and the spring eyes align with orifices 180 formed in opposing side walls 182 of the bracket, which preferably are vertically aligned with a vertical centerline of axle 28 along plane P (FIG. 12). Securing means 184, such as bolts, pins, or the like, pass through respective aligned orifices 182 and spring eyes 174, 176, thereby securing upper and lower spring leaves 146, 148 to their respective bracket 164. The fit between securing means 184, bracket orifices 180 and respective spring eyes 174, 176 allows for rotation of front and rear ends 152, 162 of upper and lower spring leaves 146, 148.

As with first embodiment 80, each bracket 164 of second embodiment axle/suspension system 140 is rigidly connected to each respective axle 28F, 28R. More particularly, with continuing reference to FIG. 13 by way of example, side walls 182 of bracket 164 are welded or otherwise attached to sleeve 166, which receives axle tube 30 of axle 28F and in turn is secured thereto by means known in the art, such as by welding, bonding or an interference fit. Alternatively, bracket 164 may be formed as an integral component with sleeve 166 or may be attached directly to axle tube 30 without using the sleeve.

Second embodiment 140 facilitates the mounting of air springs 34 with a platform 186 formed on a mounting appendage 188. Mounting appendage 188 preferably is a structure that is joined to bracket 164 via bolts, welding or the like, or alternatively, is formed as an integral part of the bracket. Mounting appendage 188 locates platform 186 above sleeve 166, thereby positioning air spring 34 directly over axle 28, as shown in FIG. 12. As in first embodiment axle/suspension system 80, this position of platform 186 in second embodiment axle/suspension system 140 reduces the amount of static offset loading encountered by the system, in turn reducing the forces encountered by the system. Of course, if an offset position for air spring 34 is desired due to application and design considerations, mounting appendage 188 and platform 186 optionally may be modified to position the air spring accordingly.

As shown in FIG. 13, mounting appendage 188 also includes a rear wall 190, allowing brake air chamber 126 to be mounted thereto. Rear wall 190 allows air chamber 126 of brake system 38 to be mounted rearwardly of and generally above axle 28, thus reducing the exposure of the air chamber to some road hazards, thereby increasing the life of the air chamber. Bracket 164 optionally includes further mounting features, such as orifices 194, to allow components such as cam shaft 130 of brake system 38 to be mounted to axle/suspension system 140.

Figure 14:
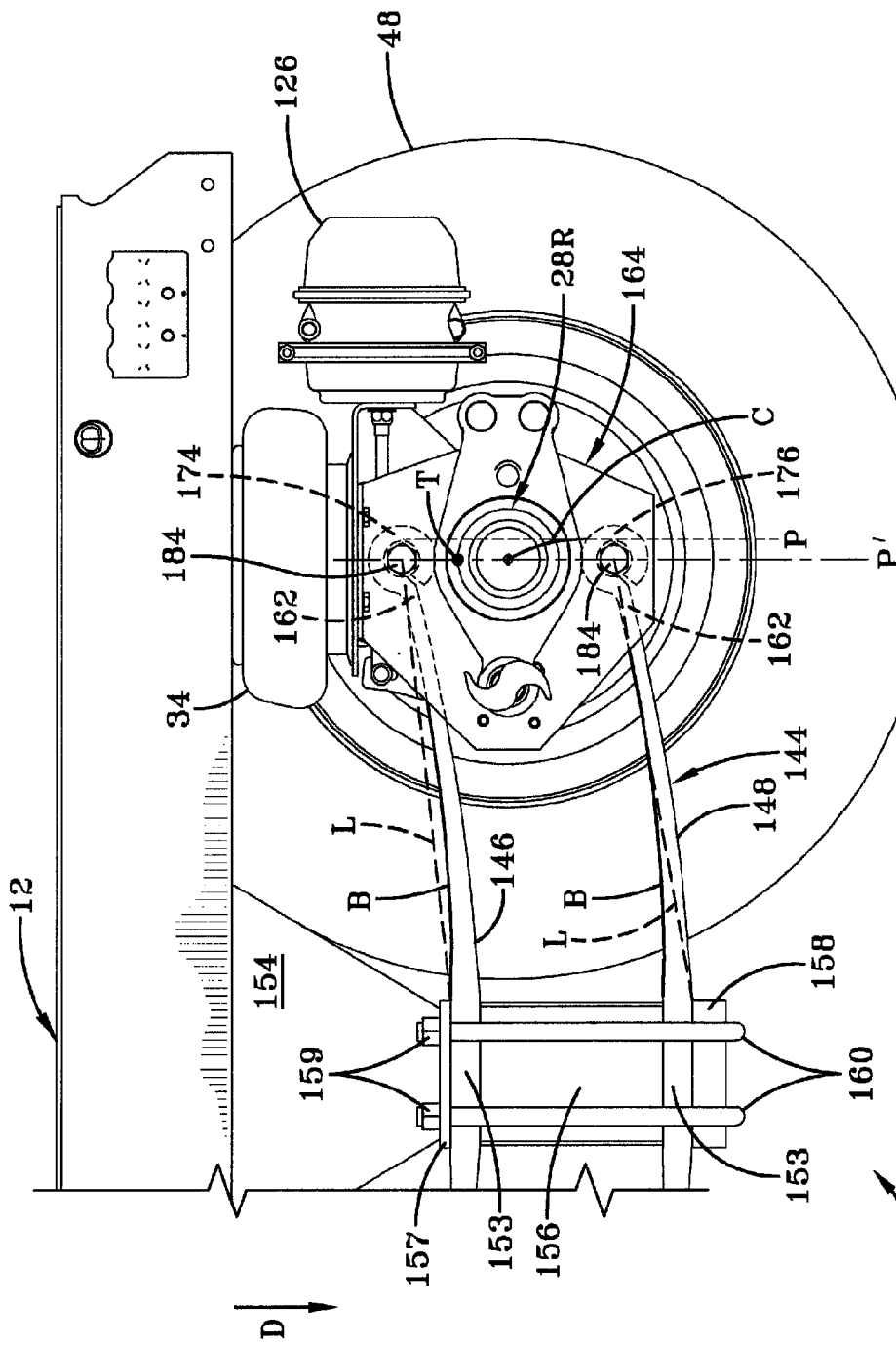
FIG. 14 is a greatly enlarged fragmentary side elevational view of a rear portion of the heavy-duty vehicle axle/suspension system shown in FIG. 12, but showing a representative position of the axle/suspension system after a fork lift has entered the vehicle.

Turning now to FIG. 14, using trailing arm suspension assembly 144 for the purpose of illustration, reference herein will be made in singular form to common features and components of leading and trailing arm suspension assemblies 142, 144. The construction of upper and lower spring leaves 146, 148 and their respective attachments to central hanger 154 and axle 28R minimizes or prevents the type of arcuate motion of beam 20 and the axle as seen in prior art axle/suspension system 10 (FIG. 3) when the central hanger moves downwardly, reducing or eliminating dock walk. More particularly, as described above, when a fork lift drives into trailer 40, hanger 154 moves downwardly as indicated by arrow D.

Mid-point 153 of each leaf spring 146, 148 is secured to central hanger 154 by U-bolts 160 and each mid-point thus moves with the hanger, while rear end 162 of each leaf spring moves closer to frame 12. Spring leaves 146, 148 each exhibit substantially identical deflection characteristics that define a predictable curvature along locus arc B when each respective mid-point 153 moves downwardly with hanger 154 and each rear end 162 moves closer to frame 12. The predictable curvature along locus arc B causes rear end 162 and original plane P (represented by dashed lines) of spring eyes 174, 176 to shift along arc C to new plane P' in a manner that is parallel with mid-point 153 of leaves 146, 148, thereby forming a parallelogram as indicated by dashed lines L. Since the vertical centerline of axle 28R is along plane P, it also shifts to plane P', without the type of arcuate motion of beam 20 and the axle as seen in prior art axle/suspension system 10 (FIG. 3). Since the type of arcuate motion of prior art beam 20 and axle 28 is eliminated, axle top dead-center point T remains at the top dead-center of the axle. As a result, tires 48 do not rotate as hanger 18 moves downwardly, thereby reducing or eliminating dock walk.

Figure 15:
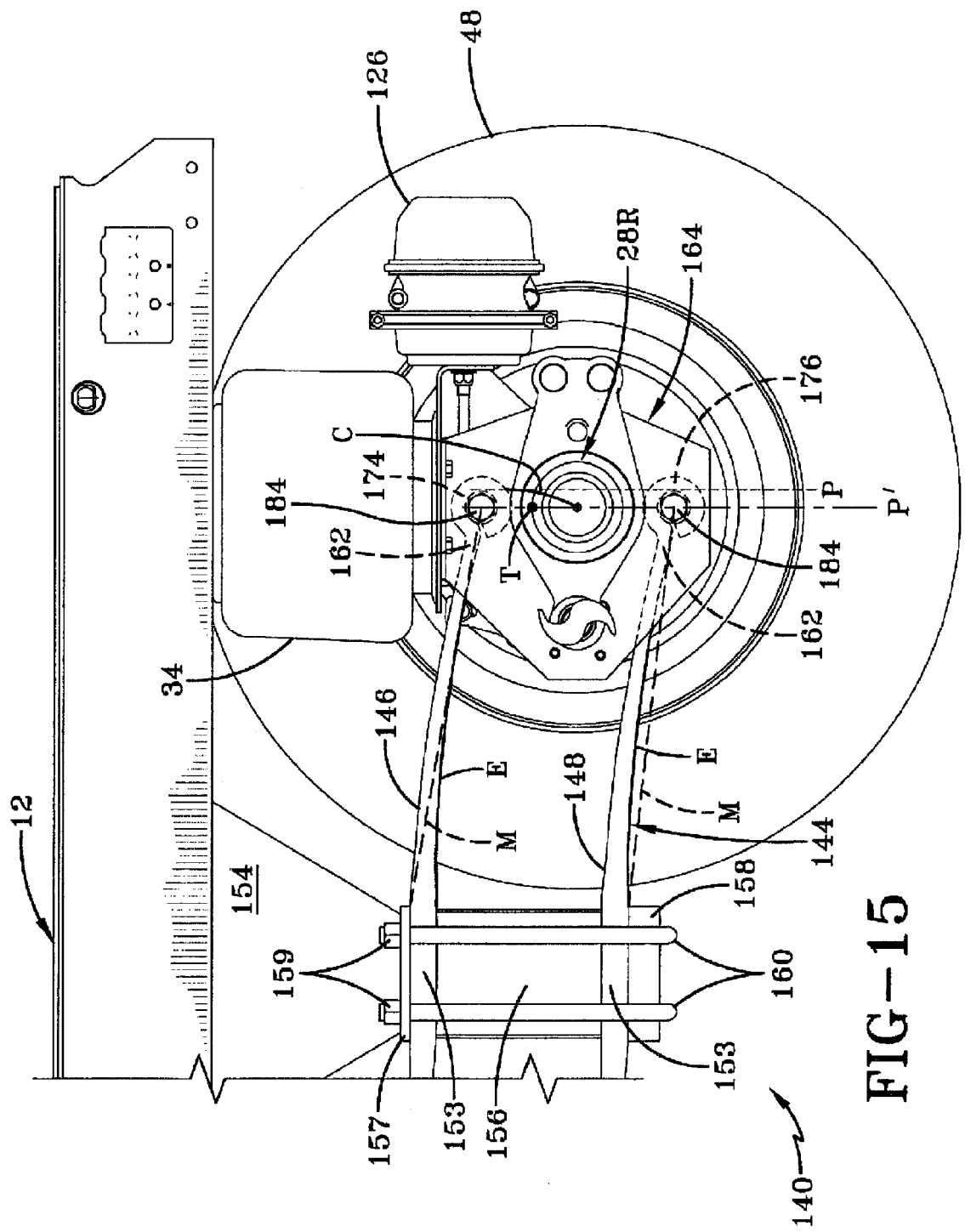
FIG. 15 is a greatly enlarged fragmentary side elevational view of a rear portion of the heavy-duty vehicle axle/suspension system shown in FIG. 12, but showing a representative position of the axle/suspension system after a fork lift has exited the vehicle.

As shown in FIG. 15, after the fork lift exits trailer 40, central frame hanger 154 springs upwardly due to the combination of the sudden loss of the weight of the fork lift and the upward force of air spring 34. As described above, this upward movement caused prior art axle/suspension system 10 to impose a rearward arcuate motion beam 20 and axle 28 (FIG. 3), causing a rearward rotation of tires 48 so that rear end 46 of vehicle 42 could possibly strike loading dock 44.

Again using trailing arm suspension assembly 144 for the purpose of illustration, second embodiment axle/suspension system 140 reduces or eliminates such movement, since when hanger 154 moves upwardly, mid-point 153 of each respective leaf spring 146, 148 moves upwardly with the hanger, while rear end 162 of each leaf spring moves away from frame 12. Spring leaves 146, 148 each exhibit substantially identical deflection characteristics that define a predictable curvature along locus arc E when each mid-point 153 moves upwardly with hanger 18 and each rear end 162 moves away from frame 12. The predictable curvature along locus arc E causes each rear end 162 and original plane P (represented by dashed lines) of spring eyes 174, 176 to shift along arc C to new plane P' in a manner that is parallel with each mid-point 153, thereby forming a parallelogram as indicated by dashed lines M. Since the vertical centerline of axle 28R is along plane P, it also shifts to plane P', without the type of arcuate motion of beam 20 and the axle as seen in prior art axle/suspension system 10 (FIG. 3). Since the type of arcuate motion of beam 20 and axle 28 is eliminated, axle top dead-center point T remains at the top dead-center of the axle. As a result, tires 48 do not rotate rearwardly as hanger 154 moves upwardly, thereby reducing or eliminating rearward movement of trailer 40.

It is to be noted that leading arm suspension assembly 142 functions in the same manner as that described above for trailing arm suspension assembly 144. That is, mid-point 153 of each respective upper and lower leaf spring 146, 148 is clampingly secured to central hanger 154 and moves with the hanger, while front end 152 of each respective leaf spring moves in a manner that reduces or eliminates the type of arcuate motion of prior art beam 20 and axle 28 as seen in prior art axle/suspension system 10 (FIG. 3), and thus reduces or eliminates the undesirable rotation of tires 48.

It is also important to note that leaf springs 146, 148 reduce undesirable significant downward movement of axles 28F and 28R. As described above, trailer 40 is sometimes lifted onto a rail car (not shown). With prior art air-ride axle/suspension systems 10, 54, 302, when trailer 40 is lifted, axles 28F and 28R move downwardly until shock absorbers 36 (FIG. 1) are fully extended, which allows for a significant drop of the axles. This drop stretches air bag 66 of each respective air spring 34, which creates a vacuum in the air bag, causing it to fold inwardly. When trailer 40 is placed onto the rail car, folded air bag 66 then is sometimes pinched within air spring 34, potentially damaging the air bag. Spring leaves 146, 148 reduce or prevent this vacuum fold-in effect, since they have a stiffness that builds resistance as the springs move downwardly, and thereby resist significant downward movement of axles 28F and 28R. This resistance to downward movement of axles 28F and 28R contributes to the potential elimination of shock absorbers 36, since the need for a positive lower stop is eliminated.

Moreover, second embodiment axle/suspension system 140 also provides roll stability. The use of leaf springs 146, 148, which are rigidly affixed at their respective mid-points 153 to central hanger 154 and thus trailer frame 12, generally operate like fixed cantilever springs, with the exception that the leaf springs each include spring eyes 174, 176 at their respective first and second ends 152, 162 to produce the above-described anti-dock walk benefit. That is, a leading arm cantilever spring 146, 148 exists for front axle 28F, and a trailing arm cantilever spring exists for rear axle 28R. Each leaf spring 146, 148 has a certain spring rate, that is, each spring is designed so that it takes a certain amount of force to deflect the spring upwardly and a certain amount of force to deflect the spring downwardly, while being neutral at vehicle ride height. In order for trailer 40 to lean or sway due to roll forces, one of driver's side or curb side axle spindles 32 (FIG. 10) must move vertically so that it is a different distance away from frame 12 than the transversely opposing curb or driver's side spindle, respectively. The forces that are required to negate this movement can be calculated, enabling spring leaves 146, 148 to be engineered to include a spring rate that is stiff enough to control such roll or sway. Accordingly, since the stiffness of each leaf spring 146, 148 is engineered to be neutral at ride height, air springs 34 are able to provide a soft ride, while the leaf springs work to control sway when vehicle 42 leans.

An additional benefit of leaf springs 146, 148 being neutral at vehicle ride height, which is a term of art in the heavy-duty axle/suspension industry, is improvement of the life of axle/suspension system 140, particularly with respect to prior art spring suspension 280. More particularly, in prior art spring suspension 280, leaf springs 282, 283 (FIG. 4C) must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the leaves of the leaf springs to become damaged and/or to break.

In contrast, leaf springs 146, 148 of second embodiment axle/suspension system 140 preferably are designed to experience stresses in a lower range than prior art spring suspension 280 by being neutral, or generally unstressed, when trailer 40 is unloaded or loaded with freight and the axle/suspension system is maintaining the vehicle ride height. By being neutral at ride height for loaded trailer 40, leaf springs 146, 148 enable air springs 34 to provide optimum ride cushioning. Therefore, when loaded trailer 40 experiences impacts from traveling over-the-road, leaf springs 146, 148 experience relatively low stresses, which reduces the fatigue on axle/suspension system 140 and extends its life.

The above-described aspects of second embodiment axle/suspension system 140 are different from prior art axle/suspension system 10, which includes a rigid structure that is designed to generally prevent movement of spindle 32 associated with roll or sway, but then uses discrete components such as bushing assembly 24 to provide a predictable amount of compliance, which enables control of roll forces. Second embodiment axle/suspension system 140 also is different from parallelogram suspensions 54, 302 which pivot freely, enabling sway, but then use a discrete roll bar component 70, 308 to resist the movement associated with roll or sway. Second embodiment axle/suspension system 140 is different from prior art spring suspension 280 as well, since that system utilizes stiff springs 282, 283 to resist sway, which also carry the load and are therefore too stiff to provide a cushioned ride when vehicle 42 is only lightly loaded.

In addition, there is less side-to-side movement of second embodiment axle/suspension system 140 than with prior art systems such as parallelogram axle/suspension systems 54, 302 (FIGS. 4A, 4B). Using parallelogram axle/suspension system 54 as an example, each link 56 of the prior art parallelogram linkage connection requires two pivot connections, that is, four pivot connections for each of the driver's side and curb side suspension assemblies. With one driver's side suspension 54 and one curb side suspension, there are eight total pivot connections, all of which need clearance to rotate. This clearance results in lateral movement of parallelogram axle/suspension system 54. Second embodiment axle/suspension system 140, in contrast, includes only two pivoted connections, that is, two spring eyes 174, 176, for each respective leading or trailing arm suspension assembly 142, 144 per side, thereby reducing the connections, and the lateral movement associated with the clearance for such connections, by half. Then, second embodiment axle/suspension system 140 reduces lateral movement even further, since it is clamped to hanger 154, rather than pivotally attached to the hanger, as are prior art parallelogram axle/suspension systems 54, 302. The elimination of pivotal attachments to hanger 18 in turn eliminates the angular lateral movement that necessarily accompanies a pivot connection, thereby reducing the total lateral movement experienced with prior art parallelogram axle/suspension systems 54, 302 by more than half.

Thus, by acting as a cantilever spring that is clamped at one end, second embodiment axle/suspension system 140 reduces or eliminates dock walk without the use of additional components. Also, second embodiment axle/suspension system 140 provides roll stability without the use of additional components and distributes brake forces, including larger brake forces, more efficiently. Furthermore, second embodiment axle/suspension system 140 reduces lateral movement significantly and enables leaf springs 146, 148 to be neutral at ride height so that air springs 34 may provide optimum ride cushioning. As will be described in greater detail below, axle/suspension system 140 achieves further aspects of increased performance over systems of the prior art, while having reduced weight and cost, including resisting downward movement to eliminate the need for shock absorbers, enabling quicker inflation for air springs 34, and providing a visual ride-height check.

Turning now to FIGS. 16-19, a third embodiment of an axle/suspension system of the present invention is indicated generally at 240, and is useful in vehicle 42. Third embodiment axle/suspension system 240 generally is the same in structure and operation as second embodiment axle/suspension system 140, with the exception that the third embodiment axle/suspension system eliminates sleeve 166 for the connection of each spring leaf 146, 148 to axles 28F, 28R. As a result, only the differences between third embodiment axle/suspension system 240 and second embodiment axle/suspension system 140 now will be described in detail.

Figure 16:
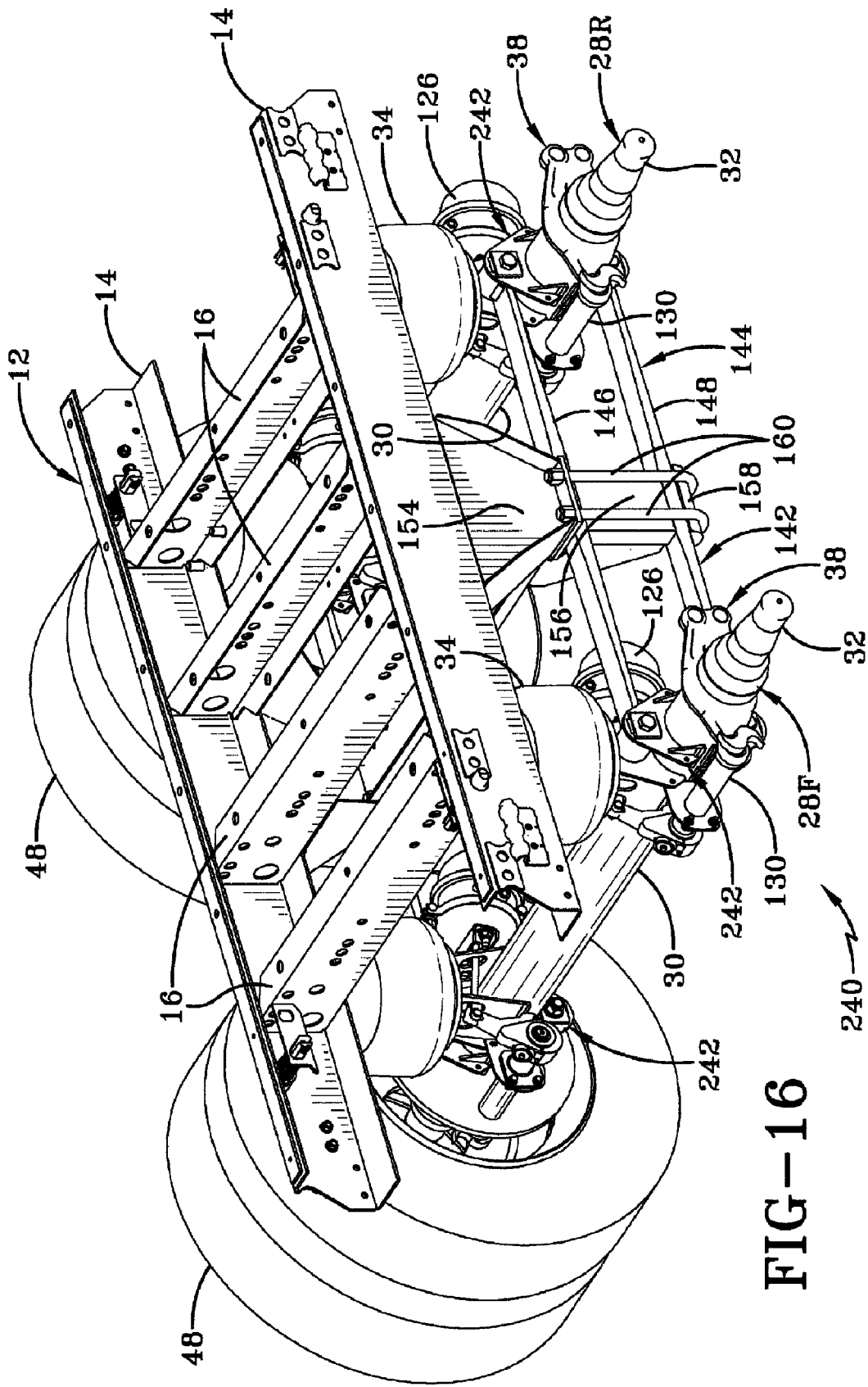
FIG. 16 is a driver's side front top perspective view of a third embodiment of the heavy-duty vehicle axle/suspension system of the present invention incorporated into a slider tandem, showing passenger side tires attached.
Figure 17:
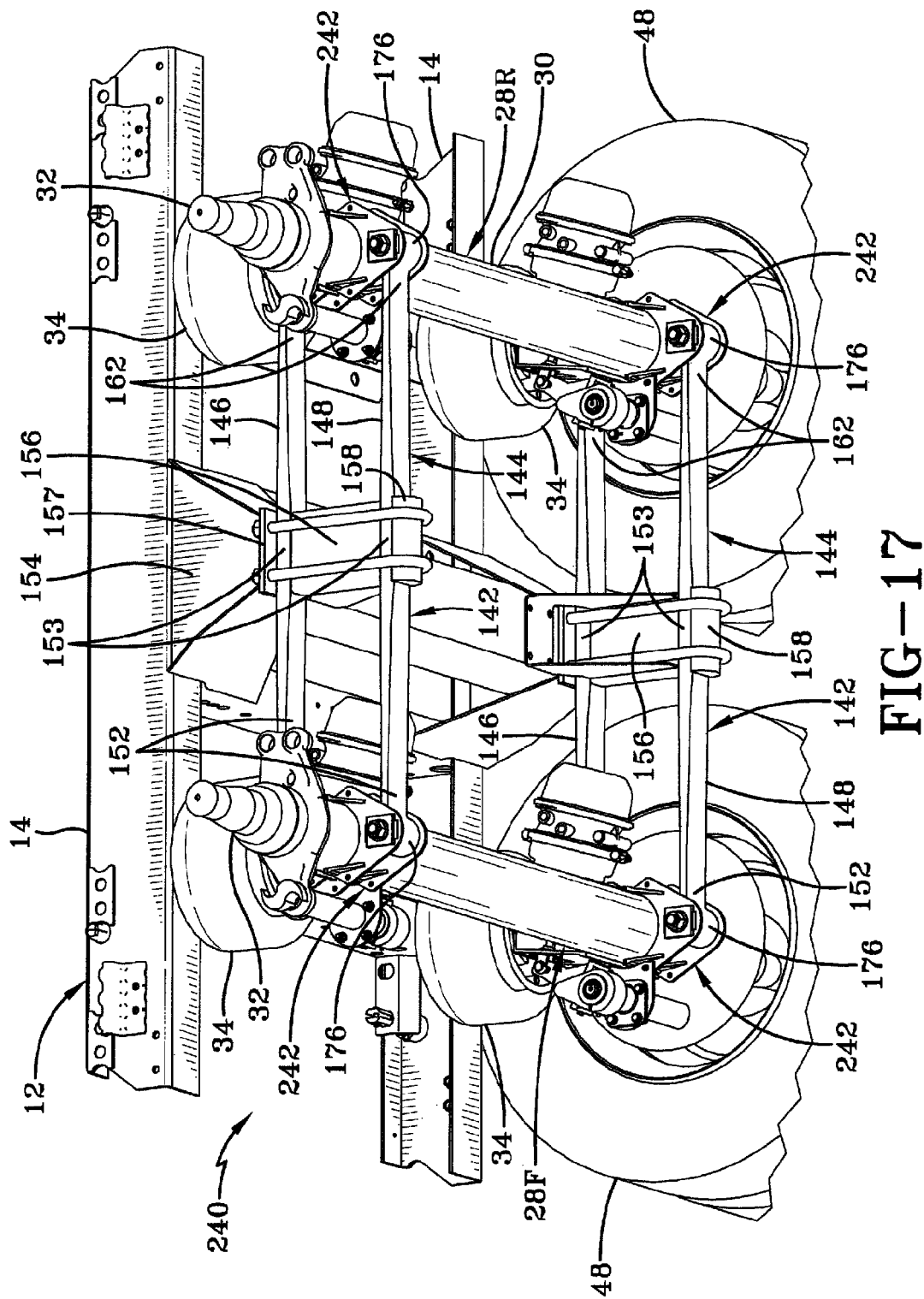
FIG. 17 is a driver's side front bottom perspective view of the heavy-duty vehicle axle/suspension system shown in FIG. 16.

With particular reference to FIGS. 16 and 17, third embodiment axle/suspension system 240 includes upper and lower spring leaves 146, 148, respectively. Each spring leaf 146, 148 includes a front end 152 that is secured to a front axle 28F, a middle point or mid-point 153 that is generally rigidly secured or attached to a central frame hanger 154 under compression in a clamped fashion as described above, and a rear end 162 that is secured to a rear axle 28R. Front end 152 and rear end 162 of each respective spring leaf 146, 148 connect to respective axles 28F, 28R via a bracket assembly 242.

Figure 18:
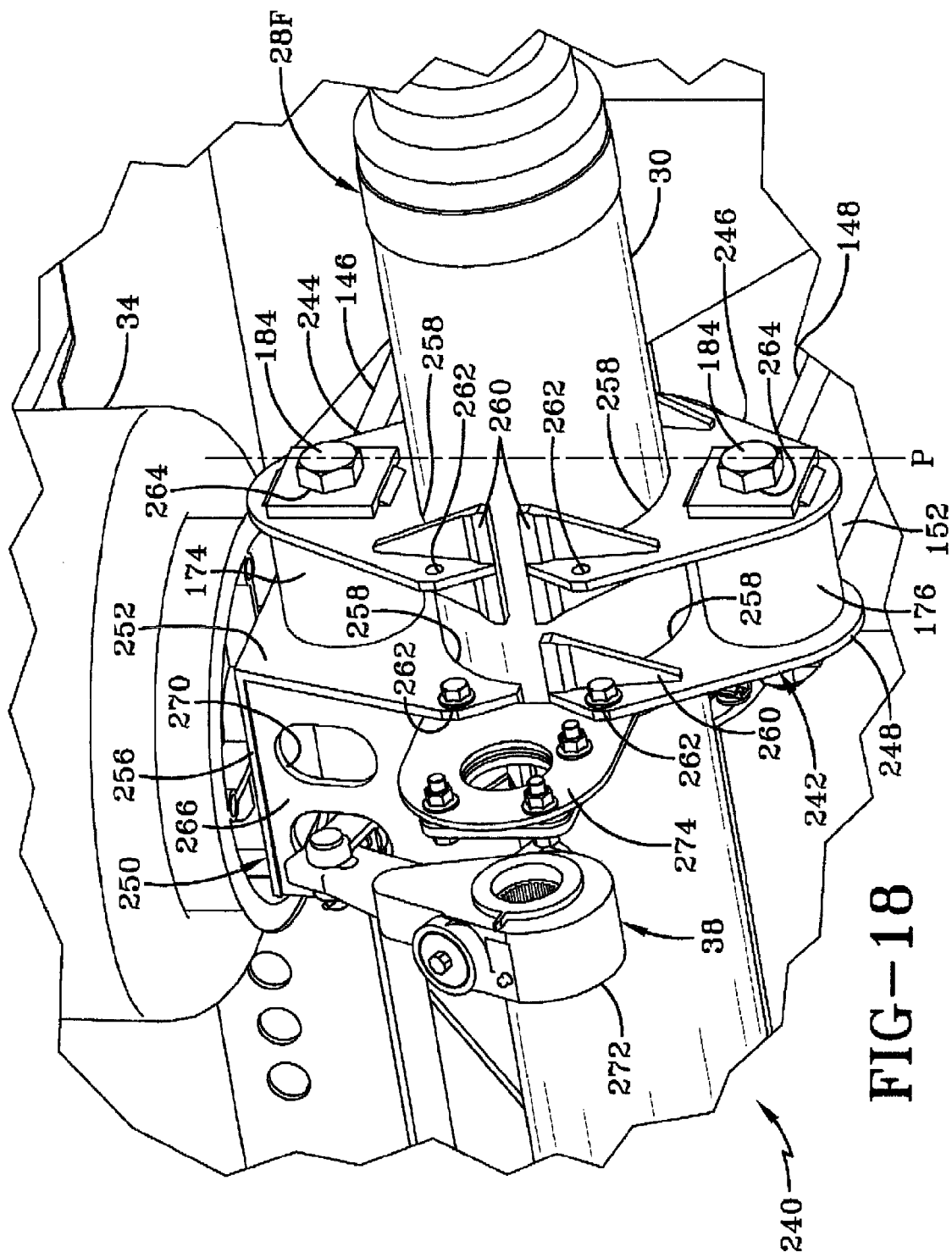
FIG. 18 is a greatly enlarged fragmentary driver's side front perspective view of a portion of the heavy-duty vehicle axle/suspension system shown in FIG. 16.
Figure 19:
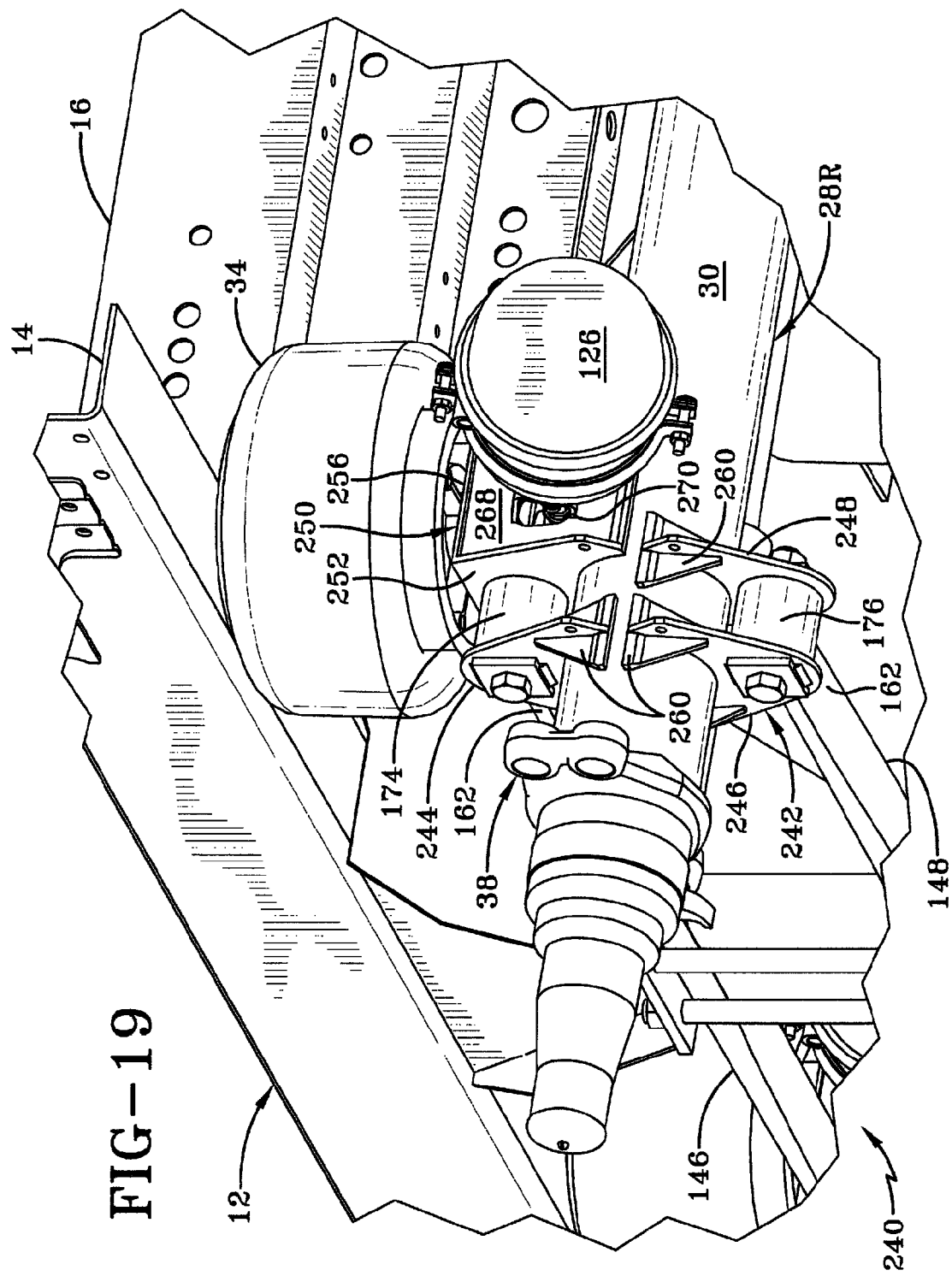
FIG. 19 is a greatly enlarged fragmentary driver's side rear perspective view of a portion of the heavy-duty vehicle axle/suspension system shown in FIG. 16.

More particularly, each spring leaf 146, 148 includes an extension at its respective front and rear ends 152, 162, each of which is respectively formed into corresponding upper and lower spring eyes 174, 176. Bracket assembly 242 receives upper and lower spring eyes 174, 176 to attach upper and lower spring leaves 146, 148 to each respective axle 28F, 28R. Turning now to FIGS. 18 and 19, bracket assembly 242 includes an outboard upper member 244, an outboard lower member 246 that is vertically aligned with but does not contact the outboard upper member, an inboard lower member 248 that is spaced inboardly apart from the outboard lower member, and a box-like structure 250. Box-like structure 250 includes an outboard wall 252 that is vertically aligned with but does not contact inboard lower member 248, and upper wall 256. Box-like structure 250 also includes front and rear walls 266 and 268, respectively, which provide additional robustness for the box-like structure.

Each of outboard upper member 244, outboard lower member 246, inboard lower member 248, and box-like structure outboard wall 252 is formed with a cutout 258 which is complementarily-shaped and sized for seating on the perimeter of axle tube 30. More particularly, outboard upper member 244 and box-like structure outboard wall 252 each seat on and generally surround approximately an upper half of the perimeter of axle tube 30, while outboard lower member 246 and inboard lower member 248 each seat on and generally surround approximately a lower half of the perimeter of the axle tube. To increase the surface area contacting axle tube 30, each of outboard upper member 244, outboard lower member 246, and inboard lower member 248 include generally triangular-shaped flanges 260 extending perpendicular to the outboard upper member, outboard lower member and inboard lower member, respectively.

In addition, to maintain the vertical alignment of outboard upper member 244 with outboard lower member 246, and the vertical alignment of inboard lower member 248 with box-like structure outboard wall 252, each of the outboard upper member, outboard lower member, inboard lower member and box-like structure outboard wall is formed with openings 262 for receiving fasteners (not shown). In this manner, selected ones of the fasteners extend from outboard upper member 244 vertically downwardly to outboard lower member 246 to clamp the outboard upper member and outboard lower member together about axle tube 30. Likewise, selected ones of the fasteners extend from box-like structure outboard wall 252 vertically downward to inboard lower member 248 to clamp the box-like structure outboard wall and the inboard lower member together about axle tube 30. Each of outboard upper member 244, outboard lower member 246, inboard lower member 248, and box-like structure outboard wall 252 preferably also is rigidly connected to each respective axle 28F, 28R by securing each cutout 258 to axle tube 30 by welding or other means known to those skilled in the art.

Spring eyes 174, 176 of upper and lower spring leaves 146, 148, respectively, align with orifices 264 formed in each one of outboard upper member 244 and outboard lower member 246 along a vertical centerline of axle 28, represented as P in FIG. 18. In addition, spring eyes 174, 176 also vertically align with orifices 264 formed in each one of inboard lower member 248 and box-like structure outboard wall 252 along vertical centerline P. Moreover, orifice 264 formed in outboard upper member 244 and the orifice formed in box-like structure outboard wall 252 horizontally align with one another, thereby enabling securing means 184, such as bolts, pins, or the like, to pass through the respective aligned orifices and upper spring eye 174 to secure upper spring leaf 146 to bracket assembly 242. Similarly, orifice 264 formed in outboard lower member 246 and the orifice formed in inboard lower member 248 also horizontally align with one another, thereby enabling securing means 184 to pass through the respective aligned orifices and lower spring eye 176 to secure lower spring leaf 148 to bracket assembly 242. The fit between securing means 184, aligned orifices 264 and respective spring eyes 174, 176 allows for rotation of front and rear ends 152, 162 of upper and lower spring leaves 146, 148.

Third embodiment axle/suspension system 240 facilitates the mounting of air springs 34 with upper wall 256 of box-like structure 250. Box-like structure 250 is rigid and thus provides a stable mounting surface for each air spring 34 on upper wall 256 directly above axle 28. As in first and second embodiments axle/suspension system 80, 140 this position of box-like structure upper wall 256 and in turn of air spring 34 in third embodiment axle/suspension system 240 reduces the amount of static offset loading encountered by the system, in turn reducing the threes encountered by the system. Of course, if an offset position for air spring 34 is desired due to application and design considerations, box-like structure 250 optionally may be modified to position the air spring accordingly.

Front and rear walls 266, 268 of box-like structure 250 each include openings 270 formed therein to allow for the mounting of components of brake system 38, such as air chambers 126 and cam shaft link components 272. Box-like structure rear wall 268 enables air chamber 126 of brake system 38 to be mounted rearwardly of and generally above axle 28, thus reducing the exposure of the air chamber to some road hazards, thereby increasing the life of the air chamber. Optionally, bracket assembly 242 includes a cam shaft support bracket 274 mounted on box-like structure front wall 266 and extending forwardly in a generally perpendicular manner from the front wall to provide additional support for cam shaft 130.

In this manner, third embodiment axle/suspension system 240 provides a connection of each spring leaf 146, 148 to axles 28F, 28R without the use of sleeve 166, as in second embodiment axle/suspension system 140, thereby reducing the weight of the axle/suspension system and eliminating the assembly processes associated with fitting a sleeve onto axle tube 30.

Turning now to FIGS. 20-24, a fourth embodiment axle/suspension system of the present invention is indicated generally at 320, and also is useful in vehicle 42. Fourth embodiment axle/suspension system 320 finds particular use in applications where it is desired to save weight and cost when compared to second and third embodiments axle/suspension system 140, 240. More particularly, fourth embodiment axle/suspension system 320 includes a single leaf spring 326 and a pair of radius rods 328, 329, as opposed to multiple-spring stack 82 of first embodiment axle/suspension system 80 (FIG. 6), and upper and lower leaf springs 146, 148 of second and third embodiments axle/suspension system 140, 240 (FIGS. 10 and 16). It is to be noted that slider box 12 generally is representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, frame 12 is shown in FIGS. 20-24 as a slider box.

Figure 20:
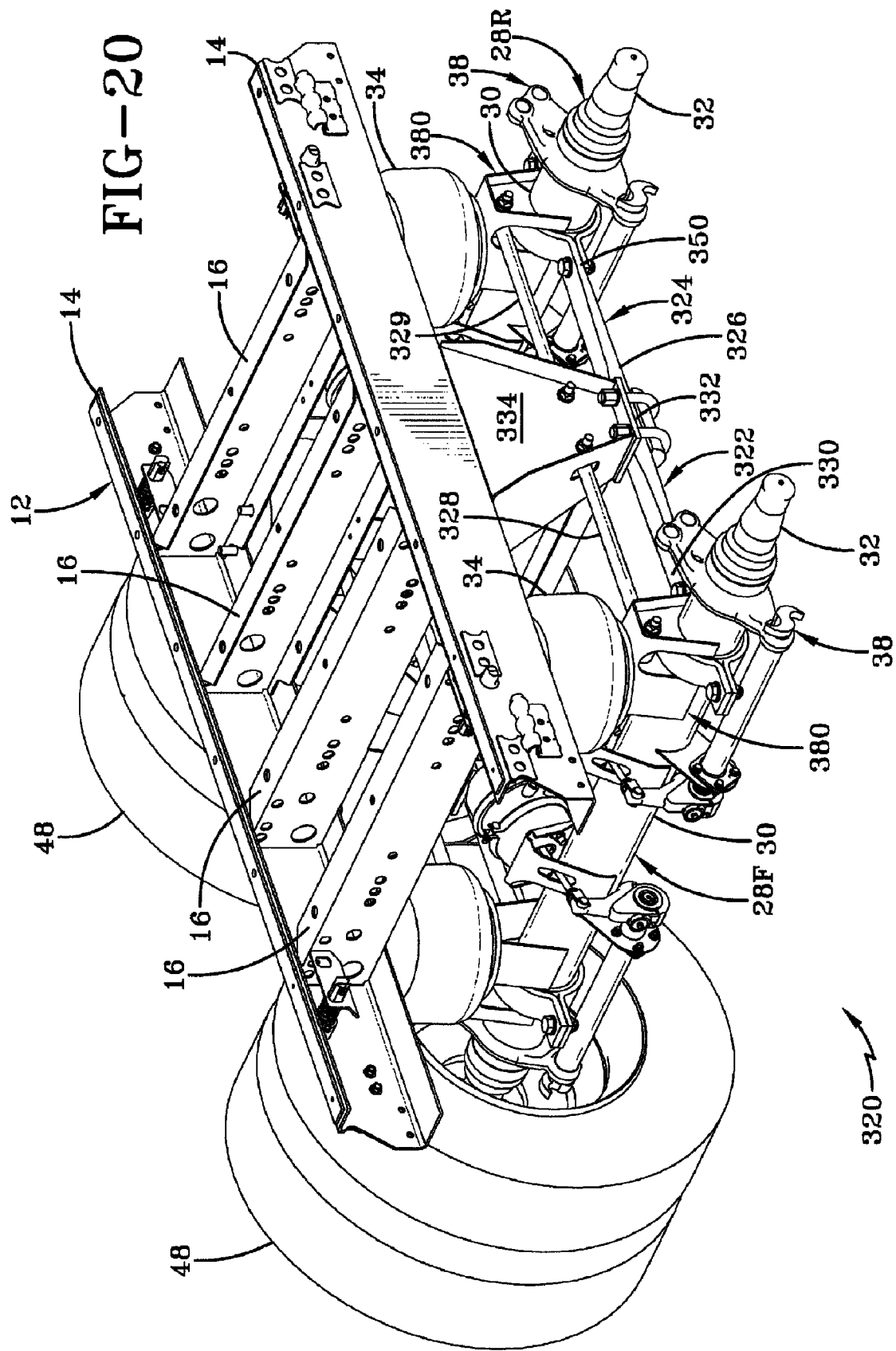
FIG. 20 is a driver's side front top perspective view of a fourth embodiment of the heavy-duty vehicle axle/suspension system of the present invention incorporated into a slider tandem, showing passenger side tires attached.
Figure 21:
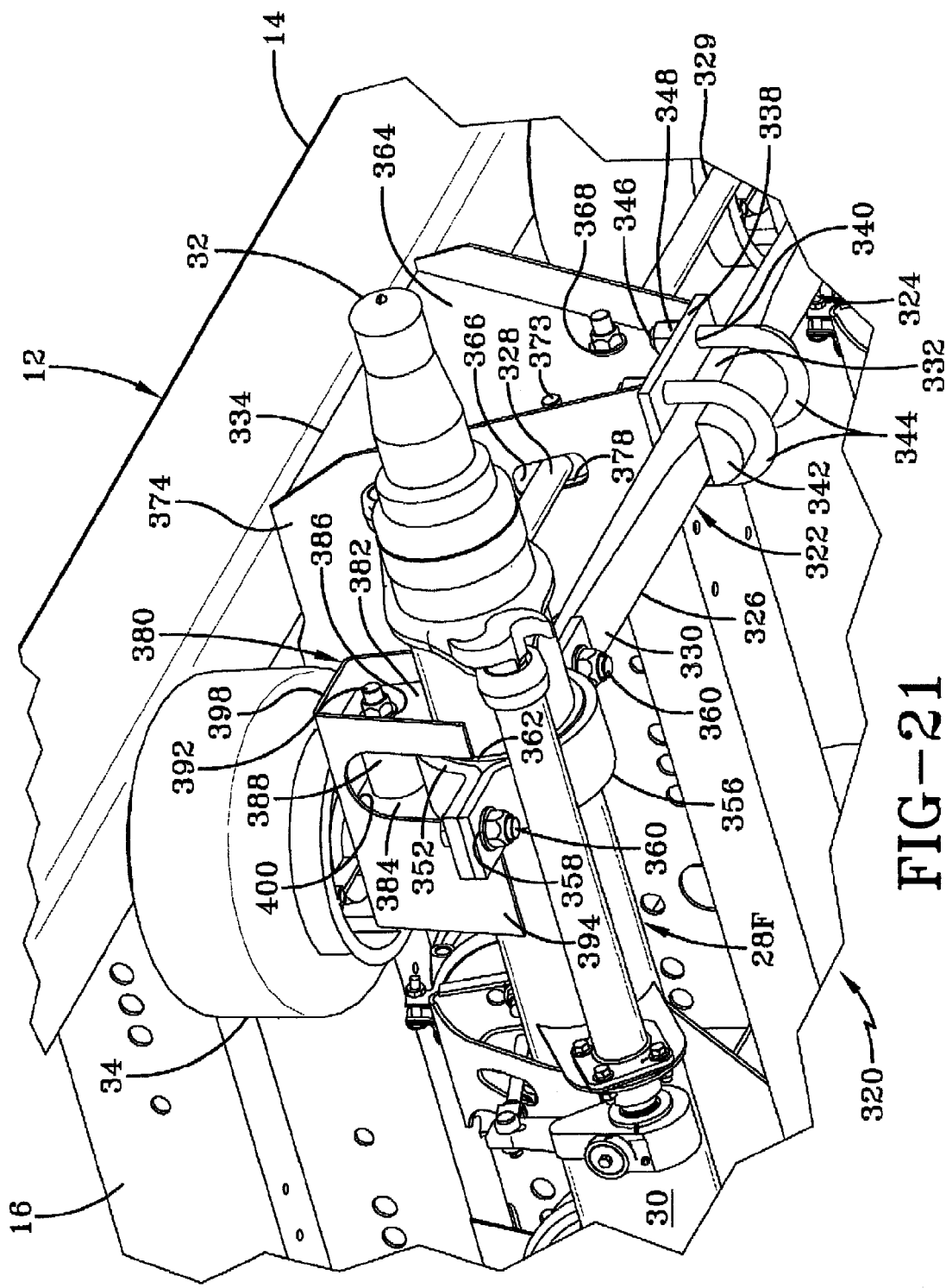
FIG. 21 is an enlarged fragmentary driver's side front bottom perspective view of a front portion of the heavy-duty vehicle axle/suspension system shown in FIG. 20.
Figure 22:
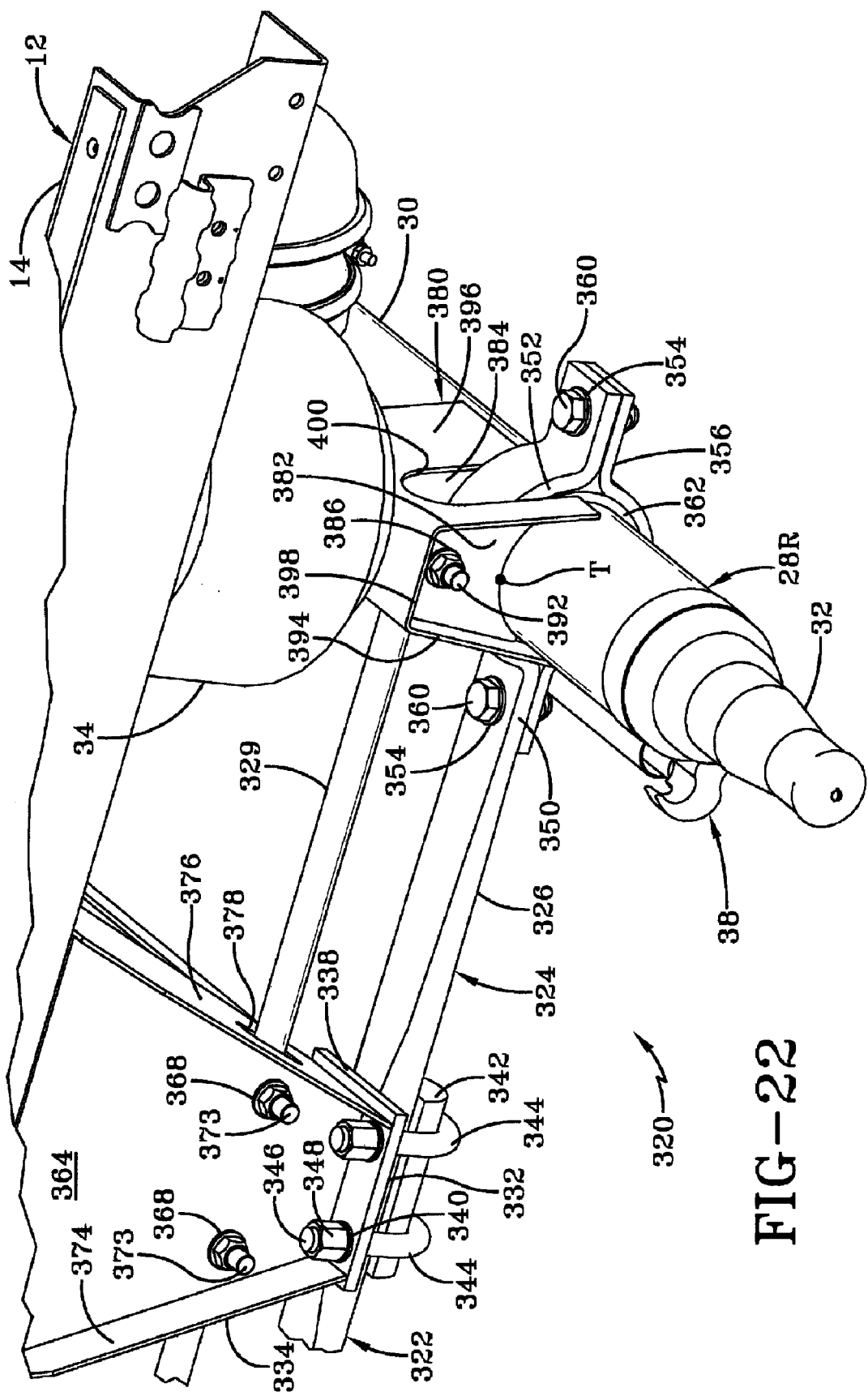
FIG. 22 is an enlarged fragmentary driver's side rear perspective view of a rear portion of the heavy-duty vehicle axle/suspension system shown in FIG. 20.

With particular reference now to FIGS. 20-22, fourth embodiment axle/suspension system 320 preferably includes a pair of leading arm suspension assemblies 322, each one of which is disposed on a respective one of the driver's side and passenger side of vehicle 42, and a pair of trailing arm suspension assemblies 324, each one of which also is disposed on a respective one of the driver's side and passenger side of the vehicle. Inasmuch as each of the driver's side suspension assemblies 322, 324 is identical to each of the passenger side suspension assemblies, only the driver's side suspension assemblies will be described herein. Of course, as with all embodiments of the present invention, axle/suspension system 320 may include only leading arm suspension assemblies 322, only trailing arm suspension assemblies 324, or integrated pairs of leading and trailing arm suspension assemblies as described herein, as specific applications dictate. While each leading aim suspension assembly 322 and a trailing arm suspension assembly 324 are shown integrally connected, it should be noted that the leading arm suspension assembly is essentially trailing arm assembly turned 180 degrees, that is, from the trailing arm position to a leading arm position. Therefore, it is understood that leading arm suspension assembly 322 and trailing arm suspension assembly 324 could be separated, creating a non-integrated system without affecting the overall concept and operation of the invention.

Each suspension assembly 322, 324 of fourth embodiment axle/suspension system 320 includes a single tapered leaf spring 326 and a radius rod 328, 329, respectively. Leaf spring 326 can be engineered through practices that are known in the art, such as parabolic tapering and the like, to exhibit the same roll stability, anti-dock walk movement, wheel-dampening characteristics, and lateral stability of multi-leaf spring 82 of first embodiment axle/suspension system 80. Leaf spring 326 preferably is of the type typically used in heavy-duty leaf springs, which includes spring steel with characteristics that are engineered to meet application-specific design requirements, such as spring rate and strength, as known to those skilled in the art.

Leaf spring 326, which is shared by suspension assemblies 322, 324, includes a front end 330 that is secured to a front axle 28F, a middle point or mid-point 332 that is secured or attached to a central frame hanger 334, and a rear end 350 that is secured to a rear axle 28R. Mid-point 332 is analogous to first attachment portion 86 of beam 82 of first embodiment axle/suspension system 80, while front and rear ends 330, 350 each are analogous to the second attachment portion 98 of the beam of the first embodiment axle/suspension system. It should be noted that, while central hanger 334 is sometimes considered to be part of slider box 12 once it is connected to slider box main members 14 and selected ones of cross members 16, the hanger is typically engineered as part of axle/suspension system 320. Reference herein shall be made to central hanger 334 as part of slider box 12 for the purpose of convenience, with the understanding that it may be engineered as part of axle/suspension system 320.

Turning to the attachment of mid-point 332 of leaf spring 326 to central frame hanger 334, the spring is generally rigidly secured to the hanger under compression in a clamped fashion, as opposed to prior art systems 10, 54, 280, 302 which are secured in a pivoted fashion. To facilitate such clamping, mid-point 332 of leaf spring 326 is aligned under central hanger 334, and a U-bolt rest 342 is aligned with the central hanger under the mid-point of the leaf spring. Each one of a pair of longitudinally-spaced U-bolts 344 is disposed about and captures U-bolt rest 342 and mid-point 332 of leaf spring 326 beneath hanger 334. Threaded upper ends 346 of each U-bolt 344 pass through corresponding openings 340 formed in a lower plate 338 of frame hanger 334. A pair of nuts 348 are threadably engaged with upper threaded ends 346 of each U-bolt 344, that is, four nuts for the two U-bolts, and are tightened down to secure U-bolt rest 342 and mid-point 332 of leaf spring 326 together in compression.

This construction allows the portion of leaf spring 326 extending from front end 330 to mid-point 332, i.e., leading arm suspension assembly 322, to function as a clamped cantilever spring. Similarly, the portion of leaf spring 326 extending from mid-point 332 to rear end 350, i.e., trailing arm suspension assembly 324, functions as a clamped cantilever spring. Of course, other means of securing leaf spring 326 to central hanger 334 in compression, as known in the art, may be used.

Front end 330 and rear end 350 of leaf spring 326 connect to respective axles 28F, 28R by clamping. More particularly, with reference to FIGS. 22 and 24, leaf spring 326 includes varying thickness according to spring design methods known in the art. Leaf spring 326 also includes a bend 352 formed at each of its respective front and rear ends 330, 350, which is complementarily-shaped and sized for seating generally on the upper half of the perimeter of axle tube 30. In order to capture axle 28, a lower securing member 356 is formed in a mirror-image of bend 352 of leaf spring 326, for seating generally on the lower half of the perimeter of axle tube 30. Leaf spring 326 is formed with fastener openings 354 adjacent each bend 352, and lower securing member 356 is formed with openings 358 that align with the openings in the leaf spring. Fasteners such as bolts 360 pass through aligned openings 354, 358 to enable leaf spring 326 and lower securing member 356 to capture and secure tube 30 of each axle 28F, 28R. A bushing 362, preferably formed from an elastomeric material such as natural rubber, is disposed about axle tube 30 and is compressed by leaf spring bend 352 and lower securing member 356 when bolts 360 are tightened. Elastomeric bushing 362 enables a limited amount of rotation of leaf spring 326 about axle 28, as indicated by arrow R in FIG. 22.

Turning now to FIGS. 22 and 23, front radius rod 328 extends generally parallel to and above leaf spring 326 from central hanger 334 to front axle 28F, while rear radius rod 329 extends generally parallel to and above the leaf spring from the central hanger to rear axle 28R. Radius rods 328, 329 are mounted to central frame hanger 334 between an outboard wall 364 and an inboard wall 366 of the hanger. Hanger outboard and inboard walls 364, 366 each are formed with openings 368 that align with an opening 372 formed in a first eye 370 of each radius rod 328, 329, enabling a bolt 373 to pass through the aligned openings to pivotally attach each radius rod to frame hanger 334. Central frame hanger 334 also includes a front wall 374 and a rear wall 376, each of which is formed with openings 378 to enable each radius rod 328, 329 to extend frontwardly and rearwardly toward respective axles 28F, 28R.

Radius rods 328, 329 also are pivotally connected to a box-like structure 380 that is seated on axle tube 30 of each respective axle 28F, 28R. More particularly, box-like structure 380 includes an outboard wall 382 and an inboard wall 384, each of which is formed with openings 386 that align with an opening 390 formed in a second eye 388 of each radius rod 328, 329, thereby enabling a bolt 392 to pass through the aligned openings to secure each radius rod to the box-like structure. Box-like structure 380 further includes a front wall 394, a rear wall 396, and an upper wall 398 extending between and formed integrally with the front and rear walls. Front and rear walls 394, 396 each are formed with openings 400 to enable each respective radius rod 328, 329 to pass into box-like structure 380 for pivotal connection therewith.

Fourth embodiment 320 also facilitates the mounting of air springs 34 with upper wall 398 of box-like structure 380. Box-like structure 398 positions air spring 34 directly over axle 28, which reduces the amount of static offset loading encountered by the system, in turn reducing the forces encountered by the system. Of course, if an offset position for air spring 34 is desired due to application and design considerations, box-like structure 380 optionally may be modified to position the air spring accordingly. Preferably, box-like structure 380 is secured to axle tube 30 by welding or bonding, as is known to those skilled in the art.

Returning now to FIG. 20, using trailing arm suspension assembly 324 for the purpose of illustration, reference herein will be made in singular form to common features and components of leading and trailing arm suspension assemblies 322, 324. The construction of leaf spring 326 and radius rod 329 and their respective attachments to central hanger 334 and axle 28R minimizes or prevents the type of arcuate motion of beam 20 and the axle as seen in prior art axle/suspension system 10 (FIG. 3) when the central hanger moves downwardly, reducing or eliminating dock walk. More particularly, as described above, when a fork lift drives into trailer 40, hanger 328 moves downwardly.

Mid-point 332 of leaf spring 326 is secured to central hanger 334 by U-bolts 344 and the mid-point thus moves with the hanger, while rear end 350 of the leaf spring moves closer to frame 12. Leaf spring 326 exhibits deflection characteristics that define a predictable curvature along a locus arc when mid-point 332 moves downwardly with hanger 334 and rear end 350 moves closer to frame 12. In a manner similar to that described above for first and second embodiments axle/suspension system 80, 240, the predictable curvature along the locus arc causes leaf spring rear end 350 and the vertical centerline of axle 28R to shift to a new plane in a manner that is parallel with mid-point 332, thereby forming a parallelogram with radius rod 329, which moves generally with leaf spring 326 without deflecting due to its pivotal connection between central hanger 334 and box-like structure 380. Since the vertical centerline of axle 28R shifts without the type of arcuate motion of beam 20 and the axle as seen in prior art axle/suspension system 10 (FIG. 3), axle top dead-center point T remains at the top dead-center of the axle. As a result, tires 48 do not rotate as hanger 334 moves downwardly, thereby reducing or eliminating dock walk.

After the fork lift exits trailer 40, central frame hanger 334 springs upwardly due to the combination of the sudden loss of the weight of the fork lift and the upward force of air spring 34. As described above, this upward movement caused prior art axle/suspension system 10 to impose a rearward arcuate motion on beam 20 and axle 28 (FIG. 3), causing a rearward rotation of tires 48 so that rear end 46 of vehicle 42 could possibly strike loading dock 44.

Again using trailing arm suspension assembly 324 for the purpose of illustration, fourth embodiment axle/suspension system 320 reduces or eliminates such movement, since when hanger 334 moves upwardly, mid-point 332 of leaf spring 326 moves upwardly with the hanger, while rear end 350 of the leaf spring moves away from frame 12. Leaf spring 326 exhibits deflection characteristics that define a predictable curvature along a locus arc when mid-point 332 moves upwardly with hanger 334 and rear end 350 moves away from frame 12. In a manner similar to that described above for first and second embodiments axle/suspension system 80, 240, the predictable curvature along the locus arc causes leaf spring rear end 350 and the vertical centerline of axle 28R to shift to a new plane in a manner that is parallel with mid-point 332, thereby forming a parallelogram with radius rod 329, which moves generally with leaf spring 326 without deflecting due to its pivotal connection between central hanger 334 and box-like structure 380. Since the vertical centerline of axle 28R shifts without the type of arcuate motion of beam 20 and the axle as seen in prior art axle/suspension system 10 (FIG. 3), axle top dead-center point T remains at the top dead-center of the axle. As a result, tires 48 do not rotate rearwardly as hanger 334 moves upwardly, thereby reducing or eliminating rearward movement of trailer 40.

It is also important to note that leaf spring 326 reduces undesirable significant downward movement of axles 28F and 28R. As described above, trailer 40 is sometimes lifted onto a rail car (not shown). With prior art air-ride axle/suspension systems 10, 54, 302, when trailer 40 is lifted, axles 28F and 28R move downwardly until shock absorbers 36 (FIG. 1) are fully extended, which allows for a significant drop of the axles. This drop stretches air bag 66 of each respective air spring 34, which creates a vacuum in the air bag, causing it to fold inwardly. When trailer 40 is placed onto the rail car, folded air bag 66 then is sometimes pinched within air spring 34, potentially damaging the air bag. Leaf spring 326 reduces or prevents this vacuum fold-in effect, since it has a stiffness that builds resistance as the spring moves downwardly, and thereby resists significant downward movement of axles 28F and 28R. This resistance to downward movement of axles 28F and 28R contributes to the potential elimination of shock absorbers 36, since the need for a positive lower stop is eliminated.

Moreover, fourth embodiment axle/suspension system 320 also provides roll stability. The use of leaf spring 326 which is rigidly affixed at its mid-point 332 to central hanger 334 and thus trailer frame 12, generally operates like a fixed cantilever spring, with the exception that the leaf spring includes bend 352 and lower securing member 356 at its respective front and rear ends 330, 350 to produce the above-described anti-dock walk benefit. That is, a leading arm cantilever spring 326 exists for front axle 28F, and a trailing arm cantilever spring exists for rear axle 28R. Leaf spring 326 has a certain spring rate, that is, the spring is designed so that it takes a certain amount of force to deflect the spring upwardly and a certain amount of force to deflect the spring downwardly, while being neutral at vehicle ride height. In order for trailer 40 to lean or sway due to roll forces, one of the driver's side or curb side axle spindles 32 (FIG. 10) must move vertically so that it is a different distance away from frame 12 than the transversely opposing curb or driver's side spindle, respectively. The forces that are required to negate this movement can be calculated, enabling leaf spring 326 to be engineered to include a spring rate that is stiff enough to control such roll or sway. Accordingly, since the stiffness of leaf spring 326 is engineered to be neutral at ride height, air springs 34 are able to provide a soft ride, while the leaf springs work to control sway when vehicle 42 leans.

An additional benefit of leaf spring 326 being neutral at vehicle ride height, which is a term of art in the heavy-duty axle/suspension industry, is improvement of the life of axle/suspension system 320, particularly with respect to prior art spring suspension 280. More particularly, in prior art spring suspension 280, leaf springs 282, 283 (FIG. 4C) must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the leaves of the leaf springs to become damaged and/or to break.

In contrast, leaf spring 326 of fourth embodiment axle/suspension system 320 preferably is designed to experience stresses in a lower range than prior art spring suspension 280 by being neutral, or generally unstressed, when trailer 40 is unloaded or loaded with freight and the axle/suspension system is maintaining the vehicle ride height. By being neutral at ride height for loaded trailer 40, leaf spring 326 enables air springs 34 to provide optimum ride cushioning. Therefore, when loaded trailer 40 experiences impacts from traveling over-the-road, leaf spring 326 experiences relatively low stresses, which reduces the fatigue on axle/suspension system 320 and extends its life.

These aspects of fourth embodiment axle/suspension system 320 are different from prior art axle/suspension system 10, which includes a rigid structure that is designed to generally prevent movement of spindle 32 associated with roll or sway, but then uses discrete components such as bushing assembly 24 to provide a predictable amount of compliance, which enables control of roll forces. Fourth embodiment axle/suspension system 320 also is different from parallelogram suspensions 54, 302 which pivot freely, enabling sway, but then use a discrete roll bar component 70, 308 to resist the movement associated with roll or sway. Fourth embodiment axle/suspension system 320 is different from prior art spring suspension 280 as well, since that system utilizes stiff springs 282, 283 to resist sway, which also carry the load and are therefore too stiff to provide a cushioned ride when vehicle 42 is only lightly loaded.

In addition, there is less side-to-side movement of fourth embodiment axle/suspension system 320 than with prior art systems such as parallelogram axle/suspension systems 54, 302 (FIGS. 4A, 4B). Using parallelogram axle/suspension system 54 as an example, each link 56 of the prior art parallelogram linkage connection requires two pivot connections, that is, four pivot connections for each of the driver's side and curb side suspension assemblies. With one driver's side suspension 54 and one curb side suspension, there are eight total pivot connections, all of which need clearance to rotate. This clearance results in lateral movement of parallelogram axle/suspension system 54. Fourth embodiment axle/suspension system 320, in contrast, includes only two pivoted connections, that is, one radiused leaf spring bend 352 and one radius rod eye 370 or 388, for each respective leading or trailing arm suspension assembly 322, 324 per side, thereby reducing the connections, and the lateral movement associated with the clearance for such connections, by half. Then, fourth embodiment axle/suspension system 320 reduces lateral movement even further, since it is clamped to hanger 334, rather than pivotally attached to the hanger, as are prior art parallelogram axle/suspension systems 54, 302. The elimination of pivotal attachments to hanger 18 in turn eliminates the angular lateral movement that necessarily accompanies a pivot connection, thereby reducing the total lateral movement experienced with prior art parallelogram axle/suspension systems 54, 302 by more than half.

Thus, by acting as a cantilever spring that is clamped at one end, fourth embodiment axle/suspension system 320 reduces or eliminates dock walk without the use of additional components. Also, fourth embodiment axle/suspension system 320 provides roll stability without the use of additional components and distributes brake forces more efficiently. Furthermore, fourth embodiment axle/suspension system 320 reduces lateral movement significantly and enables leaf spring 326 to be neutral at ride height so that air springs 34 may provide optimum ride cushioning. As will be described in greater detail below, axle/suspension system 320 achieves further aspects of increased performance over systems of the prior art, while having reduced weight and cost, including resisting downward movement to eliminate the need for shock absorbers, enabling quicker inflation for air springs 34, and providing a visual ride-height check.

Turning now to FIGS. 25-29, a fifth embodiment axle/suspension system of the present invention is indicated generally at 410, and is useful in vehicle 42. Fifth embodiment axle/suspension system 410 finds particular use in applications where it is desired to save weight and/or cost when compared to certain other embodiments of the axle/suspension system of the present invention, such as second and third embodiments 140, 240. More particularly, fifth embodiment axle/suspension system 410 includes a single leaf spring 412 and a pair of radius rods 414, 416, as opposed to multiple-spring stack 82 of first embodiment axle/suspension system 80 (FIG. 6), and upper and lower leaf springs 146, 148 of second and third embodiments axle/suspension system 140, 240 (FIGS. 10 and 16). For the purpose of convenience, frame 12 is shown in FIGS. 25-29 as a movable subframe or slider box, and generally is representative of various types of frames used for heavy-duty vehicles, including primary frames that do not support a subframe and primary frames and/or floor structures that do support a movable or non-movable subframe.

Figure 25:
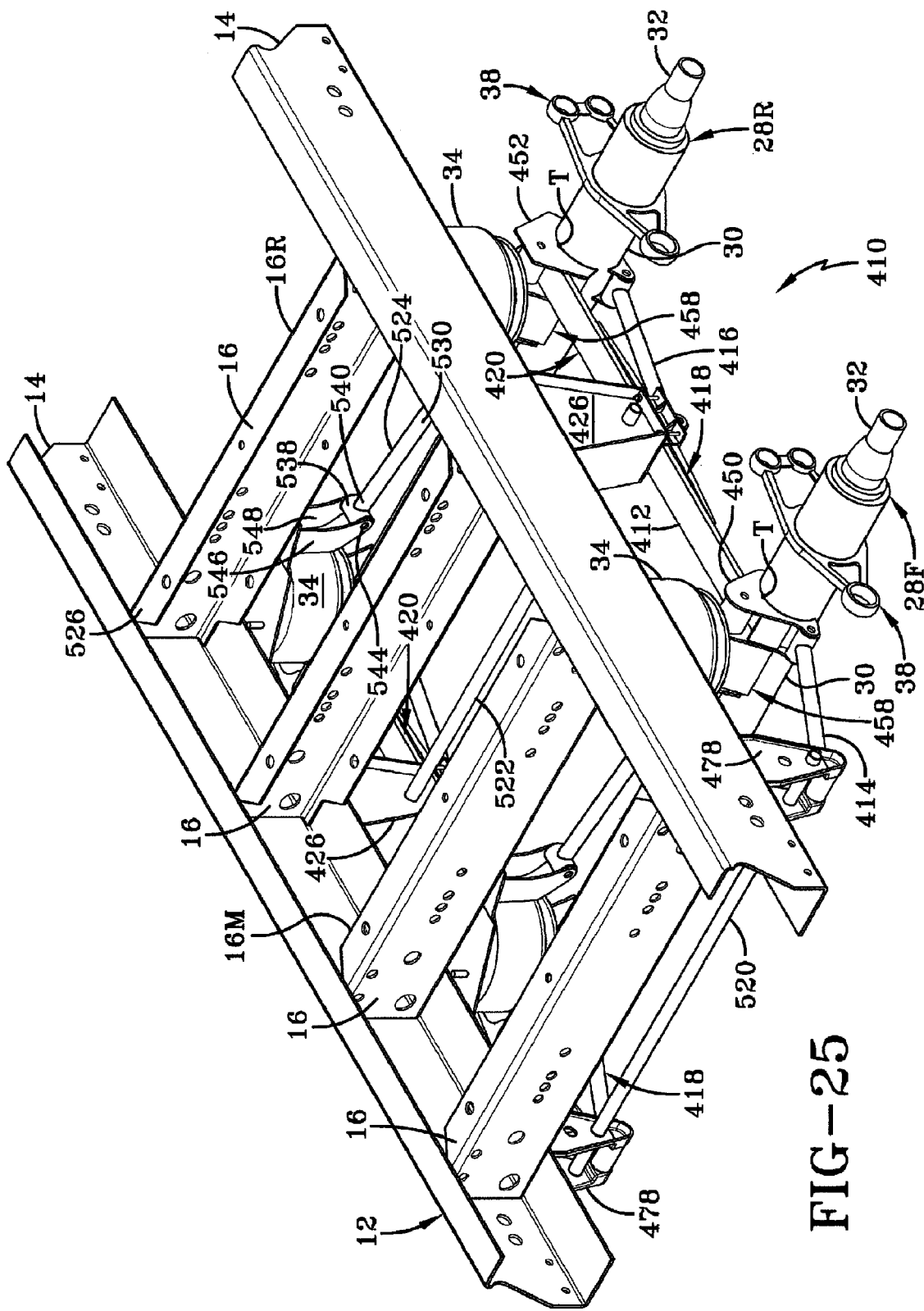
FIG. 25 is a driver's side front top perspective view of a fifth embodiment of the heavy-duty vehicle axle/suspension system of the present invention incorporated into a slider tandem.
Figure 26:
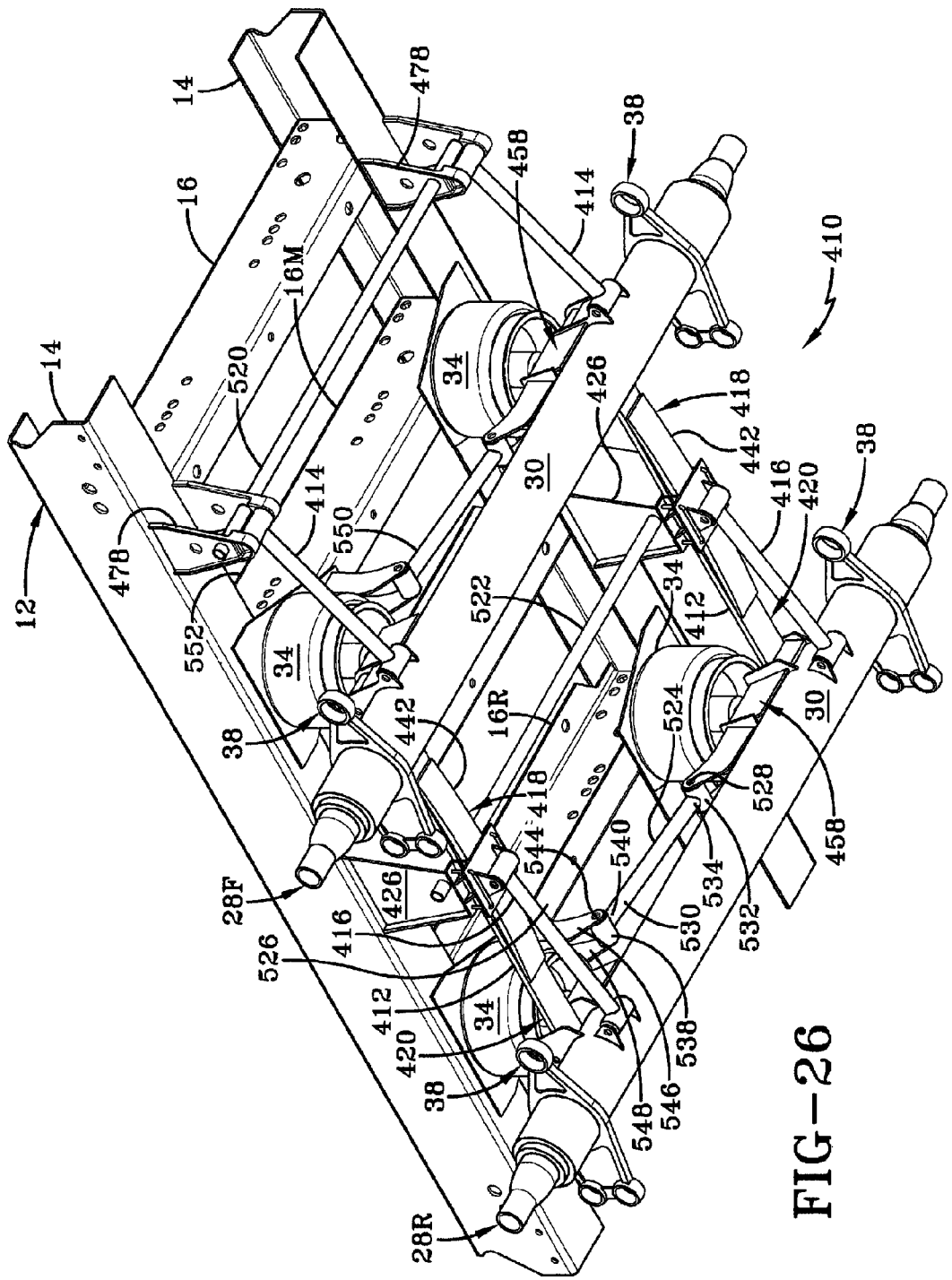
FIG. 26 is a driver's side front bottom perspective view of the heavy-duty vehicle axle/suspension system shown in FIG. 25.
Figure 27:
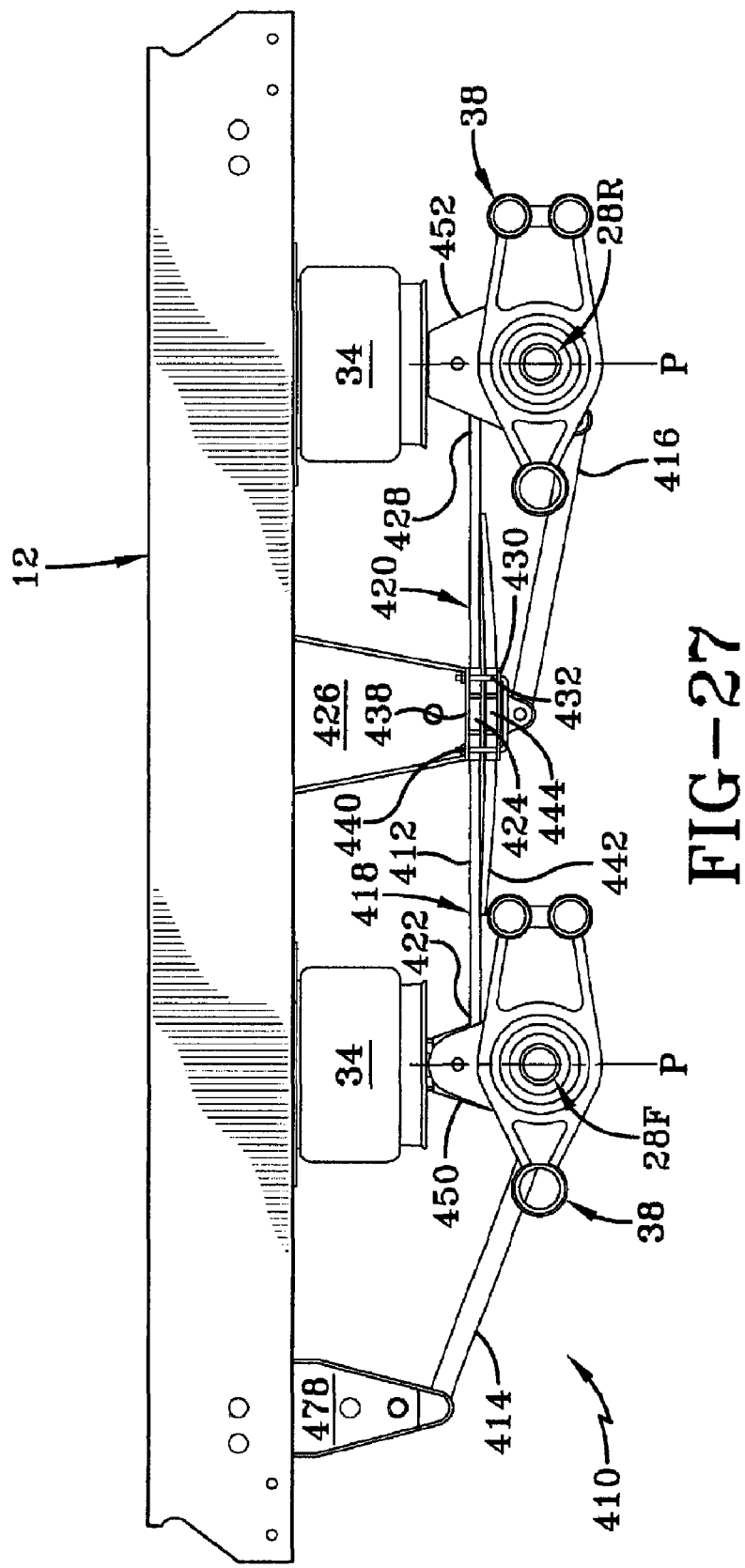
FIG. 27 is a side elevational view of the heavy-duty vehicle axle/suspension system shown in FIG. 25.

With particular reference now to FIGS. 25-27, fifth embodiment axle/suspension system 410 preferably includes a pair of trailing arm suspension assemblies 420, each one of which is disposed on a respective one of the driver's side and passenger side of vehicle 42 (FIG. 2). Fifth embodiment axle/suspension system 410 also includes a pair of partially leading arm suspension assemblies 418, that is, suspension assemblies having a leading arm spring section with respective trailing arm radius rods, as will be described below. For the purpose of convenience, partially leading arm suspension assemblies 418 shall be referred to as leading arm suspension assemblies. As with trailing arm suspension assemblies 420, each one of leading arm suspension assemblies 418 is disposed on a respective one of the driver's side and passenger side of vehicle 42.

Inasmuch as each of the driver's side suspension assemblies 418, 420 is identical to each of the passenger side suspension assemblies, only the driver's side suspension assemblies will be described herein. Of course, as with all embodiments of the present invention, axle/suspension system 410 may include only leading arm suspension assemblies 418, only trailing arm suspension assemblies 420, or integrated pairs of leading and trailing arm suspension assemblies as described herein, as specific applications dictate. While each leading arm suspension assembly 418 and a trailing arm suspension assembly 420 are shown integrally connected, it should be noted that certain portions of the leading arm suspension assembly is essentially the trailing arm assembly turned 180 degrees, that is, from a trailing arm position to a leading arm position. Therefore, it is understood that leading arm suspension assembly 418 and trailing aim suspension assembly 420 could be separated with appropriate adaptations, creating a non-integrated system without affecting the overall concept and operation of the invention.

Each suspension assembly 418, 420 of fifth embodiment axle/suspension system 410 includes at least one leaf spring 412 and a front radius rod 414 or rear radius rod 416, respectively. Leaf spring 412 preferably is a flat leaf spring, and can be engineered through practices that are known in the art to exhibit the same roll stability, anti-dock walk movement, wheel-dampening characteristics, and lateral stability as multi-leaf spring 82 of first embodiment axle/suspension system 80 (FIG. 5). Leaf spring 412 preferably is of the type typically used in heavy-duty leaf springs, which includes spring steel with characteristics that are engineered to meet application-specific design requirements, such as spring rate and strength, as known to those skilled in the art.

Figure 28:
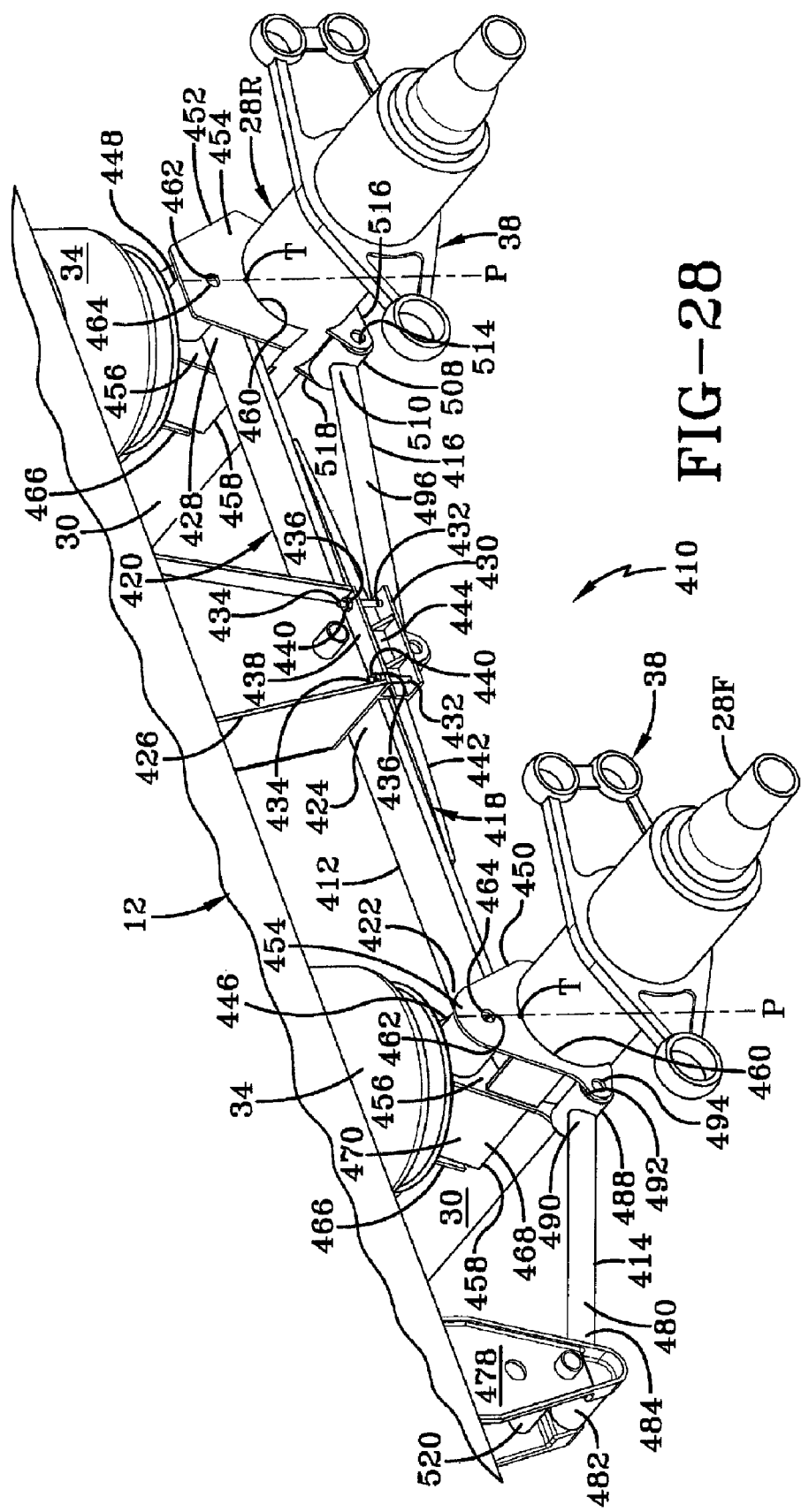
FIG. 28 is an enlarged fragmentary driver's side front top perspective view of a portion of the heavy-duty vehicle axle/suspension system shown in FIG. 25.

Referring now to FIGS. 27 and 28, leaf spring 412, which is shared by front and rear suspension assemblies 418, 420, includes a front end 422 that is secured to front axle 28F, a middle point or mid-point 424 that is secured or attached to a central frame hanger 426, and a rear end 428 that is secured to rear axle 28R. Mid-point 424 is analogous to first attachment portion 86 of beam 82 of first embodiment axle/suspension system 80 (FIG. 5), while front and rear ends 422, 428 each is analogous to the second attachment portion 98 of the beam of the first embodiment axle/suspension system. It should be noted that, while central hanger 426 is sometimes considered to be part of slider box 12 once it is connected to slider box main members 14 and selected ones of cross members 16, the hanger is typically engineered as part of axle/suspension system 410. Reference herein shall be made to central hanger 426 as part of slider box 12 for the purpose of convenience, with the understanding that it may be engineered as part of axle/suspension system 410.

Turning to the attachment of mid-point 424 of leaf spring 412 to central frame hanger 426, the spring is generally rigidly secured to the hanger under compression in a clamped fashion, as opposed to prior art systems 10, 54, 280, 302 which are secured in a pivoted fashion. To facilitate such clamping, mid-point 424 of leaf spring 412 is aligned under central hanger 426, and a U-bolt rest 430 is aligned with the central hanger under the mid-point of the leaf spring. Each one of a pair of longitudinally-spaced U-bolts 432 is disposed about and captures U-bolt rest 430 and mid-point 424 of leaf spring 412 beneath hanger 426. Threaded upper ends 434 of each U-bolt 432 pass through corresponding openings 436 formed in a lower plate 438 of central hanger 426. A nut 440 threadably engages upper threaded end 434 of each U-bolt 432, that is, four nuts for the two U-bolts, and each nut is tightened down to secure U-bolt rest 430 and mid-point 424 of leaf spring 412 together in compression.

As described above, fifth embodiment axle/suspension system 410 includes at least one leaf spring 412. Depending on particular design requirements, additional leaf springs may be employed. For example, axle/suspension system 410 preferably includes a second or support leaf spring 442. Support spring 442 preferably is disposed directly beneath leaf spring 412 to provide structural support for the leaf spring. In addition, support spring 442 preferably is shorter than leaf spring 412, which enables the support spring to provide support with minimal weight and cost. When support spring 442 is employed, a mid-point 444 of the support spring is vertically aligned with mid-point 424 of leaf spring 412. Thus, to attach support spring 442 and leaf spring 412 to central frame hanger 426, U-bolt rest 430 is aligned with the central hanger under support spring mid-point 444. U-bolts 432 are disposed about and capture U-bolt rest 430, mid-point 444 of support spring 442 and mid-point 424 of leaf spring 412 beneath hanger 426. When nuts 440 are tightened on respective threaded ends 434 of each U-bolt 432, U-bolt rest 430, mid-point 444 of support spring 442, and mid-point 424 of leaf spring 412 are secured together in compression.

The clamped compression of leaf spring 412, and optionally support spring 442, to central frame hanger 426 allows the portion of the leaf spring extending from front end 422 to mid-point 424, i.e., leading arm suspension assembly 418, to function as a clamped cantilever spring. Similarly, the portion of leaf spring 412 extending from mid-point 424 to rear end 428, i.e., trailing arm suspension assembly 420, functions as a clamped cantilever spring. Of course, other means of securing leaf spring 412, and optionally support spring 442, to central hanger 426 in compression, as known in the art, may be used.

To connect spring leaf 412 to front axle 28F, a spring eye 446 is formed in leaf spring front end 422, and to connect the spring leaf to rear axle 28R, a spring eye 448 is formed in leaf spring rear end 428. A front bracket assembly 450 is mounted on front axle 28F and receives front spring eye 446, thereby connecting leaf spring front end 422 to the front axle. A rear bracket assembly 452 is mounted on rear axle 28R, and receives rear spring eye 448, thereby connecting leaf spring rear end 428 to the rear axle.

Figure 29:
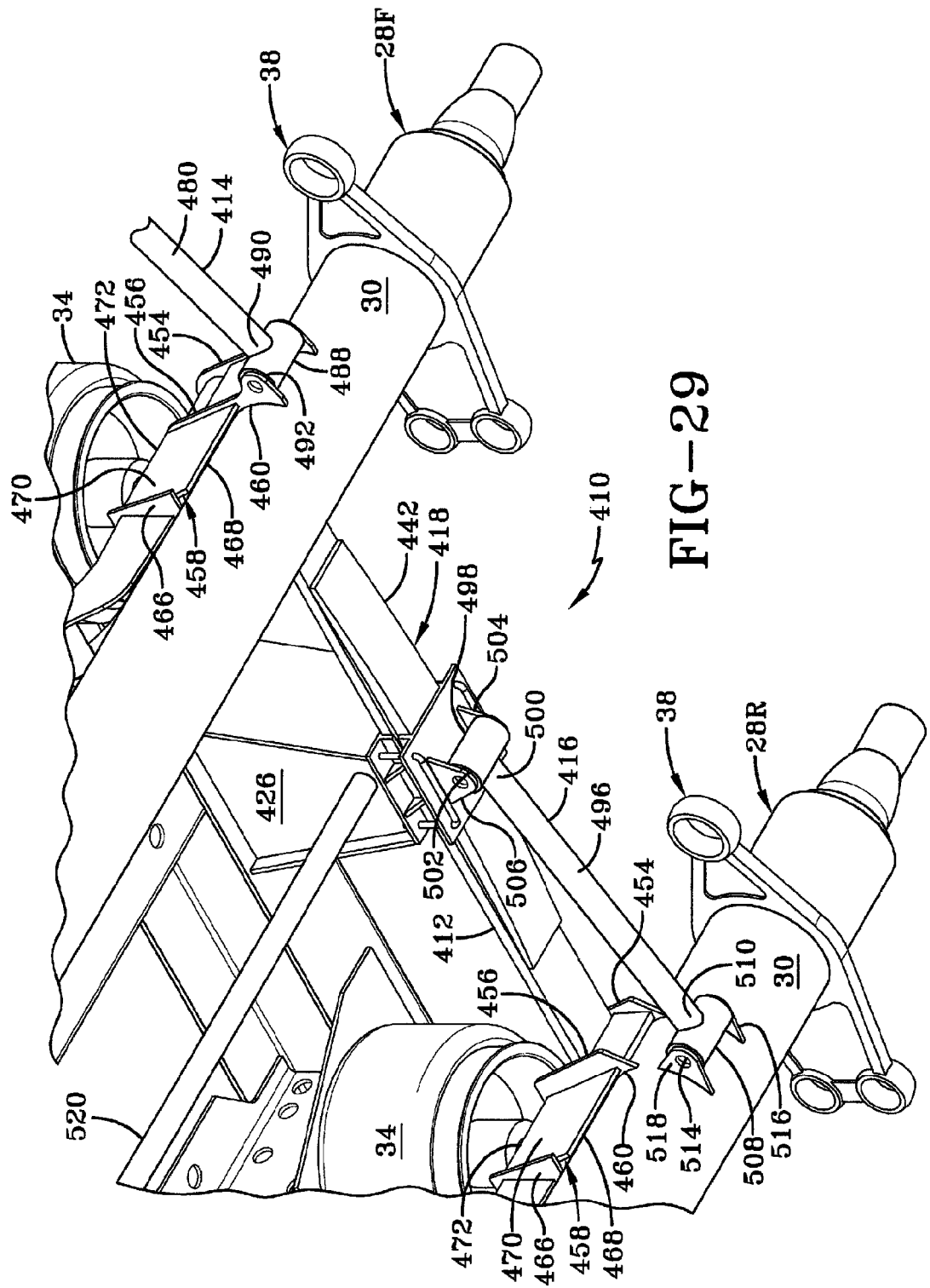
FIG. 29 an enlarged fragmentary passenger side front bottom perspective view of a portion of the heavy-duty vehicle axle/suspension system shown in FIG. 26.

Turning now to FIGS. 28 and 29, front bracket assembly 450 and rear bracket assembly 452 each include an outboard member or plate 454, an inboard member or plate 456 that is spaced inboardly from the outboard plate, and an air-spring mounting structure 458. Each of outboard plate 454 and inboard plate 456 is formed with a shape or cutout 460 that is complementarily-shaped and sized for seating on the perimeter of axle tube 30. More particularly, outboard plate 454 and inboard plate 456 each seat on and generally surround approximately an upper half of the perimeter of axle tube 30. Each of outboard plate 454 and inboard plate 456 preferably is rigidly connected to each respective axle 28F, 28R by securing each plate at shape or cutout 460 to axle tube 30 by welding or other means known to those skilled in the art.

Front spring eye 446 of leaf spring 412 aligns with orifices 462 formed in outboard plate 454 and inboard plate 456 of front bracket assembly 450 in alignment with a vertical centerline of front axle 28F, represented as P in FIG. 28. In addition, rear spring eye 448 of leaf spring 412 aligns with orifices 462 formed in outboard plate 454 and inboard plate 456 of rear bracket assembly 452 in alignment with vertical centerline P of rear axle 28R. Moreover, in each of front bracket assembly 450 and rear bracket assembly 452, respective orifices 462 formed in outboard plate 454 and inboard plate 456 horizontally align with one another. Such horizontal alignment enables securing means 464, such as bolts, pins, or the like, to pass through aligned orifices 462 in front bracket assembly 450 and through front spring eye 446 to secure leaf spring front end 422 to the front bracket assembly. Likewise, securing means 464, such as bolts, pins, or the like pass through aligned orifices 462 in rear bracket assembly 452 and through rear spring eye 448 to secure leaf spring rear end 428 to the rear bracket assembly. The fit between securing means 464, aligned orifices 462 and respective spring eyes 446, 448 allows for rotation of front and rear ends 422, 428 of spring leaf 412.

Optionally, fifth embodiment axle/suspension system 410 may include a front sleeve (not shown) to facilitate mounting of front bracket assembly 450 to front axle 28F, and a rear sleeve (not shown) to facilitate mounting of rear bracket assembly 452 to rear axle 28R. Preferably, each sleeve is disposed about its respective axle 28F, 28R, and welded or otherwise rigidly attached to the axle. In turn, each bracket assembly 450, 452 is welded or otherwise rigidly attached to its respective sleeve.

Returning now to FIGS. 28 and 29, fifth embodiment axle/suspension system 410 facilitates the mounting of air springs 34 with air-spring mounting structure 458. More particularly, air spring mounting structure 458 utilizes inboard plate 456 as its outboard wall, and includes an inboard wall 466 that is spaced inboardly from the inboard plate. A central plate 468 extends between inboard plate 456 and inboard wall 466, and is bent in a generally inverted U-shape to form a front wall 470, an upper wall 472, and a rear wall (not shown). Preferably, front wall 470 and the rear wall each contact and are supported by axle center tube 30, and may be attached to the center tube by welding or other means known to those skilled in the art. Air spring 34 is mounted on upper wall 472 by means known in the art, such as mechanical fasteners. Air spring mounting structure 458 is rigid and thus provides a stable mounting surface for each air spring 34 on upper wall 472 directly above axle 28. As described above for first and second embodiments axle/suspension system 80, 140, this position of upper wall 472 and in turn of air spring 34 in fifth embodiment axle/suspension system 410 relative to axle 28 reduces the amount of static offset loading encountered by the system, in turn reducing the forces encountered by the system. Of course, if an offset position for air spring 34 is desired due to application and design considerations, air spring mounting structure 458 optionally may be modified to position the air spring accordingly.

Preferably included in fifth embodiment axle/suspension system 410 are front and rear radius rods 414 and 416, respectively. Front radius rod 414 extends generally parallel to and below leaf spring 412 from front axle 28F to a front hanger 478, which is mounted on and depends from a respective one of main members 14 and a selected one of cross members 16. More particularly, front radius rod 414 preferably includes a cylindrical body 480, and a front collar 482 that is rigidly attached to a front end 484 of the cylindrical body. Front collar 482 is formed with an opening (not shown) that enables a pin or other mechanical fastener (not shown) to pivotally attach the front collar of front radius rod 414 to front hanger 478. Front radius rod 414 also includes a rear collar 488 that is rigidly attached to a rear end 490 of cylindrical body 480. Rear collar 488 is formed with an opening 492 that enables a pin or other mechanical fastener (not shown) to pivotally attach the rear collar of front radius rod 414 to orifices 494 formed in outboard plate 454 and inboard plate 456 of front bracket assembly 450.

Rear radius rod 416 extends generally parallel to and below leaf spring 412 from central hanger 426 to rear axle 28R. More particularly, rear radius rod 416 preferably includes a cylindrical body 496, and a front collar 498 that is rigidly attached to a front end 500 of the cylindrical body. Front collar 498 is formed with an opening (not shown) that enables a pin or other mechanical fastener (not shown) to pivotally attach the front collar of rear radius rod 416 to bracket plates 504, 506 formed on U-bolt rest 430. The connection of front collar 498 to bracket plates 504, 506 of bolt rest 430 enables rear radius rod 416 to be mechanically attached to central hanger 426 when U-bolts 432 are secured to lower plate 438 of the central hanger. Rear radius rod 416 also includes a rear collar 508 that is rigidly attached to a rear end 510 of cylindrical body 496. Rear collar 508 is formed with an opening (not shown) that enables a pin or other mechanical fastener (not shown) to pivotally attach the rear collar of rear radius rod 416 to openings 514 formed on axle brackets 516, 518, which are welded to rear axle 28R or otherwise mechanically attached to the rear axle by means known to those skilled in the art.

In this manner, front radius rod 414 extends between and is attached to front axle 28F and front hanger 478, which is rigidly attached to frame 12, and rear radius rod 416 extends between and is attached to rear axle 28R and lower plate 438, which is rigidly attached to central hanger 426 and thus the frame. This attachment of each radius rod 414, 416 to each respective axle 28F, 28R and frame 12 enables the radius rods to maintain alignment of each respective axle, and to react or distribute brake forces and other fore-aft forces. For example, during heavy braking applications, axle 28F, 28R may rotate slightly in a forward direction. Because each axle 28F, 28R is connected to leaf spring 426, the rotation of the axle may cause the leaf spring to experience some undesirable deformation at its connection to the axle, which is known in the art as brake wind-up. By extending in a forward direction from each respective axle 28F, 28R to frame 12, radius rods 414, 416 reduce the possibility of such rotation of each axle during heavy braking applications.

Returning now to FIGS. 25 and 26, as an optional feature, fifth embodiment axle/suspension system 410 may include a front track bar 520, a center track bar 522, and/or a rear track bar 524. In certain vehicle applications, axle/suspension system 410 may experience lateral, or side-to-side, movement. Track bars 520, 522, and 524 provide an additional mechanical connection between the driver's side of frame 12 to the passenger side of the frame to increase the rigidity of axle/suspension system 410 to reduce such lateral movement, which desirably increases the stability of the system. More particularly, front track bar 520 extends between and is rigidly connected to each one of driver's side front hanger 478 and passenger side front hanger 478. The rigid connection of each front hanger 478 to frame 12 thus provides additional stability between the front hangers and the driver's side and passenger side of the frame. Center track bar 522 extends between and is rigidly connected to each one of driver's side central hanger 426 and passenger side central hanger 426. The rigid connection of each central hanger 426 to frame 12 thus provides additional stability between the central hangers and the driver's side and passenger side of the frame.

Because fifth embodiment axle/suspension system 410 preferably does not include rear hangers, rear track bar 524 extends between and is pivotally attached to a rear driver's side air-spring mounting structure 458 and a passenger-side end 526 of a rear cross member 16R. More specifically, rear track bar 524 preferably includes a cylindrical body 530, and a driver's-side collar 532 that is rigidly attached to a driver's-side end 534 of the cylindrical body. Driver's-side collar 532 is formed with an opening (not shown) that enables a pin or other mechanical fastener (not shown) to pivotally attach the driver's side collar to openings 528 formed in driver's side air-spring mounting structure 458. Rear track bar 524 also includes a passenger-side collar 538 that is rigidly attached to a passenger-side end 540 of cylindrical body 530. Passenger-side collar 538 is formed with an opening (not shown) that enables a pin or other mechanical fastener (not shown) to pivotally attach the passenger-side collar of rear track bar 524 to openings 544 formed on rear cross member brackets 546, 548, which are welded, or otherwise mechanically attached by means known to those skilled in the art, to the underside of passenger-side end 526 of rear cross member 16R.

The connection of driver's side air-spring mounting structure 458 to passenger-side end 526 of rear cross member 16R thus provides additional stability between the driver's side and passenger side of frame 12. In addition, the pivotal connection of rear track bar 524 to driver's side air-spring mounting structure 458 and passenger-side end 526 of rear cross member 16R enables the track bar to pivot in a vertical direction, to facilitate axle/suspension system 410 reacting and distributing vertical forces, and other forces which have a vertical component. It is to be understood that rear track bar 524 may alternatively extend between and be pivotally attached to a passenger side air-spring mounting structure 458 and a driver's-side end of rear cross member 16R.

Depending on design considerations, fifth embodiment axle/suspension system 410 may include an auxiliary center track bar 550 to provide additional rigidity for the system. As shown in FIG. 26, auxiliary center track bar 550 extends between and is pivotally attached to a front driver's side air spring mounting structure 458 and a passenger-side end 552 of a middle cross member 16M. The construction and arrangement of auxiliary center track bar 550 is the same as rear track bar 524, with the exception that the auxiliary center track bar extends between a front driver's side air spring mounting structure 458 and passenger-side end 552 of a middle cross member 16M.

Referring now to FIG. 25, using trailing arm suspension assembly 420 for the purpose of illustration, reference herein will be made in singular form to common features and components of leading and trailing arm suspension assemblies 418, 420. The construction of leaf spring 412 and radius rod 416 and their respective attachments to central hanger 426 and rear axle 28R minimizes or prevents the type of arcuate motion of beam 20 and the axle as seen in prior art axle/suspension system 10 (FIG. 3) when the central hanger moves downwardly, reducing or eliminating dock walk. More particularly, as described above, when a fork lift drives into trailer 40, hanger 426 moves downwardly.

Mid-point 424 of leaf spring 412 is secured to central hanger 426 by U-bolts 432 and the mid-point thus moves with the hanger, while rear end 428 of the leaf spring moves closer to frame 12. Leaf spring 412 exhibits deflection characteristics that define a predictable curvature along a locus arc when mid-point 424 moves downwardly with hanger 426 and rear end 428 moves closer to frame 12. In a manner similar to that described above for first and second embodiment axle/suspension systems 80, 240, the predictable curvature along the locus arc causes leaf spring rear end 428 and the vertical centerline of axle 28R to shift to a new plane in a manner that is parallel with mid-point 424, while radius rod 416 moves generally with leaf spring 412 without deflecting due to its pivotal connection between central hanger 426 and the rear axle. Since the vertical centerline of axle 28R shifts without the type of arcuate motion of beam 20 and the axle as seen in prior art axle/suspension system 10 (FIG. 3), axle top dead-center point T remains at the top dead-center of the axle. As a result, tires 48 do not rotate as hanger 426 moves downwardly, thereby reducing or eliminating dock walk.

After the fork lift exits trailer 40, central frame hanger 426 springs upwardly due to the combination of the sudden loss of the weight of the fork lift and the upward force of air spring 34. As described above, this upward movement caused prior art axle/suspension system 10 to impose a rearward arcuate motion on beam 20 and axle 28 (FIG. 3), causing a rearward rotation of tires 48 so that rear end 46 of vehicle 42 could possibly strike loading dock 44.

Again using trailing arm suspension assembly 420 for the purpose of illustration, fifth embodiment axle/suspension system 410 reduces or eliminates such movement, since when hanger 426 moves upwardly, mid-point 424 of leaf spring 412 moves upwardly with the hanger, while rear end 428 of the leaf spring moves away from frame 12. Leaf spring 412 exhibits deflection characteristics that define a predictable curvature along a locus arc when mid-point 424 moves upwardly with hanger 426 and rear end 428 moves away from frame 12. In a manner similar to that described above for first and second embodiment axle/suspension systems 80, 240, the predictable curvature along the locus arc causes leaf spring rear end 428 and the vertical centerline of axle 28R to shift to a new plane in a manner that is parallel with mid-point 424, while radius rod 416 moves generally with leaf spring 412 without deflecting due to its pivotal connection between central hanger 426 and the rear axle. Since the vertical centerline of axle 28R shifts without the type of arcuate motion of beam 20 and the axle as seen in prior art axle/suspension system 10 (FIG. 3), axle top dead-center point T remains at the top dead-center of the axle. As a result, tires 48 do not rotate rearwardly as hanger 426 moves upwardly, thereby reducing or eliminating rearward movement of trailer 40.

It is also important to note that leaf spring 412 reduces undesirable significant downward movement of axles 28F and 28R. As described above, trailer 40 is sometimes lifted onto a rail ear (not shown). With prior art air-ride axle/suspension systems 10, 54, 302, when trailer 40 is lifted, axles 28F and 28R move downwardly until shock absorbers 36 (FIG. 1) are fully extended, which allows for a significant drop of the axles. This drop stretches air bag 66 of each respective air spring 34, which creates a vacuum in the air bag, causing it to fold inwardly. When trailer 40 is placed onto the rail car, folded air bag 66 then is sometimes pinched within air spring 34, potentially damaging the air bag. Leaf spring 412 reduces or prevents this vacuum fold-in effect, since it has a stiffness that builds resistance as the spring moves downwardly, and thereby resists significant downward movement of axles 28F and 28R. This resistance to downward movement of axles 28F and 28R contributes to the potential elimination of shock absorbers 36, since the need for a positive lower stop is eliminated.

Moreover, fifth embodiment axle/suspension system 410 also provides roll stability. The use of leaf spring 412 which is rigidly affixed at its mid-point 424 to central hanger 426 and thus trailer frame 12, generally operates like a fixed cantilever spring, with the exception that the leaf spring includes spring eyes 446, 448 at its respective front and rear ends 422, 428 to produce the above-described anti-dock walk benefit. That is, a leading arm cantilever spring 412 exists for front axle 28F, and a trailing aim cantilever spring exists for rear axle 28R. Leaf spring 412 has a certain spring rate, that is, the spring is designed so that it takes a certain amount of force to deflect the spring upwardly and a certain amount of force to deflect the spring downwardly, while being neutral at vehicle ride height. In order for trailer 40 to lean or sway due to roll forces, one of the driver's side or curb side axle spindles 32 (FIG. 10) must move vertically so that it is a different distance away from frame 12 than the transversely opposing curb or driver's side spindle, respectively. The forces that are required to negate this movement can be calculated, enabling leaf spring 412 to be engineered to include a spring rate that is stiff enough to control such roll or sway. Accordingly, since the stiffness of leaf spring 412 is engineered to be neutral at ride height, air springs 34 are able to provide a soft ride, while the leaf springs work to control sway when vehicle 42 leans.

An additional benefit of leaf spring 412 being neutral at vehicle ride height, which is a term of art in the heavy-duty axle/suspension industry, is improvement of the life of axle/suspension system 410, particularly with respect to prior art spring suspension 280. More particularly, in prior art spring suspension 280, leaf springs 282, 283 (FIG. 4C) must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the leaves of the leaf springs to become damaged and/or to break.

In contrast, leaf spring 412 of fifth embodiment axle/suspension system 410 preferably is designed to experience stresses in a lower range than prior art spring suspension 280 by being neutral, or generally unstressed, when trailer 40 is unloaded or loaded with freight and the axle/suspension system is maintaining the vehicle ride height. By being neutral at ride height for loaded trailer 40, leaf spring 412 enables air springs 34 to provide optimum ride cushioning. Therefore, when loaded trailer 40 experiences impacts from traveling over-the-road, leaf spring 412 experiences relatively low stresses, which reduces the fatigue on axle/suspension system 410 and extends its life.

These aspects of fifth embodiment axle/suspension system 410 are different from prior art axle/suspension system 10, which includes a rigid structure that is designed to generally prevent movement of spindle 32 associated with roll or sway, but then uses discrete components such as bushing assembly 24 to provide a predictable amount of compliance, which enables control of roll forces. Fifth embodiment axle/suspension system 410 also is different from parallelogram suspensions 54, 302 which pivot freely, enabling sway, but then use a discrete roll bar component 70, 308 to resist the movement associated with roll or sway. Fifth embodiment axle/suspension system 410 is different from prior art spring suspension 280 as well, since that system utilizes stiff springs 282, 283 to resist sway, which also carry the load and are therefore too stiff to provide a cushioned ride when vehicle 42 is only lightly loaded.

In addition, there is less side-to-side movement of fifth embodiment axle/suspension system 410 than with prior art systems such as parallelogram axle/suspension systems 54, 302 (FIGS. 4A, 4B). Using parallelogram axle/suspension system 54 as an example, each link 56 of the prior art parallelogram linkage connection requires two pivot connections, that is, four pivot connections for each of the driver's side and curb side suspension assemblies. With one driver's side and one curb side suspension, there are eight total pivot connections, all of which need clearance to rotate. This clearance results in lateral movement of parallelogram axle/suspension system 54. Fifth embodiment axle/suspension system 410, in contrast, includes only three pivoted connections, that is, one at spring eye 446 or 448 and two at each radius rod 414, 416, for each respective leading or trailing arm suspension assembly 418, 420, thereby reducing the connections, and the lateral movement associated with the clearance for such connections, by more than half. Also, fifth embodiment axle/suspension system 410 reduces lateral movement even further, since it is clamped to hanger 426, rather than pivotally attached to the hanger, as are prior art parallelogram axle/suspension systems 54, 302. The elimination of pivotal attachments to hanger 18 in turn eliminates the angular lateral movement that necessarily accompanies a pivot connection, thereby reducing the total lateral movement experienced with prior art parallelogram axle/suspension systems 54, 302 by more than half.

Thus, by acting as a cantilever spring that is clamped at one end, fifth embodiment axle/suspension system 410 reduces or eliminates dock walk without the use of additional components. Also, fifth embodiment axle/suspension system 410 provides roll stability without the use of additional components and distributes brake forces more efficiently. Furthermore, fifth embodiment axle/suspension system 410 reduces lateral movement significantly and enables leaf spring 412 to be neutral at ride height so that air springs 34 may provide optimum ride cushioning. As will be described in greater detail below, axle/suspension system 410 achieves further aspects of increased performance over systems of the prior art, while having reduced weight and cost, including resisting downward movement to eliminate the need for shock absorbers, enabling quicker inflation for air springs 34, and providing a visual ride-height check.

The five embodiments of the axle/suspension system of the present invention 80, 140, 240, 320, 410 each act as a clamped cantilever spring that moves generally vertically to reduce or eliminate the type of arcuate motion of beam 20 and axle 28 as seen in prior art axle/suspension system 10 (FIG. 3) caused by vertical movement of frame hanger 18, 154, 334, 426 when a forklift drives into trailer 40. More particularly, each axle/suspension system 80, 140, 240, 320, 410 includes a leaf spring 82, 146, 148, 326, 412, respectively, which is fixed to vehicle frame 12 and does not respond to loading by causing axle 28 to move arcuately in the manner of prior art system 10. Leaf springs 82, 146, 148, 326, 412 of each respective axle/suspension system 80, 140, 240, 320, 410 each generate a parallelogram geometry as hanger 18, 154, 334, 426 moves up and down, thereby causing movement of axle 28 in a generally vertical manner, rather than arcuately as seen in prior art axle/suspension system 10, thereby reducing or eliminating both dock walk and rearward movement of trailer 40.

Axle/suspension system of the present invention 80, 140, 240, 320, 410 also is roll stable. Unlike prior art parallelogram and spring systems 54, 280, 302 (FIGS. 4A-4C) that use pivoted links 56, 304, 306, auxiliary roll bars 70, 308, or stiff springs 282, 283 to reduce axle rotation and control roll, axle/suspension system of the present invention 80, 140, 240, 320, 410 incorporates the ability to control roll stability without the use of such components. Axle/suspension system 80, 140, 240, 320, 410 also eliminates the conventional hanger pivot connections for springs 82, 146, 148, 326, 412, which typically are very susceptible to undesirable conditions such as component wear, loosening of fittings, potential bushing failure, hanger wear-through and high maintenance.

Also, prior art parallelogram systems 54, 302 require a suitable wear surface for links 56, 304, 306 and an adequate bushing for the connection between each link and hanger 18, and for the connection between each corresponding link and bracket 62. Axle/suspension system 80, 140, 240, 320, 410 instead allows the stiffness of respective leaf spring 82, 146, 148, 326, 412 to be tuned for roll stability, thus controlling roll forces without expensive hanger pivot bushings, therefore eliminating this and other intricacies of prior art pivoted suspension technology. Moreover, by reducing the four-per-side pivot connections required by each prior art parallelogram system 54, 302 to at most two, axle/suspension system 80, 140, 240, 320, 410 reduces the connections by at least half, thereby reducing the lateral movement associated with such connections. By eliminating multiple prior art components, axle/suspension system 80, 140, 240, 320, 410 has longer life and increased durability compared to prior art systems 10, 54, 280, 302. Likewise, the need and associated cost to maintain at least twice as many bushings and pivot components of the prior art also is eliminated.

In addition, axle/suspension system 80, 140, 240, 320, 410 increases the likelihood of eliminating shock absorbers, since the movement of axle 28 is defined by the design of respective leaf spring 82, 146, 148, 326, 412, and the clamping arrangement for each. Unlike prior art parallelogram suspensions 54, 302, which possibly can rotate downward far enough to damage air spring 34, the design of each leaf spring 82, 146, 148, 326, 412 has a stiffness that builds resistance as it moves downwardly, eliminating the need for a shock absorber to provide a positive lower stop. Each leaf spring 82, 146, 148, 326, 412 also builds resistance as it moves upwardly, thus softening the impact in the case where a large bump causes internal bumper 68 of air spring 34 to hit vehicle frame 12 or a connecting member of the frame. Although this stiffness reduces the effect of the soft ride of air springs 34, it is about one-third to one-half as stiff as prior art spring suspensions 280, providing adequate softness for ride, yet enough stiffness to control roll forces.

Axle/suspension system 80, 140, 240, 320, 410 thus reduces the number of components and the complexity over that seen in prior art systems 10, 54, 280, 302. With fewer components and less complexity, axle/suspension system 80, 140, 240, 320, 410 is more economical to manufacture and maintain than prior art systems 10, 54, 280, 302. Fewer components also allow axle/suspension system 80, 140, 240, 320 to be lighter in weight and longer-lived than prior art systems 10, 54, 280, 302.

In addition, the placement of air springs 34 directly over axle 28, which is enabled by the design of axle/suspension system 80, 140, 240, 320, 410, increases the life of the air springs. The identical deflection curvature of springs 82, 146, 148, 326, 412 of each axle/suspension system 80, 140, 240, 320, 410, respectively, enable axle top dead-center point T to remain top dead-center, which further increases the life of air springs 34 by reducing uneven loading of the air springs. Moreover, brake air chambers 126 are located above and behind axle 28, generally removed from potential damage by road hazards.

The parallel articulation of axle/suspension system 80, 140, 240, 320, 410 also reduces the tendency of rear end 46 of trailer 40 to rise during braking while going in reverse, and the corresponding tendency of the trailer rear end to squat during braking while going forward. Such construction of axle/suspension system 80, 140, 240, 320, 410 reduces or eliminates fore-aft fatigue stresses on the system. Moreover, proper ride height of trailer 40 is visually indicated by straight, horizontal leaf springs 82, 146, 148, 326, 412 of axle/suspension system 80, 140, 240, 320, 410, respectively.

Furthermore, axle/suspension system 80, 140, 240, 320, 410 can substantially maintain ride height when trailer 40 is lifted off the ground onto a rail car. In prior air-ride art axle/suspension systems 10, 54, 302 the lifting of trailer 40 causes axles 28 to drop, which stretches air bag 66 (FIG. 1) of air spring 34. Air bag 66 thus is extended, which creates a vacuum in the bag and causes it to fold inwardly. When trailer 40 is set down on the rail car, air bag 66 might then be pinched in air spring 34, possibly damaging the air bag. Because axle/suspension system 80, 140, 240, 320, 410 of the invention can somewhat maintain ride height, that is, it does not allow axle 28 to significantly drop, it may reduce or eliminate this vacuum fold-in effect and the potential resulting failures of air bag 66. In addition, since shock absorbers 36 are often used to limit downward movement of axle 28 in prior art air-ride axle/suspension systems 10, 54, 302, the shock absorbers can be eliminated because springs 82, 146, 148, 326, 412, respectively, resist downward movement of the axle in axle/suspension system 80, 140, 240, 320, 410.

Another important feature of axle/suspension system 80, 140, 240, 320, 410 is that the design of the system makes it possible to utilize the axle/suspension system to lift a selected axle 28. In such a case, respective leaf springs 82, 146, 148, 326, 412 are biased to urge a selected axle 28 upwardly, so that the selected axle lifts off of the ground when air is dumped from corresponding air bag 66 of air spring 34. When it is desired to lower axle 28, air bag 66 is inflated, and the pressure of the inflated air bag urges the selected axle downwardly against the upward bias of leaf springs 82, 146, 148, 326, 412, to the operational position shown in FIGS. 5, 10, 16, 20, and 25, respectively.

Each present invention axle/suspension system 80, 140, 240, 320, 410 also is neutral at vehicle ride height, which is a term of art in the heavy-duty axle/suspension industry, and improves of the life of the axle/suspension system, particularly with respect to prior art spring suspension 280. More particularly, in prior art spring suspension 280, leaf springs 282, 283 (FIG. 4C) must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the leaves of the leaf springs to become damaged and/or to break.

In contrast, leaf springs 82, 146, 148, 326, 412 of axle/suspension system 80, 140, 240, 320, 410, respectively, preferably are designed to experience stresses in a lower range than prior art spring suspension 280 by being neutral, or generally unstressed, when trailer 40 is unloaded or loaded with freight and the axle/suspension system is maintaining the vehicle ride height. By being neutral at ride height for loaded trailer 40, leaf springs 82, 146, 148, 326, 412 enable air springs 34 to provide optimum ride cushioning. Therefore, when loaded trailer 40 experiences impacts from traveling over-the-road, leaf springs 82, 146, 148, 326, 412 experience relatively low stresses, which reduces the fatigue on axle/suspension system 80, 140, 240, 320, 410 and extends the life of the system.

While several embodiments of the invention have been described in the context of trailing arm axle/suspension systems, the invention also applies to leading arm axle/suspension systems. Moreover, the invention applies to various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. In addition, the invention applies to frames and subframes having various configurations and arrangements of main members, cross members and/or hangers, including main members and/or cross members with cross-sectional shapes other than those shown and described above.

It is to understood that, while reference above has been made to the use of metals such as spring steel for springs 82, 146, 148, 326, 412 of each respective axle/suspension system of the present invention 80, 140, 240, 320, 410, other materials may be used. For example, other ferrous metals and alloys thereof may be used. In addition, nonferrous metals and alloys thereof, as well as composite materials, may be used without affecting the overall concept or operation of the present invention. It is also to be understood that brackets, sleeves or means used attach each respective spring 82, 146, 148, 326, 412 to front and/or rear axles 28F, 28R, other than those shown and described above, and which are known to those skilled in the art, may be employed without affecting the overall concept or operation of the invention.

Accordingly, the heavy-duty vehicle axle/suspension system of the present invention is simplified, provides an effective, safe, inexpensive, and efficient structure which achieves all the enumerated objectives, provides for eliminating difficulties encountered with prior-art heavy-duty vehicle axle/suspension systems, and solves problems and obtains new results in the art.

In the foregoing description, certain terms have been used for brevity, clearness and understanding; but no unnecessary limitations are to be implied therefrom beyond the requirements of the prior art, because such tell is are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved heavy-duty vehicle axle/suspension system is constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. An axle/suspension system for a heavy-duty vehicle, said vehicle having a frame including a pair of hangers, said axle/suspension system being attached to said hangers, the axle/suspension system including an axle and a pair of suspension assemblies, each one of said suspension assemblies comprising:
an air spring; and
at least one spring member including a first attachment portion and a second attachment portion, said first attachment portion being non-rotatably connected to a respective one of said hangers, and said second attachment portion being pivotally connected to said axle to pivot about an axis that is parallel to a longitudinal axis of said axle, whereby the spring member exhibits sufficient stiffness to control roll forces encountered by said vehicle during operation.

2. The axle/suspension system for a heavy-duty vehicle of claim 1, whereby rotation of a vehicle tire due to movement of said axle is reduced when a cargo transfer vehicle enters or exits said heavy-duty vehicle.

3. The axle/suspension system for a heavy-duty vehicle of claim 1, wherein said suspension assembly includes means for positioning said air spring above and in general alignment with said axle.

4. The axle/suspension system for a heavy-duty vehicle of claim 1, wherein said at least one spring member includes a plurality of generally flat spring leaves.

5. The axle/suspension system for a heavy-duty vehicle of claim 4, wherein said second attachment portion of said at least one spring member pivotally connects to a bracket, and said bracket is rigidly attached to said axle.

6. The axle/suspension system for a heavy-duty vehicle of claim 1, wherein said at least one spring member includes two spaced-apart parabolic leaves, and wherein braking forces are imposed on said axle/suspension system during braking of said heavy-duty vehicle, whereby said leaves react braking forces imposed on said axle/suspension system.

7. The axle/suspension system for a heavy-duty vehicle of claim 6, wherein said second attachment portion of said at least one spring member pivotally connects to a bracket, and said bracket is rigidly attached to said axle.

8. The axle/suspension system for a heavy-duty vehicle of claim 7, wherein said axle is received in a sleeve, and said bracket is rigidly connected to said sleeve.

9. The axle/suspension system for a heavy-duty vehicle of claim 7, wherein said bracket is rigidly connected directly to said axle.

10. The axle/suspension system for a heavy-duty vehicle of claim 1, wherein said at least one spring member includes one parabolic leaf.

11. The axle/suspension system for a heavy-duty vehicle of claim 10, wherein said second attachment portion of said at least one spring member includes a bent portion capable of capturing a portion of said axle.

12. The axle/suspension system for a heavy-duty vehicle of claim 11, further comprising a bushing disposed between said second attachment portion of said spring member and said captured portion of said axle.

13. The axle/suspension system for a heavy-duty vehicle of claim 10, further comprising at least one radius rod extending from said hanger to said axle.

14. The axle/suspension system for a heavy-duty vehicle of claim 1, wherein said at least one spring member further includes a third attachment portion, said third attachment portion being pivotally connected to a second axle.

15. The axle/suspension system for a heavy-duty vehicle of claim 1, wherein said heavy-duty vehicle is capable of being loaded with and transporting freight, and wherein said at least one spring member is neutral at a ride height of said vehicle when the vehicle is loaded with said freight.

16. The axle/suspension system for a heavy-duty vehicle of claim 1, wherein said at least one spring member includes a flat spring leaf.

17. The axle/suspension system for a heavy-duty vehicle of claim 16, further comprising a second spring connected to said hanger below said flat spring leaf.

18. The axle/suspension system for a heavy-duty vehicle of claim 16, further comprising a least one radius rod extending from said hanger to said axle.

19. The axle/suspension system for a heavy-duty vehicle of claim 16, further comprising at least one track bar extending between a driver's side and a passenger side of said frame.

20. The axle/suspension system of claim 1, wherein said second attachment portion pivotally connects to a bracket, said bracket being rigidly attached to said axle.

21. An axle/suspension system for a heavy-duty vehicle, said vehicle having a frame including a pair of hangers, said axle/suspension system being attached to said hangers, the axle/suspension system including an axle and a pair of suspension assemblies, each one of said suspension assemblies comprising:
an air spring; and
at least one spring member including a first attachment portion and a second attachment portion, said first attachment portion being non-rotatably connected to a respective one of said hangers, and said second attachment portion being pivotally connected to said axle to pivot about an axis that is parallel to a longitudinal axis of said axle, whereby rotation of a vehicle tire due to movement of said axle is reduced when a cargo transfer vehicle enters or exits said heavy-duty vehicle.

22. The axle/suspension system for a heavy-duty vehicle of claim 21, wherein said suspension assembly includes means for positioning said air spring above and in general alignment with said axle.

23. The axle/suspension system for a heavy-duty vehicle of claim 21, wherein said at least one spring member further includes a third attachment portion, said third attachment portion being pivotally connected to a second axle.

24. The axle/suspension system for a heavy-duty vehicle of claim 21, wherein said heavy-duty vehicle is capable of being loaded with and transporting freight, and wherein said at least one spring member is neutral at a ride height of said vehicle when the vehicle is loaded with said freight.

25. The axle/suspension system for a heavy-duty vehicle of claim 21, wherein said at least one spring member includes a flat spring leaf.

26. The axle/suspension system for a heavy-duty vehicle of claim 25, further comprising a second spring connected to said hanger below said flat spring leaf.

27. The axle/suspension system for a heavy-duty vehicle of claim 25, further comprising a least one radius rod extending from said hanger to said axle.

28. The axle/suspension system for a heavy-duty vehicle of claim 25, further comprising at least one track bar extending between a driver's side and a passenger side of said frame.

29. The axle/suspension system of claim 21, wherein said second attachment portion pivotally connects to a bracket, said bracket being rigidly attached to said axle.

* * * * *